US012373591B2

(12) United States Patent
Freedman et al.

(10) Patent No.: US 12,373,591 B2
(45) Date of Patent: Jul. 29, 2025

(54) ENHANCED PROCESSING AND VERIFICATION OF DIGITAL ACCESS RIGHTS

(71) Applicant: Live Nation Entertainment, Inc., Beverly Hills, CA (US)

(72) Inventors: Jeffrey Freedman, Studio City, CA (US); Justin Burleigh, Phoenix, AZ (US); Carl Schumaier, Forest Park, IL (US); Brandon Vallade, Los Angeles, CA (US); Phillip Volini, Hoffman Estates, IL (US); Christopher Bussard, Los Angeles, CA (US)

(73) Assignee: Live Nation Entertainment, Inc., Beverly Hills, CA (US)

( * ) Notice: Subject to any disclaimer, the term of this patent is extended or adjusted under 35 U.S.C. 154(b) by 0 days.

(21) Appl. No.: 18/444,589

(22) Filed: Feb. 16, 2024

(65) Prior Publication Data

US 2024/0311501 A1 Sep. 19, 2024

Related U.S. Application Data

(63) Continuation of application No. 17/521,627, filed on Nov. 8, 2021, now Pat. No. 11,907,388, which is a continuation of application No. 16/659,323, filed on Oct. 21, 2019, now Pat. No. 11,170,121, which is a continuation of application No. 16/275,064, filed on Feb. 13, 2019, now Pat. No. 10,474,833.

(60) Provisional application No. 62/630,127, filed on Feb. 13, 2018.

(51) Int. Cl.
G06F 21/00 (2013.01)
G06F 16/903 (2019.01)
G06F 21/10 (2013.01)
G06F 21/31 (2013.01)
G06F 21/62 (2013.01)

(52) U.S. Cl.
CPC .... *G06F 21/6218* (2013.01); *G06F 16/90335* (2019.01); *G06F 21/10* (2013.01); *G06F 21/31* (2013.01); *G06F 21/62* (2013.01)

(58) Field of Classification Search
CPC .......... G06F 21/62; G06F 21/31; G06F 21/10; G06F 16/90335; G06F 21/6218
USPC .......................................................... 726/27
See application file for complete search history.

(56) References Cited

U.S. PATENT DOCUMENTS

2016/0277970 A1* 9/2016 Werneke ............. H04W 12/084
2017/0230426 A1* 8/2017 Denker .................. H04L 47/70

* cited by examiner

*Primary Examiner* — Josnel Jeudy
(74) *Attorney, Agent, or Firm* — MUGHAL GAUDRY & FRANKLIN PC

(57) ABSTRACT

The present disclosure generally relates to systems and methods that provide a network environment that enables reassignment platforms to provide authentic access rights for reassignment to user devices. More specifically, the present disclosure relates to systems and methods in which a reassignment platform can execute a protocol implemented using code (e.g., an Application Programming Interface (API)) to validate the authenticity of access rights made available for reassignment, and once reassigned, reissue the access rights to a new user and transmit those access rights to user devices natively in a mobile application.

20 Claims, 25 Drawing Sheets

ENHANCED PROCESSING AND VERIFICATION OF DIGITAL ACCESS RIGHTS

PRIORITY

This application is a continuation of U.S. application Ser. No. 17/521,627, filed Nov. 8, 2021, which is a continuation of U.S. application Ser. No. 16/659,323, filed Oct. 21, 2019, now U.S. Pat. No. 11,170,121, issued Nov. 9, 2021, which is a continuation of U.S. application Ser. No. 16/275,064, filed on Feb. 13, 2019, now U.S. Pat. No. 10,474,833, issued on Nov. 12, 2019, which claims the priority benefit of U.S. Provisional Application No. 62/630,127, filed on Feb. 13, 2018, the entire disclosures of each of which are incorporated herein in their entirety by reference for all purposes.

TECHNICAL FIELD

The present disclosure generally relates to systems and methods for providing a network environment that enables access-right reassignment systems to authenticate access rights. Additionally, the present disclosure generally relates to systems and methods for enhanced processing of access rights to resources.

BACKGROUND

Users increasingly, and in many cases exclusively, request access rights to resources using digital platforms on the Internet. An assignment platform can store unique codes representing access rights to a resource. Further, the assignment platform can facilitate the initial assignment of access rights to users. For example, a user operating a computing device can access the assignment platform to request that an access right to a particular resource be assigned to the user or user device. The access right, once assigned to the user or user device, enables the user to access the resource during a defined time period.

In some circumstances, before the resource is available for accessing by valid access-right holders, the user can reassign the access right to a new user. Reassignment platforms are configured to facilitate the reassignment of access rights from the access-right holder (e.g., the original user to which the access right is assigned) to a new user. The access right, once reassigned to the new user, inhibits the original user from accessing the resource during the defined time period, but enables the new user to gain access to the resource during that defined time period.

The reassignment of access rights from one user to another, however, is often performed over computer networks between two users who have not conducted previous transactions with each other. The location and/or the identity of one user may be unknown to the other user. In some cases, access rights that are not authentic may be made available for reassignment to users on the reassignment platform. For example, a user operating a computing device can access the reassignment platform to post (e.g., make available for reassignment to other users) an invalid access right that is not actually assigned to that user. Users are often disappointed or frustrated when the access rights that are reassigned to them using a reassignment platform are ultimately found to be invalid, thus preventing the users from accessing the resources during the defined time period. In some cases, users do not find out that the access rights that have been reassigned to them are invalid until it is too late—immediately before the defined time period for accessing the resource. Accordingly, the reassignment of access rights on reassignment platforms can be insecure, uncertain, and risky.

In addition, analyzing the reassignment of some or all access rights posted to reassignment platforms is inefficient and, in certain situations, impossible. Reassignment platforms do not generally track or monitor the big-data scale reassignments that occur on the reassignment platforms. Further, different reassignment platforms are not configured to share information with each other, and as such, analyzing reassignments by the same user across multiple different reassignment platforms is impossible.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system, including: one or more data processors; and a non-transitory computer-readable storage medium containing instructions which, when executed on the one or more data processors, cause the one or more data processors to perform operations including. The system also includes receiving, at a primary assignment system, a first communication from a secondary assignment system, the primary assignment system generating a plurality of access rights to a resource, each access right of the plurality of access rights enabling access to the resource during a defined time period, the first communication corresponding to a request to authenticate access-right data received at a reassignment platform deployed within the secondary assignment system, the access-right data being transmitted to the reassignment platform by a first user operating a first user device, and, prior to the access-right data being transmitted to the reassignment platform, a particular access right of the plurality of access rights being assigned to the first user using an assignment platform. The system also includes determining whether the access-right data received at the reassignment platform is authentic, the determination including querying one or more databases to determine whether the access-right data corresponds to one or more access rights of the plurality of access rights. The system also includes in response to determining that the access-right data is authentic, identifying the access right that corresponds to the access-right data transmitted by the first user device. The system also includes tagging the access right at the primary assignment system, the tagging of the access right indicating that the access-right data is authentic, and the tagging notifying the primary assignment system that the access right is available or will be made available for reassignment on the reassignment platform. The system also includes transmitting a second communication from the primary assignment system to the secondary assignment system, the second communication corresponding to a notification that the access-right data is authentic. The system also includes providing, at the secondary assignment system, the access right on the reassignment platform, the providing including enabling the access right to be queryable by one or more user devices using the reassignment platform, and the providing further including enabling the one or more user devices to transmit requests for reassignment of the access right using the reassignment platform. The system also includes receiving, at the secondary assignment system, a third communication from a second user device operated by a second user, the third communication including request data indicating that the second user requests that the access right be reassigned from the first user to the second user. The system also includes transmitting, by the secondary assignment system, the request data, the request data being received at a data processing system that analyzes the request data for anomalies. The system also includes transmitting, by the secondary assignment system, a fourth communication to the primary assignment system, the fourth communication corresponding to a notification that the second user has satisfied an assignment condition associated with the access right, the assignment condition being associated with a value of the access right. The system also includes automatically broadcasting, by the primary assignment system, a fifth communication to one or more additional secondary assignment systems to which the access right was made available for reassignment, the fifth communication corresponding to a notification to temporarily remove the access right from the additional secondary assignment systems, and the temporary removal of the access right from the one or more additional secondary assignment systems causing the access right to be temporarily inhibited from being queried by user devices using the reassignment platform pending a result of processing the request data by the data processing system. The system also includes receiving, at the secondary assignment system, a sixth communication from the data processing system, the sixth communication corresponding to the result of the analysis of the request data. The system also includes transmitting, at the secondary assignment system, a seventh communication when the result of the analysis indicates that no anomalies were detected by the data processing system, the seventh communication corresponding to an instruction to reassign the access right to the second user. The system also includes in response to receiving the seventh communication at the primary assignment system, reassigning an access code associated with the access right from the first user to the second user. The system also includes generating display data at the primary or secondary assignment system. The system also includes transmitting an eighth communication to the second user device, the eighth communication including the display data, and when the display data is received at the second user device, the display data causes the second user device to display a digital representation of the access right, and the digital representation of the access right enabling the second user to access the resource during the defined time period. Other embodiments of this aspect include corresponding computer systems, apparatus, and computer programs recorded on one or more computer storage devices, each configured to perform the actions of the methods.

One general aspect includes a computer-implemented method, including: receiving, at a primary assignment system, a first communication from a secondary assignment system, the primary assignment system generating a plurality of access rights to a resource, each access right of the plurality of access rights enabling access to the resource during a defined time period, the first communication corresponding to a request to authenticate access-right data received at a reassignment platform deployed within the secondary assignment system, the access-right data being transmitted to the reassignment platform by a first user operating a first user device, and, prior to the access-right data being transmitted to the reassignment platform, a particular access right of the plurality of access rights being assigned to the first user using an assignment platform. The computer-implemented method also includes determining whether the access-right data received at the reassignment platform is authentic, the determination including querying one or more databases to determine whether the access-right data corresponds to one or more access rights of the plurality of access rights. The computer-implemented method also includes in response to determining that the access-right data is authentic, identifying the access right that corresponds to the access-right data transmitted by the first user device. The computer-implemented method also includes tagging the access right at the primary assignment system, the tagging of the access right indicating that the access-right data is authentic, and the tagging notifying the primary assignment system that the access right is available or will be made available for reassignment on the reassignment platform. The computer-implemented method also includes transmitting a second communication from the primary assignment system to the secondary assignment system, the second communication corresponding to a notification that the access-right data is authentic. The computer-implemented method also includes providing, at the secondary assignment system, the access right on the reassignment platform, the providing including enabling the access right to be queryable by one or more user devices using the reassignment platform, and the providing further including enabling the one or more user devices to transmit requests for reassignment of the access right using the reassignment platform. The computer-implemented method also includes receiving, at the secondary assignment system, a third communication from a second user device operated by a second user, the third communication including request data indicating that the second user requests that the access right be reassigned from the first user to the second user. The computer-implemented method also includes transmitting, by the secondary assignment system, the request data, the request data being received at a data processing system that analyzes the request data for anomalies. The computer-implemented method also includes transmitting, by the secondary assignment system, a fourth communication to the primary assignment system, the fourth communication corresponding to a notification that the second user has satisfied an assignment condition associated with the access right, the assignment condition being associated with a value of the access right. The computer-implemented method also includes automatically broadcasting, by the primary assignment system, a fifth communication to one or more additional secondary assignment systems to which the access right was made available for reassignment, the fifth communication corresponding to a notification to temporarily remove the access right from the additional secondary assignment systems, and the temporary removal of the access right from the one or more additional secondary assignment systems causing the access right to be temporarily inhibited from being queried by user devices using the reassignment platform pending a result of processing the request data by the data processing system. The computer-implemented method also includes receiving, at the secondary assignment system, a sixth communication from the data processing system, the sixth communication corresponding to the result of the analysis of the request data. The computer-implemented method also includes transmitting, at the secondary assignment system, a seventh communication when the result of the analysis indicates that no anomalies were detected by the data processing system, the seventh communication corresponding to an instruction to reassign the access right to the second user. The computer-implemented method also includes in response to receiving the seventh communication at the primary assignment system, reassigning an access code associated with the access right from the first user to the second user. The computer-implemented method also includes generating display data at the primary or secondary assignment system. The computer-implemented method also includes transmitting an eighth communication to the second user device, the eighth communication including the display data, and when the display data is received at the second user device, the display data causes the second user device to display a digital representation of the access right, and the digital representation of the access right enabling the second user to access the resource during the defined time period. Other embodiments of this aspect include corresponding computer systems, apparatus, and computer programs recorded on one or more computer storage devices, each configured to perform the actions of the methods.

One general aspect includes a computer-program product tangibly embodied in a non-transitory machine-readable storage medium, including instructions configured to cause a data processing apparatus to perform operations including: receiving, at a primary assignment system, a first communication from a secondary assignment system, the primary assignment system generating a plurality of access rights to a resource, each access right of the plurality of access rights enabling access to the resource during a defined time period, the first communication corresponding to a request to authenticate access-right data received at a reassignment platform deployed within the secondary assignment system, the access-right data being transmitted to the reassignment platform by a first user operating a first user device, and, prior to the access-right data being transmitted to the reassignment platform, a particular access right of the plurality of access rights being assigned to the first user using an assignment platform. The computer-program product also includes determining whether the access-right data received at the reassignment platform is authentic, the determination including querying one or more databases to determine whether the access-right data corresponds to one or more access rights of the plurality of access rights. The computer-program product also includes in response to determining that the access-right data is authentic, identifying the access right that corresponds to the access-right data transmitted by the first user device. The computer-program product also includes tagging the access right at the primary assignment system, the tagging of the access right indicating that the access-right data is authentic, and the tagging notifying the primary assignment system that the access right is available or will be made available for reassignment on the reassignment platform. The computer-program product also includes transmitting a second communication from the primary assignment system to the secondary assignment system, the second communication corresponding to a notification that the access-right data is authentic. The computer-program product also includes providing, at the secondary assignment system, the access right on the reassignment platform, the providing including enabling the access right to be queryable by one or more user devices using the reassignment platform, and the providing further including enabling the one or more user devices to transmit requests for reassignment of the access right using the reassignment platform. The computer-program product also includes receiving, at the secondary assignment system, a third communication from a second user device operated by a second user, the third communication including request data indicating that the second user requests that the access right be reassigned from the first user to the second user. The computer-program product also includes transmitting, by the secondary assignment system, the request data, the request data being received at a data processing system that analyzes the request data for anomalies. The computer-program product also includes transmitting, by the secondary assignment system, a fourth communication to the primary assignment system, the fourth communication corresponding to a notification that the second user has satisfied an assignment condition associated with the access right, the assignment condition being associated with a value of the access right. The computer-program product also includes automatically broadcasting, by the primary assignment system, a fifth communication to one or more additional secondary assignment systems to which the access right was made available for reassignment, the fifth communication corresponding to a notification to temporarily remove the access right from the additional secondary assignment systems, and the temporary removal of the access right from the one or more additional secondary assignment systems causing the access right to be temporarily inhibited from being queried by user devices using the reassignment platform pending a result of processing the request data by the data processing system. The computer-program product also includes receiving, at the secondary assignment system, a sixth communication from the data processing system, the sixth communication corresponding to the result of the analysis of the request data. The computer-program product also includes transmitting, at the secondary assignment system, a seventh communication when the result of the analysis indicates that no anomalies were detected by the data processing system, the seventh communication corresponding to an instruction to reassign the access right to the second user. The computer-program product also includes in response to receiving the seventh communication at the primary assignment system, reassigning an access code associated with the access right from the first user to the second user. The computer-program product also includes generating display data at the primary or secondary assignment system. The computer-program product also includes transmitting an eighth communication to the second user device, the eighth communication including the display data, and when the display data is received at the second user device, the display data causes the second user device to display a digital representation of the access right, and the digital representation of the access right enabling the second user to access the resource during the defined time period. Other embodiments of this aspect include corresponding computer systems, apparatus, and computer programs recorded on one or more computer storage devices, each configured to perform the actions of the methods.

Embodiments of the present disclosure include systems and methods for providing a network environment in which a primary assignment system (e.g., a primary access-code generator) can issue a plurality of access rights to various resources (hereinafter referred to as primary access rights to the resources). Issuing a primary access right may include generating a unique access code that represents that particular primary access right, and storing the unique access code securely at the primary assignment system. A user can operate a user device to access the assignment platform associated with the primary assignment system, and transmit a request that one or more primary access rights be assigned to that user directly. If the request to assign the one or more primary access rights to the user is granted, then the one or more primary access rights will enable the user to access the corresponding resource for the defined time period. The assignment platform may be an application that is deployed within a network environment of the primary assignment system.

In some implementations, the network environment, in which the primary assignment system operates can also include one or more secondary assignment systems that may be authorized to facilitate the reassignment of previously-assigned access rights between users. As a non-limiting example, a secondary assignment system may be a reassignment platform, which authorized to reassign primary access rights from an original user to a new user. In some implementations, a reassignment platform may be an application that is deployed within the network environment of the secondary assignment system. For example, the reassignment platform may be a website, a web application, or a native application that provides users with functionality to query existing primary access rights that have been made available for reassignment to other users. As a non-limiting example, a user may initially be assigned a primary access right using the assignment platform of the primary assignment system. Subsequently, the user may access the reassignment platform deployed within the secondary assignment system to post or otherwise make the assigned primary access right available to be reassigned to other users. Posting a previously-assigned primary access right to the reassignment platform can include publicly displaying on a webpage an indication that the assigned primary access right is available to be reassigned to any user who satisfies one or more assignment conditions. The assigned primary access rights that are posted for public display on the reassignment platform may be posted by users who have the authority to reassign the primary access right. A user is granted authority to reassign the primary access right arises when the primary access right is assigned to that user (e.g., through the assignment platform deployed in the primary assignment system). It will be appreciated that there are multiple secondary assignment systems, and each secondary assignment system can deploy its own reassignment platform. It is possible for a single primary access right to be made available for reassignment on each of multiple, different reassignment platforms at the same time. Further, it will be appreciated that a secondary assignment system may also serve as a primary assignment system when the secondary assignment system generates, stores, and manages its own unique access-enabling codes for the access rights, and vice versa. Additionally, a primary assignment system may also serve as a secondary assignment system.

In some implementations, the assignment platform and the reassignment platform may operate on a single platform deployed in a cloud-based network.

In view of the network environment described above, a first user (operating a first user device) assumes a certain level of insecurity when accessing a reassignment platform to request that a particular primary access right (that is currently assigned to a second user) be reassigned to the first user. For example, the particular primary access right that is made available for reassignment on the reassignment platform may be an invalid access right (e.g., a fake electronic access right to an event, or one that is not actually assigned to the user who posted the electronic access right). Once reassigned to the first user, an invalid access right would not enable the first user to gain access to the resource during the defined time period. In some cases, a valid primary access right may be posted to the reassignment platform by a user who is not authorized or eligible to post that valid primary access right for reassignment (e.g., a user can improperly post a primary access right that the user does not actually own or that is not actually assigned to the user, and thus, any reassignment of that access right would not grant access to the resource). Accordingly, both invalid primary access rights and valid primary access rights may be improperly posted for reassignment on the reassignment platform, thereby adding to the risky and insecure nature of reassignment platforms. As a non-limiting example, prior to the filing of the present disclosure, users browsing the reassignment platform to request electronic access rights may be at risk of potential anomaly because the reassignment platforms did not execute any mechanisms or protocols that verify the authenticity of the primary access right prior to the posting or making available of the primary access right on the reassignment platform.

To prevent anomalously posted primary access rights, certain embodiments of the present disclosure relate to methods and systems for ensuring that valid primary access rights are posted to reassignment platforms, so that users can trust that the primary access rights they view or browse on the reassignment platforms are not improperly or anomalously posted or invalid. In some implementations, reassignment platforms can access a service provided by the primary assignment systems to verify the authenticity of the primary access right, reissue primary access rights to users, and distribute the reassignment primary access rights to users, such that users can access the reassignment primary access rights using native applications associated with the reassignment platforms.

In some implementations, the systems and methods for ensuring that only authentic primary access rights are made available on reassignment platforms may include providing an Application Programming Interface (API) that can be integrated into the reassignment platforms. As a non-limiting example, a reassignment platform can execute a protocol that uses an API to access a verification service provided by the primary assignment management service. The API can execute one or more calls as part of a workflow that verifies that primary access rights are valid and/or authentic before the primary access rights are made available for reassignment on the reassignment platform. Advantageously, ensuring that each primary access right available for reassignment on the reassignment platform prevents the potential risk of primary access rights being improperly posted and reassigned to users on these reassignment platforms in the first place. As an additional technical advantage, certain embodiments described herein solve the technical problem of insecure reassignment platforms by executing verification protocols that, when executed, perform a workflow for ensuring that the primary access right (sought to be posted on the reassignment platform) is actually valid and/or authentically assigned to the user posting the primary access right before the primary access right is made available publicly to other users for reassignment.

It will be appreciated that the API calls described above and herein are non-limiting examples of processes that comprise a verification workflow. Additionally, it will be appreciated that the present disclosure is not limited to API calls executed by the primary assignment system and/or the secondary assignment system. As a non-limiting example, the present disclosure can be performed using any exposed interface or service (e.g., a Representational State Transfer (REST) service) instead of an API call.

In some implementations, the one or more API calls that can be executed as part of the verification service may include at least four calls: tagging (also referred to as registering) a primary access right that is a target for reassigning to another user, reserving the primary access right on behalf of a user seeking reassignment, reassigning the access right to a user who satisfies an assignment condition, and fulfilling the user with the reassigned access right. Tagging may include flagging or otherwise associating a code with an access right (e.g., in a relational database), such that the code or flag indicates that the access right is available for reassignment on one or more reassignment platforms. It will be appreciated that the present disclosure is not limited to the four calls of registering, reserving, reassigning, and fulfilling. It will also be appreciated that any number of calls may be executed to implement the verification service described above and herein. It will also be appreciated that any subset of the four calls may be selectively executed in any combination or any order to perform the verification service. It will also be appreciated that additional calls, not described herein, may be added to the four calls in any order.

In some implementations, the call of registering may be executed by the secondary assignment system to activate the verification service provided by the primary assignment system. Executing the register call may include verifying that a primary access right is eligible to be resold or posted on a reassignment platform. In some examples, the register call may include transmitting a signal from the secondary assignment system to the primary assignment system, and receiving a response signal at the secondary assignment system from the primary assignment system. In these examples, the transmitted signal may be a request to verify the authenticity of one or more primary access rights that have not yet been made available publicly for reassignment on the reassignment platform, but that are candidates for reassignment to other users; and the response signal may include an indicator representing whether or not the one or more primary access rights are verified as authentic (and/or authentically assigned to the user posting the primary access right). Further, in examples where the primary access right is not eligible to be reassigned to other users on the reassignment platform, executing the register call may include transmitting a notification signal from the primary assignment system to the secondary assignment system. For example, the notification signal may indicate that the primary access right, which was the subject of the register call, is not eligible to be reassigned to other users. In some examples, the primary access right may initially be eligible to be reassigned on the reassignment platform, but later the primary access right may become ineligible to be reassigned on the reassignment platform. In these examples, the primary access right may be initially posted on the reassignment platform, but the verification service constantly and continuously may monitor the eligibility of the primary access right. At a later time, when or if the primary access right becomes ineligible for reassignment to another user, the primary assignment system may transmit a notification signal and/or a removal instruction to the secondary assignment system to remove (e.g., de-list) the primary access right that was made publicly available for reassignment on the reassignment platform.

In some implementations, the register call may be executed at the time of posting the primary access right on the reassignment platform. For example, if a user operates a computing device (e.g., a mobile phone) to transmit a request to the reassignment platform to post a primary access right (e.g., to make the primary access right publicly available for reassignment to other users who access the reassignment platform), at that time (e.g., after receiving the request but before posting the primary access right), the secondary assignment system may execute the register call. When the register call is executed, the secondary assignment system may transmit a signal to the primary assignment system. For example, the signal may include data representing a request to verify the authenticity of the primary access right and/or the eligibility of the primary access right to be reassigned to other users on the reassignment platform. It will be appreciated that the primary access right may be posted on a plurality of different reassignment platforms. For example, a primary access right may be posted on a first reassignment platform operated by a first secondary assignment system, and that same primary access right may be posted on a second reassignment platform operated by a second secondary assignment system. In this example, the first secondary assignment system and the second secondary assignment system may be different entities from each other (e.g., different reassignment platforms operated by different companies). Each time a secondary assignment system receives a request (from a user device) to post a primary access right for reassignment on the associated reassignment platform, the secondary assignment system may execute the register call. Accordingly, the primary assignment system can monitor which reassignment platforms have posted a particular primary access right for reassignment to others.

In some implementations, when a primary access right is initially reassigned to a new user through a reassignment platform, the original user to which the primary access right was originally assigned can be notified and/or alerted (e.g., a notification triggered by a native application executing on the user's mobile device). Further, the original user can also be notified when the primary access right is subsequently posted on another reassignment platform. For example, the primary assignment system may transmit an email to the user's email address. The email may serve as a notification that the primary access right has been posted on another reassignment platform. As another example, the primary assignment system may cause a push notification to be transmitted to the mobile device (e.g., smartphone) operated by the user. In some implementations, the user can be notified and/or alerted when pocket listings have been added to the available access rights to a resource. For example, a pocket listing may be a primary access right that is not known to the general public as being available for reassignment, but that is available to the entity associated with the resource (e.g., a performer, also referred to as resource entity). In some implementations, the email sent to the user's device may include a link that enables the user to remove the primary access right from the other reassignment platform. For example, if the user believes that the subsequent posting of the primary access right was anomalous, then the user may select the link, which causes a signal to be transmitted to the primary assignment system. Then, the primary assignment system may transmit a removal instruction to the other reassignment platforms, which would in effect remove that subsequently posted primary access right from the other reassignment platforms.

In some implementations, a user may operate a computing device to access a reassignment platform. Once connected to the reassignment platform, the user may input through the computing device a unique code (e.g., an identifier, a token, etc.) into an interface associated with the reassignment platform. The token may uniquely correspond to a unique code representing the primary access right to be made available for reassignment on the reassignment platform. However, unlike the corresponding unique code, the token does not enable access to any resource. When the token is inputted into the interface, then the reassignment platform can query one or more databases (potentially a database within the primary assignment system) for additional data representing the primacy access right, which corresponds to the token. Further, at this time, the state of the primary access right can be tracked by the primary assignment system because the primary assignment system received a signal indicating that the primary access right was posted or is intended to be posted to the reassignment platform. The token is distinct from the unique access code that represents the primary access right, in that the unique code enables access to the resource, but the token itself does not. Advantageously, using tokens to register primary access rights (instead of using the unique code of the primary access right) reduces anomalies because the token does not enable access to the resource. As a result, if a token is misappropriated or stolen by a hacker, for example, the token is of no value to the hacker. Additionally, the primary assignment system can manage databases that store the unique associations between unique codes and tokens. In some implementations, the token can include short security number (e.g., 3-digit security code) that can be used for added security if a token is stolen. In some implementations, a token can be used with a distributed trustless ledger to track transactions (e.g., reassignments between users) of the corresponding primary access right. For example, one or more cryptographic techniques, such as hierarchical deterministic cryptography and/or blockchain techniques may be used to facilitate the distributed trustless ledger.

In some implementations, the register call may automatically and concurrently register a plurality of primary access rights to one or more resources. For example, a user who has a set of primary access rights validly assigned to him or her may be associated with a user profile that stores a representation of the set of valid primary access rights. A native application associated with the assignment platform may include an interface that displays the set of valid primary access rights within or in association with the user profile. Further, the user can use the interface of the native application (e.g., by selecting a button or hyperlink) to link his or her user profile to multiple reassignment platforms to concurrently post at least a subset of the set of primary access rights to the multiple reassignment platforms. For example, the user can operate the native application to select a first subset of the set of primary access rights, and then link the first subset of primary access rights to a first reassignment platform. Similarly, the user can operate the native application to select a second subset of the set of primary access rights, and then link the second subset of primary access rights to a second reassignment platform. The user can continue this process, if needed. The first and second subsets may or may not include the same primary access right(s). In this example, the user can select the first and second subsets of primary access rights by tapping the screen of the mobile device at the location of the displayed primary access right to cause the displayed primary access right to be selected. Additionally, in some implementations the user may have previously manually added a hyperlink to each of the multiple reassignment platforms. In some implementations, the native application may be pre-loaded with links to various reassignment platforms. In either case, the user can navigate the native application to indicate that the first subset of primary access rights should be posted to the first reassignment platform, and that the second subset of primary access rights should be posted to the second reassignment platform. As a non-limiting example, the user can drag-and-drop the first subset of primary access rights to a location on the screen that corresponds to the first reassignment platform, and similarly, the user can drag-and-drop the second subset of primary access rights to a location on the screen that corresponds to the second reassignment platform. It will be appreciated that the present disclosure is not limited to dragging and dropping the subsets of primary access rights, and any form of indication may be performed by the user, including a selection by tapping or gesturing. In some implementations, the indication by the user that the first subset of primary access rights is to be posted on the first reassignment platform may automatically cause each of the first subset of primary access rights to be publicly made available for reassignment (e.g., posted) on the first reassignment platform. In some implementations, after the user has indicated that the first subset of primary access rights is to be posted on the first reassignment platform and that the second subset of primary access rights is to be posted on the second reassignment platform, the user can select a link or button that causes each of the first subset and second subset of primary access rights to be automatically and concurrently made available for reassignment to their respective reassignment platforms.

For example, an interface of the reassignment platform can prompt the user to enter a network location (e.g., a website address), one or more user profile identifiers, or other identification data that identifies the network location of the one or more user profiles. Then, the secondary assignment system can automatically access and ingest all of the primary access rights that are associated with the user profile identifiers. The secondary assignment system can register all of the primary access rights that are assigned to the user concurrently or substantially around the same time (e.g., within seconds or minutes of each other). In some implementations, an auto-registration feature of the register call may be provided by the primary assignment system. As a non-limiting example, the auto-registration feature may enable a user to load a native application associated with a reassignment platform. The native application can display an interface that shows that 20 primary access rights are assigned to the user. The user can select any number of the 20 primary access rights, and the secondary assignment system can automatically send the tokens corresponding to the selected primary access rights to the primary assignment system to be verified as part of the verification protocol or service triggered by the register call.

It will be appreciated that a user can merge multiple user profiles (each profile being associated with one or more primary access rights) into a single application to validate the primary access rights before making the primary access rights available for reassignment on the reassignment platform. For example, the user may be able to add and validate credentials for multiple user profiles (or accounts) to manage the total number of primary access rights that are assigned to that user in a single application. It will also be appreciated that the single application (deployed by an assignment platform or a reassignment platform) may provide an interface on a website or a native application that enables a user to select multiple reassignment platforms to which the user's assigned primary access rights are to be posted for reassignment. In some implementations, the access-right reassignor can also control the reassignment condition(s) (e.g., value) that apply to the primary access rights individually for each reassignment platform. It will also be appreciated that the single application can enable a user to select a button that, when selected, causes the secondary assignment system to automatically generate a request for reassignment for one or more primary access rights. In some implementations, the assignment condition associated with the automatically generated request for reassignment may be determined by evaluating assignment conditions of other primary access rights (similar or not similar to the primary access right selected for reassignment) using one or more algorithms, such as an averaging algorithm that averages all of values associated with similar primary access rights posted on reassignment platforms, a weighting algorithm that weights primary access rights according to certain conditions, such as a higher weight applied to the values of certain primary access rights posted to a certain reassignment platform and a lower weight applied to values of primary access rights posted to other reassignment platforms, or any other suitable technique for evaluating the assignment conditions of primary access rights that are already posted to reassignment platforms. Upon acceptance of the request by the user, the primary access right selected for reassignment would be automatically reassigned to the secondary assignment system (and not another user because the request for reassignment was automatically generated and not generated by another user). The reassigned primary access right can then be automatically posted again for reassignment on a reassignment platform by the secondary assignment system. The reassigned primary access right can be re-posted to a reassignment platform, but with an updated assignment condition (e.g., a higher value than the value at which the initial reassignment occurred). In some implementations, posting a primary access right with an assignment condition on a reassignment platform can include displaying information representing the primary access right (e.g., a location of the primary access right, such as a seat), including information representing the assignment conditions, such as a value or price of the primary access right.

In some implementations, the information describing the parameters of the primary access right can be inputted by the user accessing an interface of the reassignment platform. For example, the user can be prompted to enter the information into one or more input fields to validate the primary access right and avoid anomaly before the primary access right is made available for reassignment to other users. The reassignment platform can transmit the received information to the primary assignment system, which can then compare the received information from the one or more input fields to generate an authenticity parameter (e.g., a confidence score). If the authenticity parameter is above a defined threshold, then the primary access right can be registered. In some implementations, the authenticity parameter can be computed by evaluating a likelihood that the received information corresponds to a valid primary access right. As a non-limiting example, the interface of the reassignment platform may include 5 input fields-one for location of the primary access right, one for the resource to which the primary access right grants access, one for a defined time period or date during which the resource is accessible using the primary access right, one for spatial area associated with the resource, and one for an entity associated with the resource. If at least 3 of the 5 items of data correspond to a valid primary access right, then the primary access right can be registered. Advantageously, these implementations allow the user more flexibility with inputting information into an interface of a reassignment platform (e.g., some information that the user inputs about the primary access right may be incorrect, and the primary access right can still be registered).

In some implementations, a user may load a native application associated with the reassignment platform on the user's mobile device (e.g., smartphone). The native application can be configured to register a primary access right by prompting the user to capture an image or video stream (using a camera embedded in the mobile device) of a physical manifestation of the primary access right (e.g., a physical manifestation of an access right). For example, when a primary access right is scanned using the user's smartphone camera, the primary access right information shown on the physical manifestation of the primary access right can be extracted as a feature of the image or video stream. The primary access right information can then be registered at the primary assignment system (as being available for reassignment on a reassignment platform) and posted on a reassignment platform. For example, the image or the video feed of the primary access right may be analyzed by the native application or by a server in a cloud-based network associated with the native application to evaluate the image or video feed for text data (e.g., text included on the physical manifestation of the primary access right, etc.). In some implementations, a feature (e.g., special symbol, string of characters, or code) can be detected from the image or video feed. The feature can uniquely correspond to access-right information stored at the primary assignment system. If the feature is detected, then the native application associated with the reassignment platform can retrieve the access-right information (from the primary assignment system) for the access right that corresponds to the detected feature. In some implementations, a secret key mapping can be used to register an access right. For example, a user can load his or her smartphone's video camera and capture a video of the front and back of a physical manifestation of an electronic access right, such as a piece of paper on which a code is printed (hereinafter referred to as a physical access right). The front and back of the physical access right can be a key that represents the access-right information. Different physical access rights have slightly different fronts and backs sides, and the specific combination of the front side and back side of a particular physical access right can be a unique key that represents that access right. When the native application receives the image or video feed, the native application can detect the front and back of the physical access right, and then the native application can use the key to access the access right information for that access right, which may be stored in databases of the primary assignment system. Advantageously, the user does not have to input any information about the access right, but instead the mere capturing of an image or video feed of the physical access right is sufficient to trigger the register call to verify the authenticity of an access right.

In some implementations, the one or more API calls may include a reserve API call that is executed at a time after the register call has been executed. The reserve API call may cause one or more of the registered access rights to be reserved for request. In some implementations, the reserve API call reserves the one or more registered access rights after a request for the one or more access rights is submitted by an access-right requestor. As a non-limiting example and for the purpose of illustration, if an access-right requestor wants to request an access right that is posted on a reassignment platform, the access-right requestor may select the access right on an interface of the reassignment platform and add the selected access right to the access-right requestor's digital obtainment queue (e.g., online cart). However, in these implementations, adding an access right to the access-right requestor's digital obtainment queue does not trigger the reserve call to reserve the access right by preventing other users from requesting that same access right. Instead, in these implementations, the reassignment platform only executes the reserve call after or at the substantially same time the access-right requestor inputs his or her information into the interface and then selects the "Submit" button to submit the request. After the request is submitted, the secondary assignment system transmits the request or a reassignment notification to the primary assignment system. Concurrently or at a similar time, the secondary assignment system transmits a request to a data processing system to perform an anomaly check on the requested information that was submitted by the access-right requestor. In some implementations, the primary assignment system (rather than the secondary assignment system) transmits the request to the data processing system. When the primary assignment system receives the reassignment notification from the secondary assignment system, the primary assignment system may broadcast a remove notification or instruction to each of the secondary assignment systems on which that particular access right was posted. In some cases, the primary assignment system transmits the removal notification to the secondary assignment system, which originally received the request, so that the access right posting can be removed from the corresponding reassignment platform. Further, in some implementations, the removal notification can be broadcasted to any and all secondary assignment systems at which the particular access right was posted for reassignment.

In some implementations, reserving the access right may temporarily prevent other users from requesting that same access right. For example, when the removal notification is received at a secondary assignment system, the received removal notification may cause the secondary assignment system to automatically remove or delete the access right posting from the access rights available for reassignment.

In some implementations, the access right that was the basis of the access right request can be reserved for a static time duration. As a non-limiting example, the access right may be reserved for 10 minutes. In this example, reserving the access right for 10 minutes means that the removal notification transmitted by the primary assignment system includes an instruction to temporarily remove the access right posting for 10 minutes, so that for a 10 minute period, no other users can request that access right. It will be appreciated that an access right may be reserved for any amount of time. In some implementations, the access right that was the basis of the access right request can be reserved for a dynamic amount of time. For example, the primary assignment system can dynamically customize a reserve time (e.g., how long the access right is reserved pending an anomaly check), or customize where in the transaction flow the reserve occurs, based on one or more factors that relate to the likelihood the user is a human user (as opposed to a bot user). For example, the primary assignment system can evaluate a series of factors, such as access right demand, time to event, request probability of the user, the user's previous requests, the user's social media account and/or social media influence, the user's contact information (e.g., whether the email address is real or fake, the phone number, and the like) and other suitable data points, to determine how long to allow the potential access-right requestor to reserve the access right before completing the request process for the access right. As a non-limiting example, if evaluating the one or more factors indicates that the potential access-right requestor is likely a human user and/or is likely a true user of Def Leppard, then that user gets a longer reserve time to make a decision as to whether or not to request Def Leppard access rights. It will be appreciated that the reserve API call may be executed at any time with respect to the remaining three API calls (i.e., register, reassign, and fulfill), and that the present disclosure is not limited to the reserve call being executed after the register call and before the reassign call.

It will be appreciated that the present disclosure is not limited to an anomaly check being performed during the reservation time. For example, any other type of identify processing, such as confirming the access-right requestor's identify, may be performed in addition to or in lieu of the anomaly check. It will also be appreciated that the primary assignment system can automate user communication strategies to users based on a historical analysis of the users' request probability or request history. It will also be appreciated that, in some implementations, a primary or secondary assignment system can tokenize user data to anonymize the user to share the user data with other secondary assignment systems. For example, Bob's Platform may request communication certain rights to a user, but John's Platform has access to the user data of that user (e.g., the user uses John's Platform). John's Platform cannot share that user data in a manner that can be used to identify the corresponding user (especially if that user data includes personally-identifiable information). To address this scenario, the user's user data can be tokenized (e.g., a hash function can be performed to generate a hash value corresponding to the user data) so the tokenized user data can be shared between secondary assignment systems without specifically identifying the user.

In some implementations, the one or more API calls may include a reassign call. The reassign call may reassign a reserved access right (e.g., reserved as a result of the reserve API call described above, unassigned, not yet requested, or the request process for that access right has not yet completed entirely) to an access-right requestor. For example, after the reserve call is executed as described above but before the access right is reassigned to the access-right requestor, an anomaly check is performed on the access-right requestor's information. During this time that the anomaly check is being performed, the access right has not officially been assigned or reassigned to the access-right requestor because the anomaly check results have not been returned yet, however, the access right is reserved for the access-right requestor in that the access right posting has been temporarily removed from all of the reassignment platforms. After the anomaly check has been completed, then the requested access right can be reassigned to the access-right requestor. In some implementations, reassigning the reserved access right to the access-right requestor may include providing the access-right requestor's details for display on the access right, storing the access-right requestor's details in a database at the primary and/or secondary assignment systems (such that the access-right requestor's details are stored in association with the requested access right), and/or other suitable indications of reassigning of an access right to an access-right requestor.

In some implementations, the one or more API calls may include a fulfill call. The fulfill call may be executed by the secondary assignment system (on which the access right was requested by the access-right requestor) to obtain a scan artifact for a previously reassigned request. The scan artifact may include a digital representation of a requested and valid access right, such that the digital representation can be scanned by an agent device at the spatial area associated with the resource (e.g., event) to facilitate accessing the resource. For example, after the requested access right has been reassigned to the access-right requestor, as described above, the primary assignment system may transmit the access code (e.g., access right identifier in cases of code-less entry, and the like) of the requested access right to the secondary assignment system on which the access right was requested. Upon receiving the access code for the requested access right, the secondary assignment system can generate digital access right data that represents the digital access right associated with the requested access right. The secondary assignment system can then transmit the digital access right data to the access-right requestor's computing device (e.g., smartphone, tablet, laptop, desktop, etc.). When the digital access right data is received at the access-right requestor's computing device, the access-right requestor's computing device can render the digital access right data to display the digital access right for the requested access right. When the access-right requestor reaches the event (or at any time), the native application associated with the secondary assignment system may be loaded on the access-right requestor's computing device, and the native application can render the digital access right data to display the access right. The displayed access right may or may not include the access code. In some examples, if the spatial area or agent device is capable of communicating wirelessly over short-range communication channels (e.g., RFID, Bluetooth, Zigbee, etc.), then the access code may be a code that is stored in the access-right requestor's computing device and not displayed on the digital access right. In this example, the access device (e.g., a scanner or agent device at a spatial location of the resource) can wirelessly query the computing device (e.g., using near-field communication (NFC) signals) to retrieve the access code. In some examples, the digital access right may display the unique code on the digital access right so that the access device at the spatial area can scan the unique code. It will be appreciated that the primary assignment system may transmit the token ID for the access right instead of the access code of the access right. This implementation enables the benefit of protecting against the misuse of access codes by transmitting the token IDs instead, which do not facilitate entry to the event.

In some implementations, the secondary assignment system can design the digital access right in any manner, however, the access code is determined by the primary assignment system. In some implementations, the primary assignment system can define the design of the digital access right (e.g., the look of the access right displayed on the device with logos or not, etc.), and the secondary assignment system can simply render the digital access right (as defined by the primary assignment system) in the native application.

In some implementations, the native application of the secondary assignment system can access a platform to synchronize the digital access right with the user who is accessing the resource. The platform is described in greater detail in U.S. Provisional Patent Application No. 62/355,160, filed on Jun. 27, 2016; U.S. Ser. No. 15/634,578, filed Jun. 27, 2017; and U.S. Provisional Patent Application No. 62/508,921, filed on May 19, 2017, the disclosures of each of which are incorporated by reference herein in their entirety for all purposes. Advantageously, the platform can monitor and track the users who are access a resource, even though some users may not have requested their access rights on the assignment platform, but rather, they requested their access rights on an independently operated reassignment platform. Generally, while the primary assignment system may know the identity of the user who requested an access right, the primary assignment system may not have access to the identity of the user who actually accessed the resource during the defined time period that the resource was available for accessing. The platform (deployed in a network environment) enables the primary assignment system to identify the users, potentially evaluate their historical access right requests and/or track their future access right requests.

In some implementations, the primary assignment system and/or the platform can provide an API and/or Software Development Kit (SDK) to the secondary assignment systems. The API or SDK can facilitate multiple different entry protocols for the secondary assignment systems. The secondary assignment systems can choose to incorporate one or more of the multiple entry protocols into their respective native applications. Each entry protocol may securely communicate with the primary assignment system. As a non-limiting example, a secondary assignment system may be Bob's Platform. Bob's Platform may choose to integrate the entry protocol of facial recognition from the API or SDK into its native application. For example, facial recognition functions could provide an experience where a user captures an image of himself or herself using a mobile device and the primary assignment system stores that image. The primary assignment system may recognize that the Bob's Platform native application is integrated with the facial recognition functions. Thus, users who request access rights using the Bob's Platform native application may be allowed to access resources using facial recognition technologies. In this example, when the user access the resource, an image or video feed of the user can be captured by cameras, and that image or video data may be transmitted to the primary assignment system for processing (e.g., comparing against the previously-captured image of the user). However, another secondary assignment system called John's Platform may choose to incorporate an entirely different entry protocol (e.g., standard entry by code scanning) for users who request access rights from John's Platform.

The primary assignment system may perform tasks or processes to facilitate the assignment or management of primary and/or secondary access rights. In some implementations, the primary assignment system may track users across multiple platforms using a single identifier. For example, a secondary assignment system may generate unique identifiers for each who has signed up for an account. As a non-limiting example and for the purpose of illustration only, Bob's Platform may generate a unique identifier of ABC to uniquely represent the specific user, Shelly Smith, and John's Platform may generate a unique identifier of XYZ to uniquely represent that same user, Shelly Smith. The primary assignment system can evaluate the unique identifiers generated by each of Bob's Platform and John's Platform to determine that the ABC identifier matches the XYZ identifier. For example, the primary assignment system may evaluate the various unique identifiers using name or email matching (or other suitable matching techniques) to determine that the identifiers ABC and XYZ each correspond to the same user, Shelly Smith. Then, the primary assignment system can generate a universal identifier for Shelly Smith. As a non-limiting example, the primary assignment system may perform a hash function on the combined identifiers of ABC-XYZ to generate the universal identifier, although any identifier generation technique may be used generate the universal identifier. Advantageously, the primary assignment system can then track the behavior of Shelly Smith across multiple secondary assignment systems, and store that tracked behavior under the universal identifier for Shelly Smith. It will be appreciated that the primary assignment systems can track a user's requests on secondary assignment systems, and store those requests as contextual data in the platform as data points for that user's universal identifier. The data points can be evaluated at a later time for various reasons, including for distributing benefits. The data points may also be used for other purposes based on either directly or indirectly related resources.

In some implementations, the primary assignment system may provide a data exchange that includes an interface or data delivery mechanism that presents real-time user-request patterns across various secondary assignment systems at a micro and macro level. For example, at the macro level, the data exchange may evaluate user-request patterns across multiple secondary assignment systems to identify trends within the behavior patterns. At the micro level, the data exchange may enable the request behavior patterns associated with specific users, for example, to be evaluated by users of the data exchange. Advantageously, the data exchange may provide a real-time analysis of a constantly-evolving world of access rights being sold and requested at any given time. It will be appreciated that the data exchange can be provided to users, for example, who may want to know which access right is being distributed to secondary assignment systems, and to which secondary assignment systems that access right is being posted. This data could be anonymized data, for example, the exchange could show users generally which secondary assignment systems are actively reassigning access rights, and which secondary assignment systems are not reassigning much of the available access rights. It will be appreciated that the data exchange can be configured to provide a secondary assignment system with more data on users as that secondary assignment system gives more data about users to the data exchange. For example, the data provided can be priced in an auction style. If a secondary assignment system gives data on users to the data exchange, then that secondary assignment system has the ability to receive data about users. For example, the data that the secondary assignment management can give to the data exchange may include, but is not limited to, reassignments data, user-request patterns, and the like, whereas, the data that the secondary assignment system can receive may include data that indicates on which secondary assignment systems the users are posting their access rights for reassignment, the original assigning platform of those access rights, and so on. In some implementations, the data provided to and received from the data exchange may include anomaly analytics, bot patterns, etc. The data can then be shared between secondary assignment systems.

In some implementations, the primary assignment system can be configured to generate reports for users. For example, the report may include reassignments data for each secondary assignment system, but importantly, the report may provide analytics data overlaid on top of the reassignments data. For example, for a particular resource entity, the report may show that 30 percent of access rights to an event were sold on Bob's Platform, and 45 percent of the access rights were sold on John's Platform. In some cases, the analytics data can be pulled from the platform. To illustrate, the report may present the analytics data indicating that users who requested access rights using Bob's Platform have a higher propensity to go to the event, but users who requested access rights using John's Platform are more likely to reassign their access right. As another example, the analytics data may indicate that users who requested access rights using Bob's Platform are more likely to satisfy assignment conditions for access rights, and users who requested access rights using John's Platform typically do not satisfy assignment conditions to complete an assignment or reassignment of access rights.

In some implementations, the primary assignment system may provide a centralized hub at the platform that collects all access right transactions involving primary access rights across multiple secondary assignment systems. For example, the centralized hub can evaluate the collected data to present or report where the primary access rights were requested (e.g., on which reassignment platform), to whom the access rights were sold, and at which price the access right was sold. The primary assignment system may collect this data from secondary assignment systems that post primary access rights for reassignment on their respective online platforms.

It will be appreciated that any time a unique code or posted token is transacted upon (e.g. listed, transferred, posted, reissued, de-listed, rendered, entered, etc.), a data point is received to the primary assignment system from the transactor (e.g., an entity initiating a transaction), which could be the assignment platform or the reassignment platform sending the information via an API call to the primary assignment system. The system connects multiple network environments (e.g., first or third-party platforms) via API calls and sends data via a data stream or call. The data can then be stored in a database to be processed.

In some implementations, the primary assignment system can be configured to provide the ability for Bob's Platform to determine on which other reassignment platforms its access rights were listed. For example, if an access right was requested on Bob's Platform, but then subsequently posted on John's Platform, an operator of Bob's Platform may be able to evaluate the information that the access right was subsequently posted on John's Platform. The primary assignment system can track the various listings on various reassignment platforms to generate this information for Bob's Platform. In some implementations, a primary or secondary assignment system can ping other secondary assignment systems to check for better access right locations for a user who is validly assigned an access right.

In some implementations, the primary assignment system can enable users to decide how they would like users to enter for events. For example, a user can define preferences with the primary assignment system for users to walk through gates with facial recognition. However, one of the restrictions would be paper access rights because paper access rights disallow the primary assignment system from re-issuing access rights. Advantageously, the primary assignment system can enable any number of entry modalities concurrently and in real time. For example, a user can choose whichever available entry method the user prefers (e.g., use NFC to detect access code stored on smartphone, or walk in to the spatial area with facial recognition). Once an entry modality is used, all other entry modalities for that user are invalidated.

In some implementations, the primary assignment system may be configured to transform physical access rights into digital form. In some cases, the physical access right can be transformed into digital form to register the access right (e.g., referring back to the register call described above). In some cases, the physical access right can be transformed or converted to digital form to enhance accessibility for the user. Upon reassignment of the access right, the primary assignment system can invalidate the physical access right and reissue a digital code that uniquely represents the converted access right.

In some implementations, the primary assignment system may provide a user-to-user platform for exchanging access rights. As a non-limiting example, if a user has access rights to a first resource, but at the last minute (e.g., before the defined time period at which the first resource is available for accessing) the user wants to access a second resource, the user can turn in his or her access right to the first resource and automatically exchange for the access right to the second resource on the user-to-user platform for access right exchange.

In some implementations, methods may be provided that enable users to complete an access right transaction using NFC by bumping their smartphones together. For example, an access-right reassignor may operate a first phone running a first native application. The first phone may store a digital access right to an event. An access-right requestor may be operating a second phone running a second native application. If the first phone bumps the second phone using NFC, the digital access right may be transferred from the access-right reassignor to the access-right requestor (and technically, from the first phone to the second phone using NFC). Advantageously, the access right transaction may be completed even through the first and second phones are each running different native applications (e.g., different reassignment platform applications).

In some implementations, the primary assignment system can facilitate access right processing using physical access rights. For example, a user can validate a physical access right from an access-right reassignor (authorized or unauthorized to reassign access rights). The access-right reassignor can capture an image of the physical access right to convert the access right into a digital access right, and then show the user that the digital access right is valid. The access-right reassignor can then reassign the access right to the user using NFC techniques by bumping the access-right reassignor's phone to the user's phone.

In some implementations, the primary assignment system can evaluate the validity of an access right to determine if the access right is a fake or not based on a secret key mapping between the front and the back of the access right. For example, a user can capture a video feed of the access right using the user's smartphone camera. While the camera is capturing the video feed of the access right, the user can show the front of the access right and the back of the access right to the camera. The video feed can be transmitted to the primary assignment system for further analysis and processing. The primary assignment system can evaluate the video feed to identify the access right, and then access a secret key mapping for that access right. A set of secret key mappings may be previously defined and stored at the primary assignment system. For example, each access right can uniquely correspond to a specific mapping between the front of the access right and the back of the access right. To illustrate, the front of an access right can include a symbol, and the back of the access right can include a different symbol. The symbol on the front and the symbol on the back can represent key that uniquely represents that particular access right (i.e., no other access right may correspond to the mapping between the symbol on the front and the different symbol on the back). If the access right is anomalously copied, for example, if the access code of a valid access right is printed onto an invalid physical access right, the primary assignment system can identify the invalid physical access right because the front and back of the invalid physical access right would not include the key that corresponds to the access right, even though the unique code printed on the invalid physical access right may be valid.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
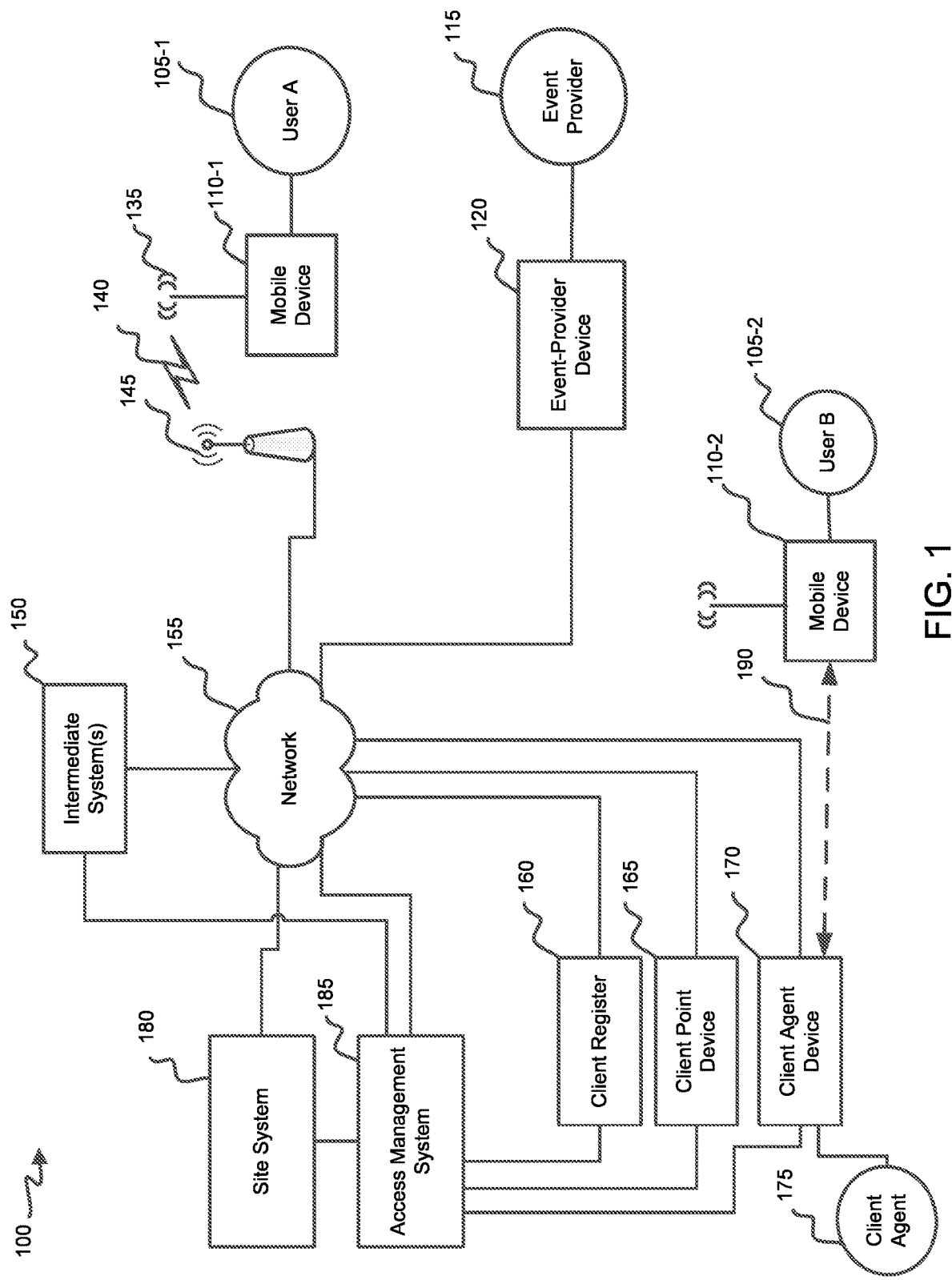
FIG. 1 depicts a block diagram of an embodiment of a resource access-facilitating interaction system.

FIG. 1 depicts a block diagram of an embodiment of a resource management system 100, according to an embodiment of the present disclosure. Mobile device 110 (which can be operated by a user 105) and an event-provider device 120 (which can be operated, controlled, or used by an event provider 115) can communicate with an access management system 185 directly or via another system (e.g., via an intermediate system 150). Mobile device 110 may transmit data to access point 145, which is connected to network 155, over communication channel 140 using antennae 135. While FIG. 1 illustrates mobile device 110 communicating with access point 145 using a wireless connection (e.g., communication channel 140), in some embodiments, mobile device 110 may also communicate with access point 145 using a wired connection (e.g., an Ethernet connection). Mobile device 110 can also communicate with one or more client devices, such as a client agent device 170 operated by a client agent 175, a client register 160 or a client point device 165 using a wired or wireless connection. In addition, using the access management system 185, an event provider 115 can identify an event, a parameter of attending the event, a date or dates of the event, a location or locations of the event, etc. Each inter-system communication can occur over one or more networks 155 and can facilitate transmission of a variety of types of data. It will be understood that, although only one of various systems, devices, entities and network are shown, the resource management system 100 can be extended to include multiple of any given system(s), device(s), entity(ies), and/or networks.

Access management system 185 can be configured to manage a dynamic set of access rights to one or more resources. More specifically, access management system 185 can track which resources are to be made available to users, specifications of the resources and times at which they will be available. Access management system 185 can also allocate access rights for resources and facilitate transmissions of notifications of the available rights to a set of user devices. For example, access management system 185 can alert users of the availability via a website, app page or email. As another example, access management system can transmit data about access rights and resources to one or more intermediate systems 150, which can facilitate distribution of access-right availability and processing of requests for such rights.

Notifications of available access rights can be accompanied by options to request that one or more access rights be assigned to a user. Therefore, user 105 can provide input to mobile device 110 via an interface to request such assignment and provide other pertinent information. Intermediate system 150 and/or access management system 185 can process the request to ensure that the requested access right(s) remain available and that all required information has been received and, in some instances, verified. Thereafter, access management system 185 can assign one or more access rights to the user, e.g., matching the access rights requested by the user.

Assigning an access right can include, for example, associating an identifier of the right with an identifier of a user, changing a status of the right from available to assigned, facilitating a cease in notifications that the access right is available, generating an access-enabling code to use such that the corresponding access will be permitted and/or generating a notification to be received at mobile device 110 confirming the assignment and/or including data required for corresponding access to be permitted.

In some instances, a resource is at least partly controlled, by a client. The resource may be accessed at a particular location or structure, and a variety of client devices may be present at the location so as to facilitate usage of an access right. Exemplary client devices can include client agent device 170, which can be one operated by a client agent 175 (e.g., a human client agent), a client register 160 (e.g., which can operate independently of an agent and/or can be connected to or include a device that, while in a locked mode, can impede resource access, such as a turnstile) and client point device 165 (e.g., which can operate independently of an agent and/or can be positioned at or around the resource-associated location. For example, in some instances client agent device 170 can be operated by an agent at a location for a resource that is an event ("event resource") taking place at the location. In this example, client agent device 170 is used by an agent that is manning an entrance to the location (e.g., which can include, for example, a location of a structure or a geographic region) or a part thereof; client register 160 can be or can be connected to a turnstile, gate or lockable door that is positioned along a perimeter or entrance to a resource-associated location or part thereof; and client point device 165 can be an electronic device positioned at or within a resource-associated location.

In some instances, mobile device 110 performs particular functions upon detecting a client device and/or the contrary. For example, mobile device 110 may locally retrieve or request (e.g., from an external source) an access-enabling code. The access-enabling code can be transmitted to the client device or a remote server (e.g., a server hosting access management system 185) for evaluation and/or can be locally evaluated. The evaluation can include, for example, confirming that the access-enabling code has a particular characteristic or format (e.g., generally or one characteristic corresponding to a particular resource or type of access), matches one in an access-enabling code data store and/or has not been previously redeemed. A result of the evaluation can be locally displayed at an evaluating device, can control a device component (e.g., a physical access control module), and/or can be transmitted to another device, such as mobile device 110.

In some instances, user 105 can use multiple mobile devices 110 to perform various operations (e.g., using one device to request an access right and another to interact with client devices). Some instances of mobile device 110, access management system 185, intermediate system 150, client agent device 170, client register 160 and/or client point device 165 can include a portable electronic device (e.g., a smart phone, tablet, laptop computer or smart wearable device) or a non-portable electronic device (e.g., one or more desktop computers, servers and/or processors).

In exemplary embodiments, access rights can be represented in data maintained at a client device or at access management system 185. For example, a database or data store include a list of identifiers for each user or user device having an assigned access right for a resource or associating an identifier for each user or user device with an identifier of a particular access right. In some instances, indicia can be transmitted to a user device that indicates that an access right is availed. In various instances, it may be permitted or prohibited for the indicia to be transferred. The indicia may be provided as part of an electronic or physical object (e.g., a right to access an event) or independently. The indicia may include an access-enabling code.

In some instances, access management system 185 communicates with one or more intermediate systems 150, each of which may be controlled by a different entity as compared to an entity controlling access management system 185. For example, access management system 185 may assign access rights to intermediate systems 150 (e.g., upon acceptance of terms). Intermediate system 150 can then collect data pertaining to the assigned access rights and/or a corresponding event, can format and/or edit the data, generate a notification of availability of the access rights that includes the formatted and/or edited data and facilitate presentation of the notification at a mobile device 110. When intermediate system 150 receives a communication from the mobile device 110 indicative of an access-right request, intermediate system 150 can facilitate assignment (or reassignment) of an access right to the user (e.g., by transmitting relevant information to access management system 185 identifying the user and/or user device and/or by transmitting relevant information to mobile device 110 pertaining to the access right).

A resource can include one managed or provided by a client, such as a performing entity or an entity operating a venue. A mobile device 110 can transmit data corresponding to the access right (e.g., an access-enabling code) to a client device upon, for example, detecting the client device, detecting that a location of the mobile device 110 is within a prescribed geographical region, or detecting particular input. The receiving client device may include, for example, a client agent device 170 operated at an entrance of a defined geographical location or a client register 160 that includes or is attached to a locking turnstile. The client device can then analyze the code to confirm its validity and applicability for a particular resource and/or access type, and admittance to the event can be accordingly permitted. For example, a turnstile may change from a locked to an unlocked mode upon confirmation of the code's validity and applicability.

Each of the depicted devices and/or systems may include a software agent or application ("app") that, when executed, performs one or more actions as described herein. In some instances, a software agent or app on one device is, at least in part, complementary to a software agent or app on another device (e.g., such that a software agent or app on mobile device 110 is, at least in part, complementary to at least part of one on access management system 185 and/or a client device; and/or such that a software agent or app on intermediate system 150 is, at least in part, complementary to at least part of one on access management system 185).

In some instances, a network in the one or more networks 155 can include an open network, such as the Internet, personal area network, local area network (LAN), campus area network (CAN), metropolitan area network (MAN), wide area network (WAN), wireless local area network (WLAN), a private network, such as an intranet, extranet, or other backbone. In some instances, a network in the one or more networks 155 includes a short-range communication channel, such as Bluetooth or Bluetooth Low Energy channel. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications.

In one embodiment, communications between two or more systems and/or devices can be achieved by a secure communications protocol, such as secure sockets layer (SSL), transport layer security (TLS). In addition, data and/or transactional details may be encrypted based on any convenient, known, or to be developed manner, such as, but not limited to, DES, Triple DES, RSA, Blowfish, Advanced Encryption Standard (AES), CAST-128, CAST-256, Decorrelated Fast Cipher (DFC), Tiny Encryption Algorithm (TEA), extended TEA (XTEA), Corrected Block TEA (XX-TEA), and/or RC5, etc.

It will be appreciated that, while a variety of devices and systems are shown in FIG. 1, in some instances, resource management system 100 can include fewer devices and/or systems. Further, some systems and/or devices can be combined. For example, a client agent device 170 may also serve as an access management system 185 or intermediate system 150 so as to as to facilitate assignment of access rights.

As described in further detail herein, an interaction between mobile device 110 and a client device (e.g., client agent device 170, client register 160 or client point device 165) can facilitate, for example, verification that user 105 has a valid and applicable access right, obtaining an assignment of an access right, and/or obtaining an assignment of an upgraded access right.

In addition, mobile device 110-2, which is operated by user 125-2, may include a user device that is located at a spatial area associated with a resource. Mobile device 110-2 may directly interact with a client device (e.g., client agent device 170, client register 160 or client point device 165), which is also located at the spatial area during the time period which the resource is available for accessing. As such, the access management system 185 may be updated or accessed by mobile device 110-2 via the client agent device 170. For example, mobile device 110-2 may communicate with the client agent device 170 over a short-range communication channel 190, such as Bluetooth or Bluetooth Low Energy channel, Near Field Communication (NFC), Wi-Fi, RFID, Zigbee, ANT, etc. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications. After the short-range communication link 190 is established, mobile device 110-2 may communicate with the access management system 185 and access the item or items of resources. That is, while mobile device B is configured to communicate over network 155, mobile device 110-2 may communicate with the access management system 185 via the client agent device 170, instead of the network 155.

It will be appreciated that various parts of system 100 can be geographically separated. It will further be appreciated that system 100 can include a different number of various components rather than a number depicted in FIG. 1. For example, two or more of access assignment systems 185; one or more site systems 180; and intermediate system 150 may be located in different geographic locations (e.g., different cities, states or countries).

Figure 2:
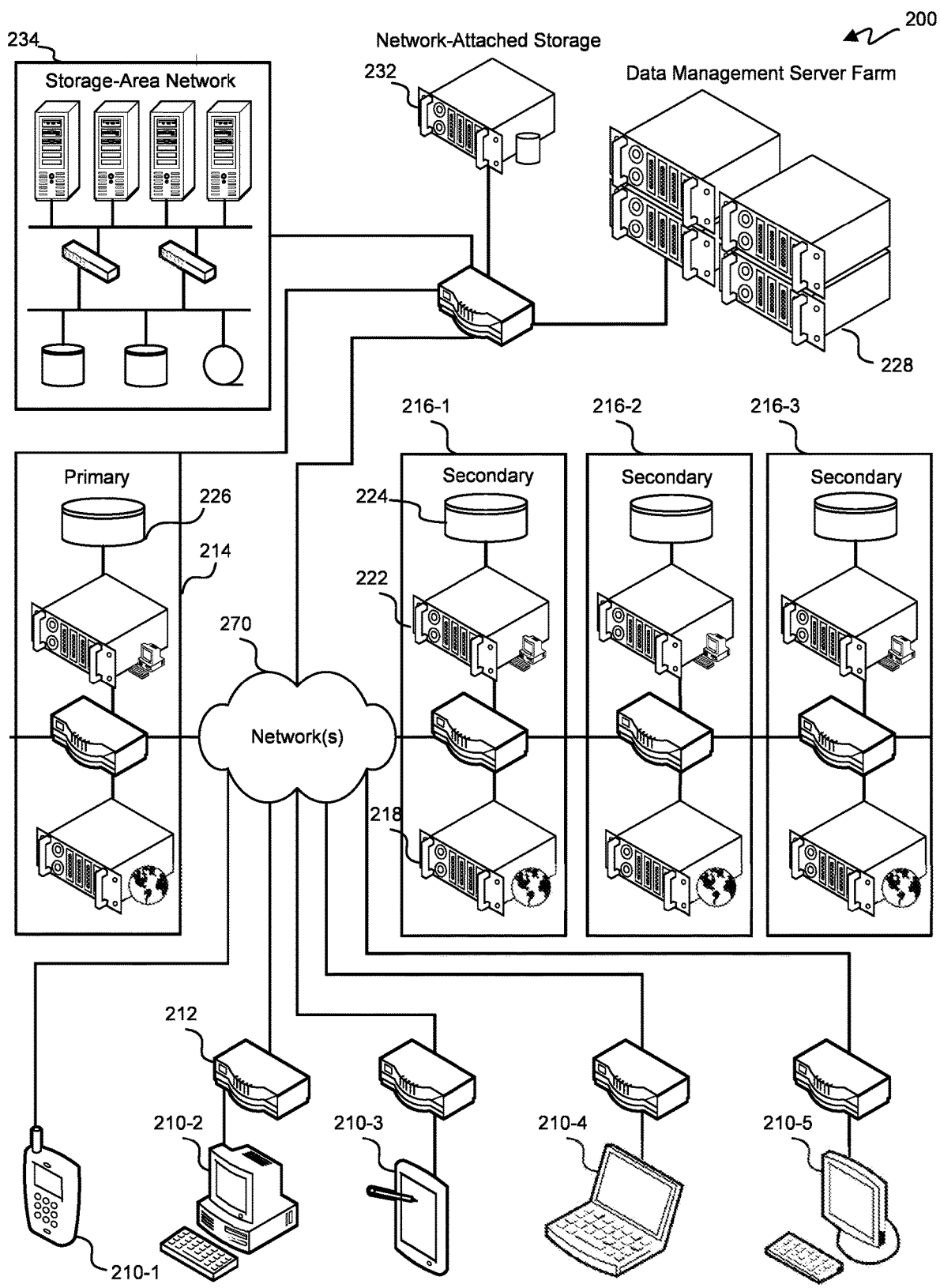
FIG. 2 shows an illustration of hardware and network connections of a resource access-facilitating interaction system according to an embodiment of the invention.

FIG. 2 shows an illustration of hardware and network connections of a resource access-facilitating interaction system 200 according to an embodiment of the invention. Each of various user devices 210-1, 210-2, 210-3, 210-4 and 210-5 can connect, via one or more inter-network connection components (e.g., a router 212) and one or more networks 270 to a primary assignment system 214 (e.g., a primary access right issuer) or a secondary assignment system 216-1, 216-2 or 216-3 (e.g., reassignment platforms, secondary platforms, third party platforms, verified access-right reassignors, private individuals who are reassigning access rights, and other suitable systems).

Primary assignment system 214 can be configured to coordinate and/or control initial assignment of access rights. Secondary assignment system 216 can be configured to coordinate and/or control reassignment and/or transfer of access rights (e.g., from one user or user device to another or from an intermediate agent to a user or user device). Such transfer may occur as a result of a reassignment. Secondary assignment system 216 may also manage transfer offers (e.g., to allow a first user to identify a price at which a transfer request would be granted and to detect if a valid request is received). It will be appreciated that, although primary assignment system 214 is shown to be separate from each secondary assignment system 216, in some instances, an assignment management system may relate to both a primary and secondary channel, and a single data store or a localized cluster of data stores may include data from both channels.

Each of primary access assignment system 214 and secondary access assignment system 216 can include a web server 218 that processes and responds to HTTP requests. Web server 218 can retrieve and deliver web-page data to a user device 210 that, for example, identify a resource, identify a characteristic of each of one or more access rights for the resource, include an invitation to request assignment of an access right, facilitate establishment or updating of an account, and/or identify characteristics of one or more assigned access rights. Web server 218 can be configured to support server-side scripting and/or receive data from user devices 210, such as data from forms or file uploads.

In some instances, a web server 218 can be configured to communicate data about a resource and an indication that access rights for the resource are available. Web server 218 can receive a request communication from a user device 210 that corresponds to a request for information about access rights. The request can include one or more constraints, which can correspond to (for example) values (e.g., to be matched or to define a range) of particular fields.

A management server 222 can interact with web server 218 to provide indications as to which access rights' are available for assignment, characteristics of access rights and/or what data is needed to assign an access right. When requisite information is received (e.g., about a user and/or user device, identifying a final request for one or more access rights), management server 222 can coordinate an assignment of the one or more access rights. The coordination can include updating an access-right data store to change a status of the one or more access rights (e.g., to assigned); to associate each of the one or more access rights with a user and/or user device; to generate or identify one or more access-enabling codes for the one or more access rights; and/or to facilitate transmission reflecting the assignment (e.g., and including the one or more access-enabling codes) to a user device.

Management server 222 can query, update and manage an access-right data store to identify access rights' availability and/or characteristic and/or to reflect a new assignment. The data store can include one associated with the particular assignment system. In some instances, the data store includes incomplete data about access rights for a resource. For example, a data store 224 at and/or used by a secondary access assignment system 216 may include data about an incomplete subset of access rights that have been allocated for a particular resource. To illustrate, a client agent may have indicated that an independent intermediary system can (exclusively or non-exclusively) coordinate assignment of a portion of access rights for a resource but not the remainder. A data store 224 may then, for example, selectively include information (e.g., characteristics, statuses and/or assignment associations) for access rights in the portion.

Data store 224 or 226 associated with a particular primary or secondary access assignment system can include assignment data for a set of access rights that are configured to be set by the particular primary or secondary access assignment system or by another system. For example, a rule can indicate that a given access right is to have an available status until a first of a plurality of access assignment systems assigns the access right. Accordingly, access assignment systems would then need to communicate to alert each other of assignments.

In one instance, management server 222 (or another server in an access assignment system) sends a communication to a central data management server farm 228 reflecting one or more recent assignments. The communication may include an identification of one or more access rights, an indication that the access right(s) have been assigned, an identification of a user and/or user device associated with the assignment and/or one or more access-enabling codes generated or identified to be associated with the assignment. The communication can be sent, for example, upon assigning the access right(s), as a precursor to assigning the access right(s) (e.g., to confirm availability and/or request assignment authorization), at defined times or time intervals and/or in response to an assignment-update request received from data management server farm 228.

Data management server farm 228 can then update a central data store to reflect the data from the communication. The central data store can be part of, for example, a network-attached storage 232 and/or a storage-area network 234.

In some instances, a data store 224 or 226 can include a cache, that includes data stored based on previous communications with data management server farm 228. For example, data management server farm 228 may periodically transmit statuses of a set of access rights (e.g., those initially configured to be assignable by an access assignment system) or an updated status (e.g., indicating an assignment) of one or more access rights. As another example, data management server farm 228 may transmit statuses upon receiving a request from an access assignment system for statuses and/or authorization to assign one or more access rights.

An access assignment system may receive statuses less frequently or at times unaligned with requests received from user devices requesting information about access rights and/or assignments. Rather than initiate a central data store query responsive to each user-device request, a management server 222 can rely on cached data (e.g., locally cached data) to identify availability of one or more access rights, as reflect in webpage data and/or communications responsive to request communications for access-right information. After requisite information has been obtained, management server 222 can then communicate with data management server farm 228 to ensure that one or more particular access rights have remained available for assignment.

In some instances, one or more of primary access assignment system 214 and/or a secondary access assignment system 214 need not include a local or system-inclusive data store for tracking access-right statuses, assignments and/or characteristics. Instead, the access assignment system may communicate with a remote and/or central data store (e.g., network-attached storage 232 or storage-area network 234).

Access management system 120 can include a primary access assignment system 214 and/or a secondary access assignment system 214; data management server farm 228; and/or a central data store (e.g., network-attached storage 232 or storage-area network 234). Each of one or more intermediate systems 130 can include a primary access assignment system 214 and/or a secondary access assignment system 214.

Data management server farm 228 may periodically and/or routinely assess a connection with an access assignment system 214. For example, a test communication can be sent that is indicative of a request to respond (e.g., with particular data or generally). If a response communication is not received, if a response communication is not received within a defined time period and/or if a response communication includes particular data (e.g., reflecting poor data integrity, network speed, processing speed, etc.), data management server farm 228 may reconfigure access rights and/or permissions and/or may transmit another communication indicating that assignment rights of the access assignment system are limited (e.g., to prevent the system from assigning access rights).

It will be appreciated that various parts of system 200 can be geographically separated. For example, two or more of primary access assignment system 214; one or more of secondary access assignment systems 214; and data management server farm 228 may be located in different geographic locations (e.g., different cities, states or countries).

It will further be appreciated that system 200 can include a different number of various components rather than a number depicted in FIG. 2. For example, system 200 can include multiple data management server farms 228, central data stores and/or primary access assignment systems 214 (e.g., which can be geographically separated, such as being located in different cities, states or countries). In some instances, processing may be split (e.g., according to a load-balancing technique) across multiple data management server farms 228 and/or across multiple access assignment systems 214. Meanwhile, the farms and/or systems can be configured to accept an increased or full load should another farm and/or system be unavailable (e.g., due to maintenance). Data stored in a central data store may also be replicated in geographically separated data stores.

Figure 3:
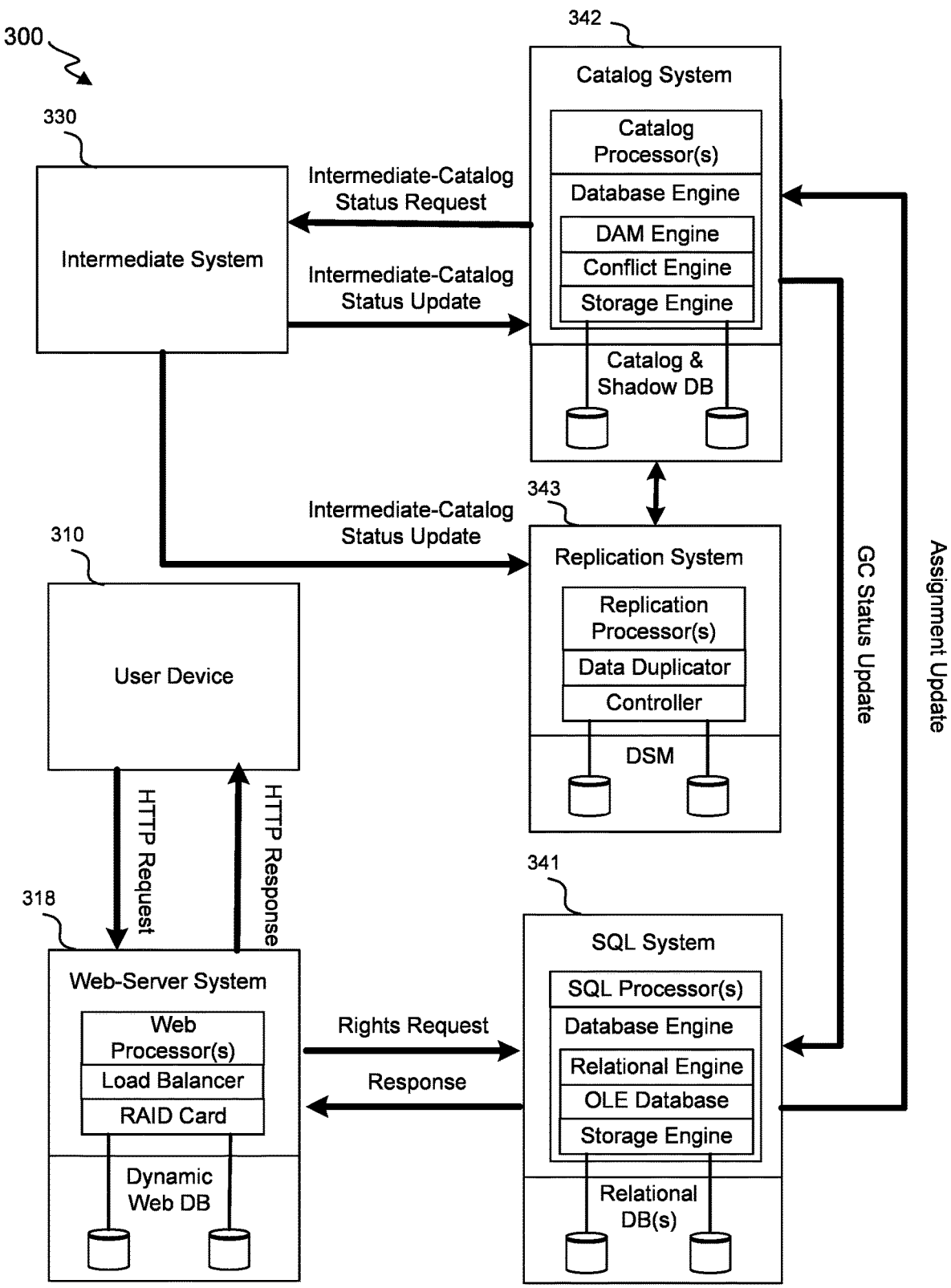
FIG. 3 shows an illustration of a communication exchange between components involved in a resource access-facilitating interaction system according to an embodiment of the invention.

FIG. 3 shows an illustration of a communication exchange between components involved in a resource access-facilitating interaction system 300 according to an embodiment of the invention. A user device 310 can send one or more HTTP requests to a web-server system 318, and web-server system 318 can respond with one or more HTTP responses that include webpage data. The webpage data can include, for example, information about one or more resources, characteristics of a set of access rights for each of the one or more resources, availability of one or more access rights, an invitation to request an assignment of one or more access rights and/or indications as to what information is required for an access-right assignment. HTTP requests can include assignment-request data (e.g., a resource identification, requisite information, and/or an identification of an access-right constraint or access right).

Web-server system 318 can include one or more web processors (e.g., included in one or more server farms, which may be geographically separated) to, for example, map a path component of a URL to web data (e.g., stored in a local file system or generated by a program); retrieve the web data; and/or generate a response communication including the web data. Web processor can further parse communication to identify input-corresponding data in HTTP requests, such as field values required for an access-right assignment.

Web-server system 318 can also include a load balancer to distribute processing tasks across multiple web processors. For example, HTTP requests can be distributed to different web processors. Load-balancing techniques can be configured so as, for example, to distribute processing across servers or server farms, decrease a number of hops between a web server and user device, decrease a geographical location between a user device and web server, etc.

Web-server system 318 can further include a RAID component, such as a RAID controller or card. A RAID component can be configured, for example, to stripe data across multiple drives, distribute parity across drives and/or mirror data across multiple drives. The RAID component can be configured to improve reliability and increase request-processing speeds.

Web-server system 318 can include one or more distributed, non-distributed, virtual, non-virtual, local and/or remote data stores. The data stores can include web data, scripts and/or content object (e.g., to be presented as part or web data).

Some HTTP requests include requests for identifications of access-right characteristics and/or availability. To provide web data reflecting such information, web-server system 318 can request the information from another server, such as an SQL system 341 (e.g., which may include one or more servers or one or more server farms).

SQL system 341 can include one or more SQL processors (e.g., included in one or more server farms, which may be geographically separated). SQL processors can be configured to query, update and otherwise use one or more relational data stores. SQL processors can be configured to execute (and, in some instances, generate) code (e.g., SQL code) to query a relational data store.

SQL system 341 can include a database engine, that includes a relational engine, OLE database and storage engine. A relational engine can process, parse, compile, and/or optimize a query and/or make query-associated calls. The relational engine can identify an OLE DB row set that identifies the row with columns matching search criteria and/or a ranking value. A storage engine can manage data access and use the rowset (e.g., to access tables and indices) to retrieve query-responsive data from one or more relational databases.

SQL system 341 can include one or more distributed, non-distributed, virtual, non-virtual, local and/or remote relational data stores. The relational databases can include linked data structures identifying, for example, resource information, access-right identifications and characteristics, access-right statuses and/or assignments, and/or user and/or user account data. Thus, for example, use of the relational structures may facilitate identifying, for a particular user, a characteristic of an assigned access right and information about a resource associated with the access right.

One or more data structures in a relational data structure may reflect whether particular access rights have been assigned or remain available. This data may be based on data received from a catalog system 342 that monitors and tracks statuses of resource access rights. Catalog system 342 can include one or more catalog processors (e.g., included in one or more server farms, which may be geographically separated). Catalog processors can be configured to generate status-update request communications to be sent to one or more access assignment systems and/or intermediate systems and/or to receive status-update communications from one or more access assignment systems and/or intermediate systems. A status-update communication can, for example, identify an access right and/or resource and indicate an assignment of the access right. For example, a status-update communication can indicate that a particular access right has been assigned and is thus no longer available. In some instances, a status-update communication identifies assignment details, such as a user, account and/or user device associated with an access-right assignment; a time that the assignment was made; and/or a price associated with the assignment.

In some instances, a status update is less explicit. For example, a communication may identify an access right and/or resource and request a final authorization of an assignment of the access right. Catalog system 342 can then verify that the access right is available for assignment (e.g., and that a request-associated system or entity is authorized to coordinate the assignment) and can transmit an affirmative response. Such a communication exchange can indicate (in some instances) that the access right is assigned and unavailable for other assignment.

In some instances, catalog system 342 can also be integrated with a non-intermediate access assignment system, such that it can directly detect assignments. For example, an integrated access assignment system can coordinate a message exchange with a user device, can query a catalog data store to identify available access rights and can facilitate or trigger a status-change of an access right to reflect an assignment (e.g., upon having received all required information).

Whether a result of a direct assignment detection or a status update from an intermediate system, a database engine of catalog system 342 can manage one or more data stores so as to indicate a current status of each of a set of access rights for a resource. The one or more data stores may further identify any assignment constraints. For example, particular access rights may be tagged or flagged so as to only allow one or more particular intermediate systems to trigger a change to the access rights' status and/or to assign the access rights.

The database engine can include a digital asset management (DAM) engine to receive, transform (e.g., annotate, reformat, introduce a schema, etc.) status-update communications, and identify other data (e.g., an identifier of an assigning system and/or a time at which a communication was received) to associate with a status update (e.g., an assignment). Therefore, the DAM engine can be configured to prepare storage-update tasks so as to cause a maintained data store to reflect a recent data change.

Further, the DAM engine can facilitate handling of datastore queries. For example, a status-request communication or authorization-request communication can be processed to identify variables and/or indices to use to query a data store. A query can then be generated and/or directed to a data store based on the processing. The DAM engine can relay (e.g., and, potentially, perform intermediate processing to) a query result to a request-associate system.

The database engine can also include a conflict engine, which can be configured to access and implement rules indicating how conflicts are to be handled. For example, catalog system 342 may receive multiple requests within a time period requesting an assignment authorization (or a hold) for a particular access right. A rule may indicate that a first request is to receive priority, that a request associated with a more highly prioritized requesting system (e.g., intermediate system) is to be prioritized, that a request associated with a relatively high (or low) quantity of access rights identified in the request for potential assignment are to be prioritized, etc.

The database engine can further include a storage engine configured to manage data access and/or data updates (e.g., modifying existing data or adding new data). The data managed by and/or accessible to the storage engine can be included in one or more data stores. The data stores can include, for example, distributed, non-distributed, virtual, non-virtual, local and/or remote data stores. The data stores can include, for example, a relational, non-relational, object, non-object, document and/or non-document data store. Part or all of a data store can include a shadow data store, that shadows data from another data store. Part or all of a data store can include an authoritative data store that is (e.g., directly and/or immediately) updated with access-right assignment changes (e.g., such that a primary or secondary access assignment system updates the data store as part of an access-right assignment process, rather than sending a post-hoc status-update communication reflecting the assignment). In some instances, a data store an authoritative data store identifies a status for each of a set (e.g., or all) of access rights for a given resource. Should there be any inconsistency between an authoritative data store and another data store (e.g., at an intermediate system), system 300 can be configured such that the authoritative data store is controlling.

System 300 can further include a replication system 343. Replication system 343 can include one or more replication processors configured to identify new or modified data, to identify one or more data stores and/or location at which to store the new or modified data and/or to coordinate replication of the data. In some instances, one or more of these identifications and/or coordination can be performed using a replication rule. For example, a replication rule may indicate that replication is to be performed in a manner biased towards storing replicated data at a data store geographically separated from another data store storing the data.

A data duplicator can be configured to read stored data and generate one or more write commands so as to store the data at a different data store. A controller can manage transmitting write commands appropriately so as to facilitate storing replicated data at identified data stores. Further, a controller can manage data stores, such as a distributed memory or distributed shared memory, to ensure that a currently active set of data stores includes a target number of replications of data.

Accordingly, web-server system 318 can interact with user device 310 to identify available access rights and to collect information needed to assign an access right. Web-server system 318 can interact with SQL system 341 so as to retrieve data about particular resources and/or access rights so as to configure web data (e.g., via dynamic webpages or scripts) to reflect accurate or semi-accurate information and/or statuses. SQL system 341 can use relational data stores to quickly provide such data. Meanwhile, catalog system 342 may manage one or more non-relational and/or more comprehensive data stores may be tasked with more reliably and quickly tracking access-right statuses and assignments. The tracking may include receiving status updates (e.g., via a push or pull protocol) from one or more intermediate systems and/or by detecting assignment updates from non-intermediate systems, such as an integrated access assignment system and/or SQL system 341. Catalog system 342 may provide condensed status updates (e.g., reflecting a binary indication as to whether an access right is available) to SQL system 341 periodically, at triggered times and/or in response to a request from the SQL system. A replication system 343 can further ensure that data is replicated at multiple data stores, so as to improve a reliability and speed of system 300.

It will be appreciated that various parts of system 300 can be geographically separated. For example, each of user device 310, intermediate system 330, web-server system 318, SQL system 341, catalog system 342 and replication 343 may be located in different geographic locations (e.g., different cities, states or countries).

Figure 4:
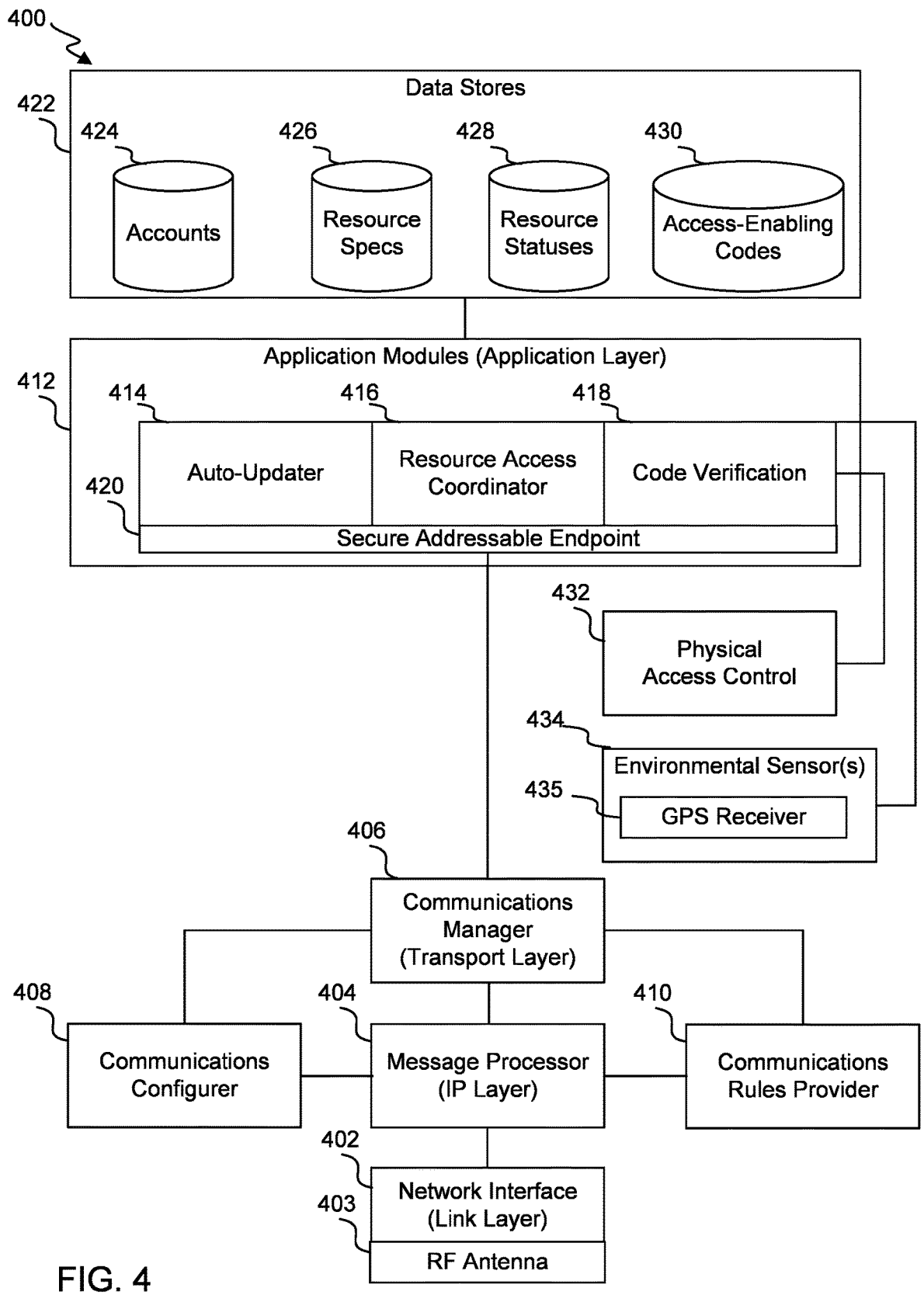
FIG. 4 illustrates example components of a device.

FIG. 4 illustrates example components of a device 400, such as a client device (e.g., client agent device 140, client register 150 and/or client point device 160), an intermediate system (e.g., intermediate system 130) and/or an access management system (e.g., access management system 120) according to an embodiment of the invention.

The components can include one or more modules that can be installed on device 400. Modules can include some or all of the following: a network interface module 402 (which can operate in a link layer of a protocol stack), a message processor module 404 (which can operate in an IP layer of a protocol stack), a communications manager module 406 (which can operate in a transport layer of a protocol stack), a communications configure module 408 (which can operate in a transport and/or IP layer in a protocol stack), a communications rules provider module 410 (which can operate in a transport and/or IP layer in a protocol stack), application modules 412 (which can operate in an application layer of a protocol stack), a physical access control module 432 and one or more environmental sensors 434.

Network interface module 402 receives and transmits messages via one or more hardware components that provide a link-layer interconnect. The hardware component(s) can include, for example, RF antenna 403 or a port (e.g., Ethernet port) and supporting circuitry. In some embodiments, network interface module 402 can be configured to support wireless communication, e.g., using Wi Fi (IEEE 802.11 family standards), Bluetooth® (a family of standards promulgated by Bluetooth SIG, Inc.), BLE, or near-field communication (implementing the ISO/IEC 18092 standards or the like).

RF antenna 403 can be configured to convert electric signals into radio and/or magnetic signals (e.g., to radio waves) to transmit to another device and/or to receive radio and/or magnetic signals and convert them to electric signals. RF antenna 403 can be tuned to operate within a particular frequency band. In some instances, a device includes multiple antennas, and the antennas can be, for example, physically separated. In some instances, antennas differ with respect to radiation patterns, polarizations, take-off angle gain and/or tuning bands. RF interface module 402 can include one or more phase shifters, filters, attenuators, amplifiers, switches and/or other components to demodulate received signals, coordinate signal transmission and/or facilitate high-quality signal transmission and receipt.

In some instances, network interface module 402 includes a virtual network interface, so as to enable the device to utilize an intermediate device for signal transmission or reception. For example, network interface module 402 can include VPN software.

Network interface module 402 and one or more antennas 403 can be configured to transmit and receive signals over one or more connection types. For example, network interface module 402 and one or more antennas 403 can be configured to transmit and receive WiFi signals, cellular signals, Bluetooth signals, Bluetooth Low Energy (BLE) signals, Zigbee signals, or Near-Field Communication (NFC) signals.

Message processor module 404 can coordinate communication with other electronic devices or systems, such as one or more servers or a user device. In one instance, message processor module 404 is able to communicate using a plurality of protocols (e.g., any known, future and/or convenient protocol such as, but not limited to, XML, SMS, MMS, and/or email, etc.). Message processor module 404 may further optionally serialize incoming and/or outgoing messages and facilitate queuing of incoming and outgoing message traffic.

Message processor module 404 can perform functions of an IP layer in a network protocol stack. For example, in some instances, message processor module 404 can format data packets or segments, combine data packet fragments, fragment data packets and/or identify destination applications and/or device addresses. For example, message processor module 404 can defragment and analyze an incoming message to determine whether it is to be forwarded to another device and, if so, can address and fragment the message before sending it to the network interface module 402 to be transmitted. As another example, message processor module 404 can defragment and analyze an incoming message to identify a destination application that is to receive the message and can then direct the message (e.g., via a transport layer) to the application.

Communications manager module 406 can implement transport-layer functions. For example, communications manager module 406 can identify a transport protocol for an outgoing message (e.g., transmission control protocol (TCP) or user diagram protocol (UDP)) and appropriately encapsulate the message into transport protocol data units. Message processor module 404 can initiate establishment of connections between devices, monitor transmissions failures, control data transmission rates and monitoring transmission quality. As another example, communications manager module 406 can read a header of an incoming message to identify an application layer protocol to receive the message's data. The data can be separated from the header and sent to the appropriate application. Message processor module 404 can also monitor the quality of incoming messages and/or detect out of order incoming packets.

In some instances, characteristics of message-receipt or message-transmission quality can be used to identify a health status of an established communications link. In some instances, communications manager module 406 can be configured to detect signals indicating the health status of an established communications link (e.g., a periodic signal from the other device system, which if received without dropouts, indicates a healthy link).

In some instances, a communication configurer module 408 is provided to track attributes of another system so as to facilitate establishment of a communication session. In one embodiment, communication configurer module 408 further ensures that inter-device communications are conducted in accordance with the identified communication attributes and/or rules. Communication configurer module 408 can maintain an updated record of the communication attributes of one or more devices or systems. In one embodiment, communications configurer module 408 ensures that communications manager module 406 can deliver the payload provided by message processor module 404 to the destination (e.g., by ensuring that the correct protocol corresponding to the client system is used).

A communications rules provider module 410 can implement one or more communication rules that relate to details of signal transmissions or receipt. For example, a rule may specify or constrain a protocol to be used, a transmission time, a type of link or connection to be used, a destination device, and/or a number of destination devices. A rule may be generally applicable or conditionally applicable (e.g., only applying for messages corresponding to a particular app, during a particular time of day, while a device is in a particular geographical region, when a usage of a local device resource exceeds a threshold, etc.). For example, a rule can identify a technique for selecting between a set of potential destination devices based on attributes of the set of potential destination devices as tracked by communication configure module 408. To illustrate, a device having a short response latency may be selected as a destination device. As another example, communications rules provider 410 can maintain associations between various devices or systems and resources. Thus, messages corresponding to particular resources can be selectively transmitted to destinations having access to such resources.

A variety of application modules 412 can be configured to initiate message transmission, process incoming transmissions, facilitate selective granting of resource access, facilitate processing of requests for resource access, and/or performing other functions. In the instance depicted in FIG. 4, application modules 412 include an auto-updater module 414, a resource access coordinator module 416, and/or a code verification module 418.

Auto-updater module 414 automatically updates stored data and/or agent software based on recent changes to resource utilization, availability or schedules and/or updates to software or protocols. Such updates can be pushed from another device (e.g., upon detecting a change in a resource availability or access permit) or can be received in response to a request sent by device 400. For example, device 400 can transmit a signal to another device that identifies a particular resource, and a responsive signal can identify availabilities of access to the resource (e.g., available access-right location reservations for a resource). As another example, device 400 can transmit a signal that includes an access access-enabling code, and a responsive signal can indicate whether the code is applicable for access of a particular resource and/or is valid.

In some instances, auto-updater module 414 is configured to enable the agent software to understand new, messages, commands, and/or protocols, based on a system configuration/change initiated on another device. Auto-updater module 414 may also install new or updated software to provide support and/or enhancements, based on a system configuration change detected on device 400. System configuration changes that would necessitate changes to the agent software can include, but are not limited to, a software/hardware upgrade, a security upgrade, a router configuration change, a change in security settings, etc. For example, if auto-updater module 414 determines that a communication link with another device has been lost for a pre-determined amount of time, auto-updater module 414 can obtain system configuration information to help re-establish the communication link. Such information may include new settings/configurations on one or more hardware devices or new or upgraded software on or connected to device 400. Thus, auto-updater module 414 can detect or be informed by other software when there is a new version of agent software with additional functionality and/or deficiency/bug corrections or when there is a change with respect to the software, hardware, communications channel, etc.), and perform updates accordingly.

Based on the newly obtained system configuration for device 400, auto-updater module 414 can cause a new communication link to be re-established with another device. In one embodiment, upon establishment of the communication link, system configuration information about device 400 can also be provided to another device to facilitate the connection to or downloading of software to device 400.

In one embodiment, when a poor health signal is detected by another device (e.g., when the health signal is only sporadically received but the communication link is not necessarily lost), the other device can send a command to auto-updater module 414 to instruct auto-updater module 414 to obtain system configuration information about device 400. The updated system configuration information may be used in an attempt to revive the unhealthy communications link (e.g., by resending a resource request). For example, code can utilize appropriate system calls for the operating system to fix or reestablish communications. By way of example and not limitation, model and driver information is optionally obtained for routers in the system querying them. By way of further example, if the code determines that a new brand of router has been installed, it can adapt to that change, or to the change in network configuration, or other changes.

Instead or in addition, the host server (e.g., via communications manager 406) can send specific instructions to auto-updater module 414 to specify tests or checks to be performed on device 400 to determine the changes to the system configurations (e.g., by automatically performing or requesting a check of system hardware and/or software). For example, the components involved in the chain of hops through a network can be queried and analyzed. Thus, for example, if a new ISP (Internet service provider) is being used and the management system traffic is being filtered, or a new router was installed and the software needs to change its configuration, or if someone made a change to the operating system that affects port the management system is using to communicate, the management system (or operator) can communicate with the ISP, change it back, or choose from a new available port, respectively.

The specific tests may be necessary to help establish the communication link, if, for example, the automatic tests fail to provide sufficient information for the communication link to be re-established, if additional information is needed about a particular configuration change, and/or if the client system is not initially supported by the auto-updater module 414, etc.

Auto-updater module 414 can also receive signals identifying updates pertaining to current or future availability of resources and/or access permits. Based on the signals, auto-updater module 414 can modify, add to or delete stored data pertaining to resource availabilities, resource schedules and/or valid access permits. For example, upon receiving an update signal, auto-updater 414 can modify data stored in one or more data stores 422, such as an account data store 424, resource specification data store 426, resource status data store 428 and/or access-enabling code data store 430.

Account data store 424 can store data for entities, such as administrators, intermediate-system agents and/or users. The account data can include login information (e.g., username and password), identifying information (e.g., name, residential address, phone number, email address, age and/or gender), professional information (e.g., occupation, affiliation and/or professional position), preferences (e.g., regarding event types and/or resource types), request data (e.g., reflecting dates, items of past requests). The account data can also or alternatively include technical data, such a particular entity can be associated with one or more device types, IP addresses, browser identifier and/or operating system identifier).

Resource specification data store 426 can store specification data characterizing each of one or more resources. For example, specification data for a resource can include a processing power, available memory, operating system, compatibility, device type, processor usage, power status, device model, number of processor cores, types of memories, and/or date and time of availability. Specification data can further identify, for example, a value of each of one or more access rights.

Resource status data store 428 can store status data reflecting which resources are available (or unavailable), thereby indicating which resources have one or more open assignments. In some instances, the status data can include schedule information about when a resource is available. Status data can include information identifying an entity who requested, reserved or was assigned a resource. In some instances, status information can indicate that a resource is being held or reserved and may identify an entity associated with the hold or reserve and/or a time at which the hold or reservation will be released.

Access-enabling code data store 430 can store access-enabling code data that includes one or more codes and/or other information that can be used to indicate that an entity is authorized to use, have or receive a resource. An access-enabling code can include, for example, a numeric string, an alphanumeric string, a text string, a 1-dimensional code, a 2-dimensional code, a barcode, a quick response (QR) code, an image, a static code and/or a temporally dynamic code. An access-enabling code can be, for example, unique across all instances, resource types and/or entities. For example, access-enabling codes provided in association for access rights to a particular event can be unique relative to each other. In some instances, at least part of a code identifies a resource or specification of a resource. For example, for an access right to a resource, various portions of a code may reflect: a performing entity, resource location, date, section and access-permitted location identifier.

One or more of data stores 424, 426, 428, and 430 can be a relational data store, such that elements in one data store can be referenced within another data store. For example, resource status data store 428 can associate an identifier of a particular access right with an identifier of a particular entity. Additional information about the entity can then be retrieved by looking up the entity identifier in account data store 424.

Updates to data stores 424, 426, 428, and 430 facilitated and/or initiated by auto-updater module 414 can improve cross-device data consistency. Resource access coordinator module 416 can coordinate resource access by, for example, generating and distributing identifications of resource availabilities; processing requests for resource access; handling competing requests for resource access; and/or receiving and responding to resource-offering objectives.

Figure 5:
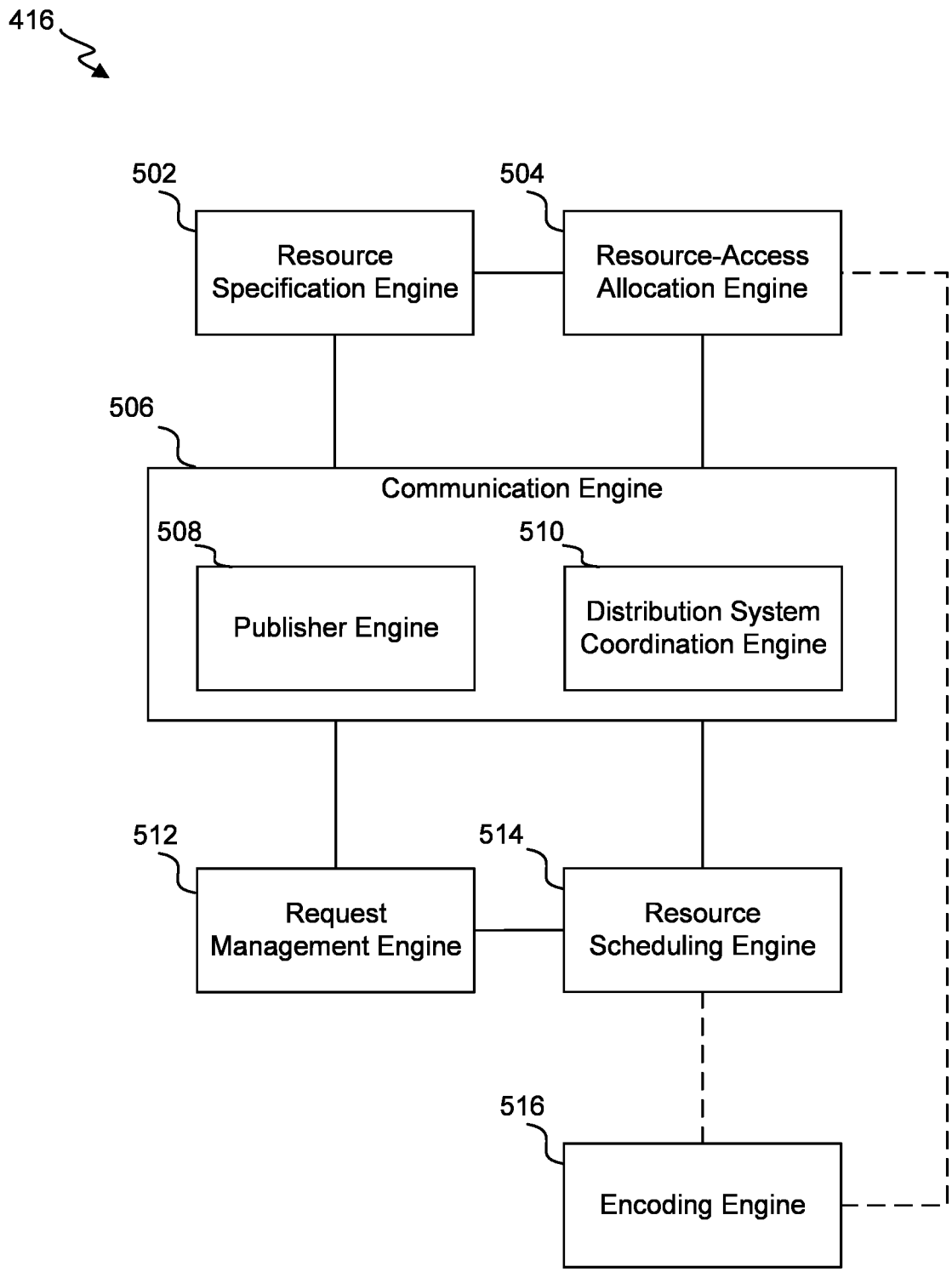
FIG. 5 illustrates example components of resource access coordinator module.

FIG. 5 illustrates example components of resource access coordinator module 416 that may operate, at least in part, at an access management system (e.g., access management system) according to an embodiment of the invention. A resource specification engine 502 can identify one or more available resources. For example, resource specification engine 502 can detect input that identifies a current or future availability of a new resource.

Resource specification engine 502 can identify one or more specifications of each of one or more resources. A specification can include an availability time period. For example, resource specification engine 502 can determine that a resource is available, for example, at a particular date and time (e.g., as identified based on input), for a time period (e.g., a start to end time), as identified in the input, and/or from a time of initial identification until another input indicating that the resource is unavailable is detected. A specification can also or alternatively include a location (e.g., a geographic location of a spatial area) of the resource. A specification can also or alternatively include one or more parties associated with the resource. Resource specification engine 502 can store the specifications in association with an identifier of the resource in resource specifications data store 426.

A resource-access allocation engine 504 can allocate access rights for individual resources. An access right can serve to provide an associated entity with the right or a priority to access a resource. Because (for example) association of an access right with an entity can, in some instances, be conditioned on value issuance or authorization thereof, an allocated access right can be initially unassociated with particular entities (e.g., users). For example, an allocated right can correspond to one or more access characteristics, such as an processor identifier, a usage time, a memory allocation, a geographic location (e.g., section identifier), and/or a fec. For an allocated access right, resource-access allocation engine 504 can store an identifier of the right in resource statuses data store 428 in association with an identifier for the resource and an indication that it has not yet been assigned to a particular entity.

A communication engine 506 can facilitate communicating the availability of the resource access rights to users. In some instances, a publisher engine 508 generates a presentation that identifies a resource and indicates that access rights are available. Initially or in response to user interaction with the presentation, the presentation can identify access characteristics about available access rights. The presentation can include, for example, a chart that identifies available access rights for an event and corresponding fees. Publisher engine 508 can distribute the presentation via, for example, a website, app page, email and/or message. The presentation can be further configured to enable a user to request assignments of one or more access rights.

In some instances, an intermediate system coordination engine 510 can facilitate transmission of information about resource availability (e.g., resource specifications and characteristics of resource-access rights) to one or more intermediate systems (e.g., by generating one or more messages that include such information and/or facilitating publishing such information via a website or app page). Each of the one or more intermediate systems can publish information about the resource and accept requests for resource access. In some instances, intermediate system coordination engine 510 identifies different access rights as being available to individual intermediate systems to coordinate assignment. For example, access rights located in Section 1 may be provided for a first intermediate system to assign, and access rights located in Section 2 may be provided to a second intermediate system to assign.

In some instances, overlapping access rights are made available to multiple intermediate systems to coordinate assignments. For example, some or all of a first set of resource rights (e.g., corresponding to a section) may be provided to first and second intermediate systems. In such instances, intermediate system coordination engine 510 can respond to a communication from a first intermediate system indicating that a request has been received (e.g., and processed) for an access right in the set) by sending a notification to one or more other intermediate systems that indicates that the access right is to be at least temporarily (or entirely) made unavailable.

Intermediate system coordination engine 510 can monitor communication channels with intermediate systems to track the health and security of the channel. For example, a healthy connection can be inferred when scheduled signals are consistently received. Further, intermediate system coordination engine 510 can track configurations of intermediate systems (e.g., via communications generated at the intermediate systems via a software agent that identifies such configurations) so as to influence code generation, communication format, and/or provisions or access rights.

Thus, either via a presentation facilitated by publisher engine 508 (e.g., via a web site or app page) or via communication with an intermediate system, a request for assignment of an access right can be received. A request management engine 512 can process the request. Processing the request can include determining whether all other required information has been received, such as user-identifying information (e.g., name), access-right identifying information (e.g., identifying a resource and/or access-right characteristic) user contact information (e.g., address, phone number, and/or email address), and/or user device information (e.g., type of device, device identifier, and/or IP address).

When all required information has not been received, request management engine 512 can facilitate collection of the information (e.g., via a webpage, app page or communication to an intermediate system). Request engine 512 can also or alternatively retrieve certain information, and/or determine that the retrieved information has been received, and so on. For example, publisher engine 508 may receive information via a webpage, and request engine 512 can request authorization for an amount of the requested access rights. In some instances, request engine 512 retrieves data from a user account. For example, publisher engine 508 may indicate that a request for an access right has been received while a user was logged into a particular account. Request engine 512 may then retrieve, for example, device information, associated with the user profile from account data store 424.

In some instances, request management engine 512 prioritizes requests, such as requests for overlapping, similar or same access rights (e.g., requests for access rights associated with a same section) received within a defined time period. The prioritization can be based on, for example, times at which requests were received (e.g., prioritizing earlier requests), a request parameter (e.g., prioritizing requests for a higher or lower number of access rights above others), whether requests were received via an intermediate system (e.g., prioritizing such requests lower than others), intermediate systems associated with requests (e.g., based on rankings of the systems), whether requests were associated with users having established accounts, and/or whether requests were associated with inputs indicative of a bot initiating the request (e.g., shorter inter-click intervals, failed CAPTCHA tests, request history departing from a human profile).

Upon determining that required information has been received and request-processing conditions have been met, request management engine 512 can forward appropriate request information to a resource scheduling engine 514. For a request, resource scheduling engine 514 can query resource status data store 428 to identify access rights matching parameters of the request.

In some instances, the request has an access-right specificity matching a specificity at which access rights are assigned. In some instances, the request is less specific, and resource scheduling engine 514 can then facilitate an identification of particular rights to assign. For example, request management engine 512 can facilitate a communication exchange by which access right characteristics matching the request are identified, and a user is allowed to select particular rights. As another example, request management engine 512 can itself select from amongst matching access rights based on a defined criterion (e.g., best summed or averaged access-right ranking, pseudo-random selection, or a selection technique identified based on user input).

Upon identifying appropriately specific access rights, resource scheduling engine 514 can update resource status data store 428 so as to place the access right(s) on hold (e.g., while obtaining authorization and/or user confirmation) and/or to change a status of the access right(s) to indicate that they have been assigned (e.g., immediately, upon receiving authorization or upon receiving user confirmation). Such assignment indication may associate information about the user (e.g., user name, device information, phone number and/or email address) and/or assignment process (e.g., identifier of any intermediate system and/or assignment date and time) with an identifier of the access right(s).

For individual assigned access rights, an encoding engine 516 can generate an access-enabling code. The access-enabling code can include, for example, an alphanumeric string, a text string, a number, a graphic, a static code, a dynamic code (e.g., with a feature depending on a current time, current location or communication) and/or a technique for generating the code (e.g., whereby part of the code may be static and part of the code may be determined using the technique). The code may be unique across all access rights, all access rights for a given resource, all access rights associated with a given location, all access rights associated with a given time period, all resources and/or all users. In some instances, at least part of the code is determined based on or is thereafter associated with an identifier of a user, user device information, a resource specification and/or an access right characteristic.

In various embodiments, the code may be generated prior to allocating access rights (e.g., such that each of some or all allocated access rights are associated with an access-enabling code), prior to or while assigning one or more access right(s) responsive to a request (e.g., such that each of some or all assigned access rights are associated with an access-enabling code), at a prescribed time, and/or when the device is at a defined location and/or in response to user input. The code may be stored at or availed to a user device. In various instances, at the user device, an access-enabling code may be provided in a manner such that it is visibly available for user inspection or concealed from a user. For example, an access right document with an access-enabling code may be transmitted to a user device, or an app on the user device can transmit a request with a device identifier for a dynamic code.

Encoding engine 516 can store the access-enabling codes in access-enabling code data store 430. Encoding engine 516 can also or alternatively store an indication in account data store 424 that the access right(s) have been assigned to the user. It will again be appreciated that data stores 424, 426, 428, and 430 can be relational and/or linked, such that, for example, an identification of an assignment can be used to identify one or more access rights, associated access-enabling code(s) and/or resource specifications.

Resource scheduling engine 514 can facilitate one or more transmissions of data pertaining to one or more assigned access rights to a device of a user associated with the assignment and/or to an intermediate system facilitating the assignment and/or having transmitted a corresponding assignment request. The data can include an indication that access rights have been assigned and/or details as to which rights have been assigned. The data can also or alternatively include access-enabling codes associated with assigned access rights.

While FIG. 5 depicts components of resource access coordinator module 516 that may be present on an access management system 120, it will be appreciated that similar or complementary engines may be present on other systems. For example, a communication engine on a user device can be configured to display presentations identifying access right availability, and a request management engine on a user device can be configured to translate inputs into access-right requests to send to an intermediate system or access management system.

Returning to FIG. 4, code verification module 418 (e.g., at a user device or client device) can analyze data to determine whether an access-enabling code is generally valid and/or valid for a particular circumstance. The access-enabling code can include one that is received at or detected by device 400. The analysis can include, for example, determining whether all or part of the access-enabling code matches one stored in access-enabling code data store 430 or part thereof, whether the access-enabling code has previously been applied, whether all or part of the access-enabling code is consistent with itself or other information (e.g., one or more particular resource specifications, a current time and/or a detected location) as determined based on a consistency analysis and/or whether all or part of the access-enabling code has an acceptable format.

For example, access-enabling code data store 430 can be organized in a manner such that access-enabling codes for a particular resource, date, resource group, client, etc. can be queried to determine whether any such access-enabling codes correspond to (e.g. match) one being evaluated, which may indicate that the code is verified. Additional information associated with the code may also or alternatively be evaluated. For example, the additional information can indicate whether the code is currently valid or expired (e.g., due to a previous use of the code).

As another example, a portion of an access-enabling code can include an identifier of a user device or user account, and code verification module 418 can determine whether the code-identified device or account matches that detected as part of the evaluation. To illustrate, device 400 can be a client device that electronically receives a communication with an access-enabling code from a user device. The communication can further include a device identifier that identifies, for example, that the user device is a particular type of smartphone. Code verification module 418 can then determine whether device-identifying information in the code is consistent with the identified type of smartphone.

As yet another example, code verification module 418 can identify a code format rule that specifies a format that valid codes are to have. To illustrate, the code format rule may identify a number of elements that are to be included in the code or a pattern that is to be present in the code. Code verification module 418 can then determine that a code is not valid if it does not conform to the format.

Verification of an access-enabling code can indicate that access to a resource is to be granted. Conversely, determining that a code is not verified can indicate that access to a resource is to be limited or prevented. In some instances, a presentation is generated (e.g., and presented) that indicates whether access is to be granted and/or a result of a verification analysis. In some instances, access granting and/or limiting is automatically affected. For example, upon a code verification, a user device and/or user may be automatically permitted to access a particular resource. Accessing a resource may include, for example, using a computational resource, possessing an item, receiving a service, entering a geographical area, and/or attending an event (e.g., generally or at a particular location).

Verification of an access-enabling code can further trigger a modification to access-enabling code data store 430. For example, a code that has been verified can be removed from the data store or associated with a new status. This modification may limit attempts to use a same code multiple times for resource access.

A combination of modules 414, 416, 418 comprise a secure addressable endpoint agent 420 that acts as an adapter and enables cross-device interfacing in a secure and reliable fashion so as to facilitate allocation of access-enabling codes and coordinate resource access. Secure addressable endpoint agent 420 can further generate a health signal that is transmitted to another device for monitoring of a status of a communication channel. The health signal is optionally a short message of a few bytes or many bytes in length that may be transmitted on a frequent basis (e.g., every few milliseconds or seconds). A communications manager 406 on the receiving device can then monitors the health signal provided by the agent to ensure that the communication link between the host server and device 400 is still operational.

In some instances, device 400 can include (or can be in communication with) a physical access control 432. Physical access control 432 can include a gating component that can be configured to provide a physical barrier towards accessing a resource. For example, physical access control 432 can include a turnstile or a packaging lock.

Physical access control 432 can be configured such that it can switch between two modes, which differ in terms of a degree to which user access to a resource is permitted. For example, a turnstile may have a locked mode that prevents movement of an arm of the turnstile and an unlocked mode that allows the arm to be rotated. In some instances, a default mode is the mode that is more limiting in terms of access.

Physical access control 432 can switch its mode in response to receiving particular results from code verification module 418. For example, upon receiving an indication that a code has been verified, physical access control 432 can switch from a locked mode to an unlocked mode. It may remain in the changed state for a defined period of time or until an action or event is detected (e.g., rotation of an arm).

Device 400 can also include one or more environmental sensors 434. Measurements from the sensor can processed by one or more application modules. Environmental sensor(s) 434 can include a global positioning system (GPS) receiver 435 that can receive signals from one or more GPS satellites. A GPS chipset can use the signals to estimate a location of device 400 (e.g., a longitude and latitude of device 400). The estimated location can be used to identify a particular resource (e.g., one being offered at or near the location at a current or near-term time). The identification of the particular resource can be used, for example, to identify a corresponding (e.g., user-associated) access-enabling code or to evaluate an access-enabling code (e.g., to determine whether it corresponds to a resource associated with the location).

The estimated location can further or alternatively be used to determine when to perform a particular function. For example, at a user device, detecting that the device is in or has entered a particular geographical region (e.g., is within a threshold distance from a geofence perimeter or entrance gate) can cause the device to retrieve or request an access-enabling code, conduct a verification analysis of the code and/or transmit the code to a client device.

It will be appreciated that environmental sensor(s) 434 can include one or more additional or alternative sensors aside from GPS receiver 435. For example, a location of device 400 can be estimated based on signals received by another receive from different sources (e.g., base stations, client point devices or Wi Fi access points). As another example, an accelerometer and/or gyroscope can be provided. Data from these sensors can be used to infer when a user is attempting to present an access-enabling code for evaluation.

It will also be appreciated that the components and/or engines depicted in figures herein are illustrative, and a device need not include each depicted component and/or engine and/or can include one or more additional components and/or engines. For example, a device can also include a user interface, which may include a touch sensor, keyboard, display, camera and/or speakers. As another example, a device can include a power component, which can distribute power to components of the device. The power component can include a battery and/or a connection component for connecting to a power source. As yet another example, a module in the application layer can include an operating system. As still another example, an application-layer control processor module can provide message processing for messages received from another device. The message processing can include classifying the message and routing it to the appropriate module. To illustrate, the message can be classified as a request for resource access or for an access-enabling code, an update message or an indication that a code has been redeemed or verified. The message processing module can further convert a message or command into a format that can interoperate with a target module.

It will further be appreciated that the components, modules and/or agents could be implemented in one or more instances of software. The functionalities described herein need not be implemented in separate modules, for example, one or more functions can be implemented in one software instance and/or one software/hardware combination. Other combinations are similarly be contemplated.

Further yet, it will be appreciated that a storage medium (e.g., using magnetic storage media, flash memory, other semiconductor memory (e.g., DRAM, SRAM), or any other non-transitory storage medium, or a combination of media, and can include volatile and/or non-volatile media) can be used to store program code for each of one or more of the components, modules and/or engines depicted in FIGS. 4 and 5 and/or to store any or all data stores depicted in FIG. 4 or described with reference to FIGS. 4 and/or 5. Any device or system disclosed herein can include a processing subsystem for executing the code. The processing system can be implemented as one or more integrated circuits, e.g., one or more single-core or multi-core microprocessors or microcontrollers, examples of which are known in the art.

Figure 6:
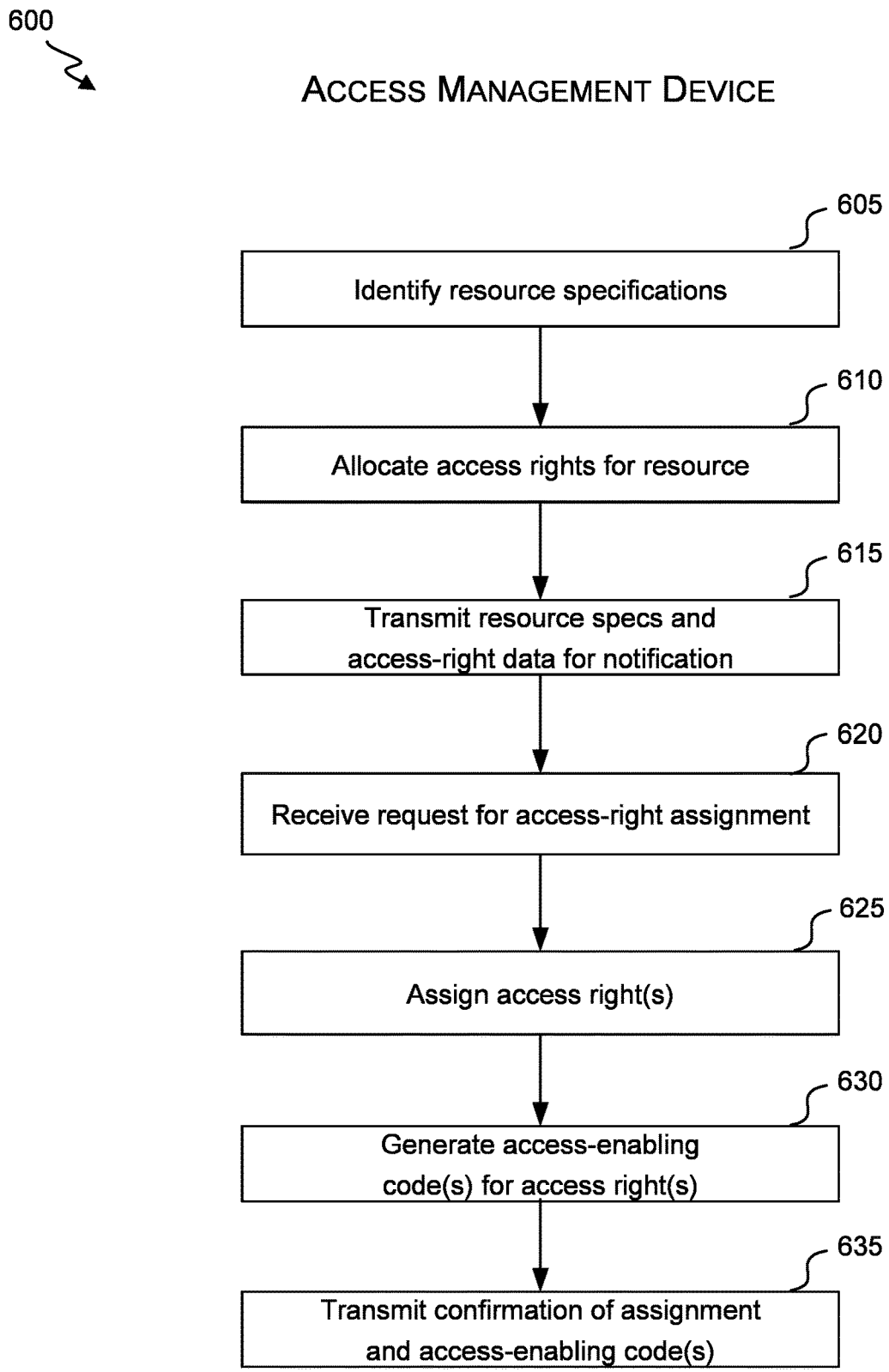
FIG. 6 illustrates a flowchart of an embodiment of a process for assigning access rights for resources.

FIG. 6 illustrates a flowchart of an embodiment of a process 600 for assigning access rights for resources. Process 600 can be performed by an access management system, such as access management system 120. Process 600 begins at block 605 where resource specification engine 502 identifies one or more specifications for a resource. The specifications can include, for example, a time at which the resource is to be available, a location of the resource, a capacity of the resources and/or one or more entities (e.g., performing entities) associated with the resource.

At block 610, resource-access allocation engine 504 allocates a set of access rights for the resource. In some instances, each of at least some of the access rights corresponds to a different access parameter, such as a different location (e.g., seat) assignment. Upon allocation, each of some or all of the access rights may have a status as available. A subset of the set of access rights can be immediately (or at a defined time) assigned or reserved according to a base assignment or reservation rule (e.g., assigning particular access rights to particular entities, who may be involved in or related to provision of the resource and/or who have requested or been assigned a set of related access rights.

At block 615, communication engine 506 transmits the resource specifications and data about the access rights. The transmission can occur in one or more transmissions. The transmission can be to, for example, one or more user devices and/or intermediate systems. In some instances, a notification including the specifications and access-right data is transmitted, and in some instances, a notification can be generated at a receiving device based on the specifications and access-right data. The notification can include, for example, a website that identifies a resource (via, at least in part, its specifications) and indicates that access rights for the resource are available for assignment. The notification can include an option to request assignment of one or more access rights.

At block 620, request management engine 512 receives a request for one or more access rights to be assigned to a user. The request can, for example, identify particular access rights and/or access parameters. The request can include or be accompanied by other information, such as identifying information. In some instances, the access management system can use at least some of such information to determine whether a fee for the access rights has been authorized. In some instances, the request is received via an intermediate system that has already handled such authorization.

At block 625, resource scheduling engine 514 assigns the requested one or more access rights to the user. The assignment can be conditioned on receipt of all required information, confirmation that the access right(s) have remained available for assignment, determining using data corresponding to the request that a bot-detection condition is not satisfied, fee provision and/or other defined conditions. Assignment of the access right(s) can include associating an identifier of each of the one or more rights with an identifier of a user and/or assignment and/or changing a status of the access right(s) to assigned. Assignment of the access right(s) can result in impeding or preventing other users from requesting the access right(s), being assigned the access right(s) and/or being notified that the access right(s) are available for assignment. Assignment of the access right(s) can, in some instances, trigger transmission of one or more communications to, for example, one or more intermediate systems identifying the access right(s) and indicating that they have been assigned and/or with an instruction to cease offering the access rights.

At block 630, encoding engine 516 generates an access-enabling code for each of the one or more access rights. The code can be generated, for example, as part of the assignment, as part of the allocation or subsequent to the assignment (e.g., upon detecting that a user is requesting access to the resource). Generating an access-enabling code can include applying a code-generation technique, such on one that generates a code based on a characteristic of a user, user device, current time, access right, resource, intermediate system or other variable. The access-enabling code can include a static code that will not change after it has been initially generated or a dynamic code that changes in time (e.g., such that block 630 can be repeated at various time points).

At block 635, communication engine 506 transmits a confirmation of the assignment and the access-enabling code(s) in one or more transmissions. The transmission(s) may be sent to one or more devices, such as a user device having initiated the request from block 620, a remote server or an intermediate system having relayed the request from block 620.

Figure 7A:
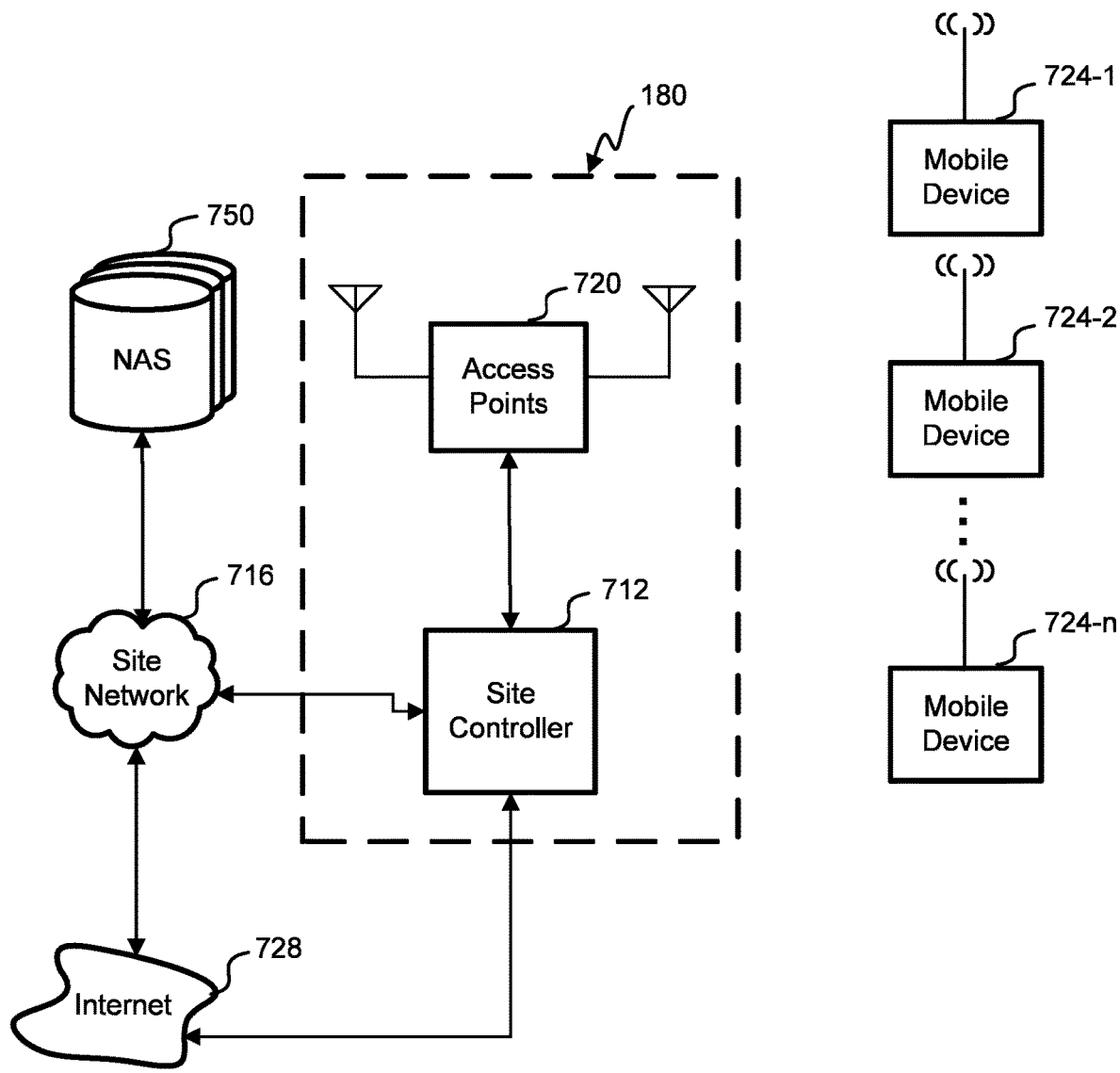
FIGS. 7A and 7B show embodiments of site systems in relations to mobile devices.

Referring to FIG. 7A, an embodiment of a site system 180 is shown in relation to mobile devices 724-n, Network Attached Storage (NAS) 750, site network 716 and the Internet 728. In some embodiments, for attendees of a live event or concert, site network 716 and site system 180 provide content, services and/or interactive engagement using mobile devices 724. Connections to site system 180 and site network 716 can be established by mobile devices 724 connecting to access points 720. Mobile devices 724 can be a type of end user device 110 that is portable, e.g., smartphones, mobile phones, tablets, and/or other similar devices.

Site network 716 can have access to content (information about attendees, videos, pictures, music, trivia information, etc.) held by NAS 750. Additionally, as described herein, content can be gathered from attendees both before and during the event. By connecting to site network 716, mobile device 724 can send content for use by site system 180 or display content received from NAS 750.

Figure 7B:
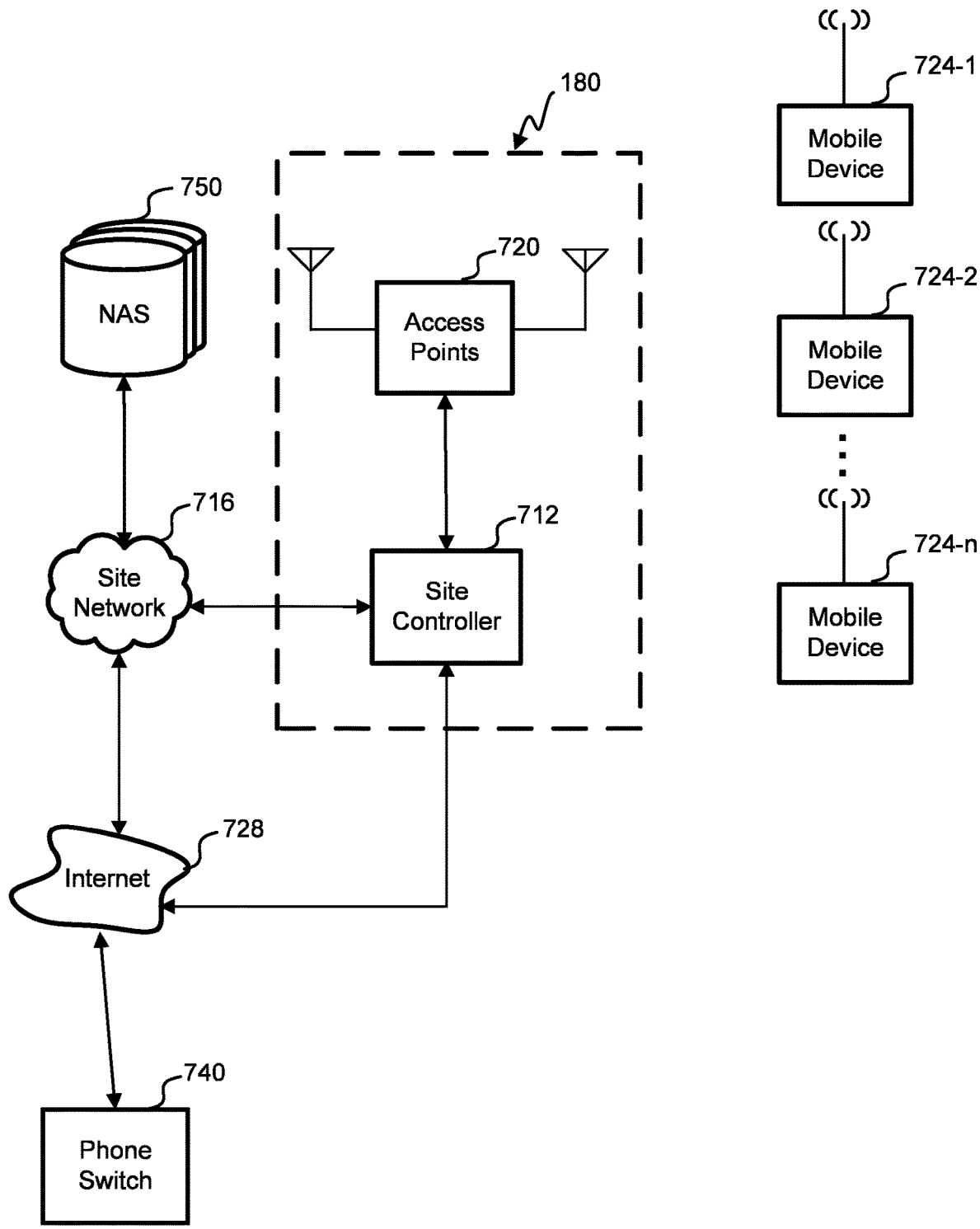

Referring to FIG. 7B, another embodiment of a site system 180 is shown in relation to mobile devices 724-n, Network Attached Storage (NAS) 750, site network 716 and the Internet 728, in an embodiment. FIG. 7B additionally includes phone switch 740. In some embodiments, phone switch 740 can be a private cellular base station configured to spoof the operation of conventionally operated base stations. Using phone switch 740 at an event site allows site system 180 to provide additional types of interactions with mobile devices 724. For example, without any setup or configuration to accept communications from site controller 712, phone switch 740 can cause connected mobile devices 724 to ring and, when answered, have an audio or video call be established. When used with other embodiments described herein, phone switch 740 can provide additional interactions. For example, some embodiments described herein use different capabilities of mobile devices 724 to cause mass sounds and/or establish communications with two or more people. By causing phones to ring and by establishing cellular calls, phone switch can provide additional capabilities to these approaches.

Figure 8:
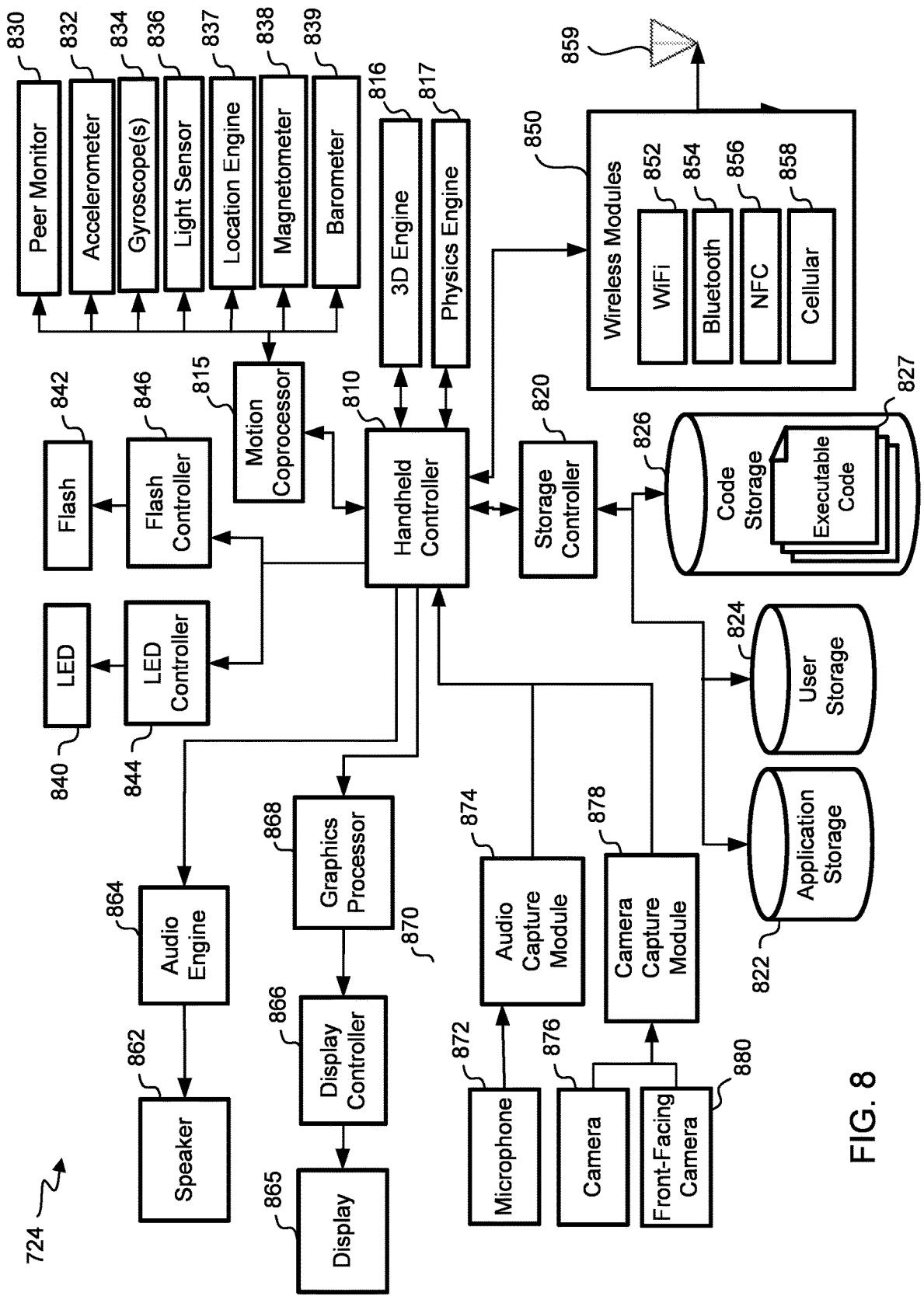
FIG. 8 shows a block diagram of user device according to an embodiment.

FIG. 8 shows a block diagram of user device 110 according to an embodiment. User device 110 includes a handheld controller 810 that can be sized and shaped so as enable the controller and user device 110 in a hand. Handheld controller 810 can include one or more user-device processors that can be configured to perform actions as described herein. In some instances, such actions can include retrieving and implementing a rule, retrieving an access-enabling code, generating a communication (e.g., including an access-enabling code) to be transmitted to another device (e.g., a nearby client-associated device, a remote device, a central server, a web server, etc.), processing a received communication (e.g., to perform an action in accordance with an instruction in the communication, to generate a presentation based on data in the communication, or to generate a response communication that includes data requested in the received communication) and so on.

Handheld controller 810 can communicate with a storage controller 820 so as to facilitate local storage and/or retrieval of data. It will be appreciated that handheld controller 810 can further facilitate storage and/or retrieval of data at a remote source via generation of communications including the data (e.g., with a storage instruction) and/or requesting particular data.

Storage controller 820 can be configured to write and/or read data from one or more data stores, such as an application storage 822 and/or a user storage 824. The one or more data stores can include, for example, a random access memory (RAM), dynamic random access memory (DRAM), read-only memory (ROM), flash-ROM, cache, storage chip, and/or removable memory. Application storage 822 can include various types of application data for each of one or more applications loaded (e.g., downloaded or pre-installed) onto user device 110. For example, application data can include application code, settings, profile data, databases, session data, history, cookies and/or cache data. User storage 824 can include, for example, files, documents, images, videos, voice recordings and/or audio. It will be appreciated that user device 110 can also include other types of storage and/or stored data, such as code, files and data for an operating system configured for execution on user device 110.

Handheld controller 810 can also receive and process (e.g., in accordance with code or instructions generated in correspondence to a particular application) data from one or more sensors and/or detection engines. The one or more sensors and/or detection engines can be configured to, for example, detect a presence, intensity and/or identify of (for example) another device (e.g., a nearby device or device detectable over a particular type of network, such as a Bluetooth, Bluetooth Low-Energy or Near-Field Communication network); an environmental, external stimulus (e.g., temperature, water, light, motion or humidity); an internal stimulus (e.g., temperature); a device performance (e.g., processor or memory usage); and/or a network connection (e.g., to indicate whether a particular type of connection is available, a network strength and/or a network reliability).

FIG. 8 shows several exemplary sensors and detection engines, including a peer monitor 830, accelerometer 832, gyroscope 834, light sensor 836 and location engine 838. Each sensor and/or detection engine can be configured to collect a measurement or make a determination, for example, at routine intervals or times and/or upon receiving a corresponding request (e.g., from a processor executing an application code).

Peer monitor 830 can monitor communications, networks, radio signals, short-range signals, etc., which can be received by a receiver of user device 110) Peer monitor 830 can, for example, detect a short-range communication from another device and/or use a network multicast or broadcast to request identification of nearby devices. Upon or while detecting another device, peer monitor 830 can determine an identifier, device type, associated user, network capabilities, operating system and/or authorization associated with the device. Peer monitor 530 can maintain and update a data structure to store a location, identifier and/or characteristic of each of one or more nearby user devices.

Accelerometer 832 can be configured to detect a proper acceleration of user device 110. The acceleration may include multiple components associated with various axes and/or a total acceleration. Gyroscope 834 can be configured to detect one or more orientations (e.g., via detection of angular velocity) of user device 110. Gyroscope 834 can include, for example, one or more spinning wheels or discs, single- or multi-axis (e.g., three-axis) MEMS-based gyroscopes.

Light sensor 836 can include, for example, a photosensor, such as photodiode, active-pixel sensor, LED, photoresistor, or other component configured to detect a presence, intensity and/or type of light. In some instances, the one or more sensors and detection engines can include a motion detector, which can be configured to detect motion. Such motion detection can include processing data from one or more light sensors (e.g., and performing a temporal and/or differential analysis).

Location engine 838 can be configured to detect (e.g., estimate) a location of user device 110. For example, location engine 838 can be configured to process signals (e.g., a wireless signal, GPS satellite signal, cell-tower signal, iBeacon, or base-station signal) received at one or more receivers (e.g., a wireless-signal receiver and/or GPS receiver) from a source (e.g., a GPS satellite, cellular tower or base station, or WiFi access point) at a defined or identifiable location. In some instances, location engine 838 can process signals from multiple sources and can estimate a location of user device 110 using a triangulation technique. In some instances, location engine 838 can process a single signal and estimate its location as being the same as a location of a source of the signal.

User device 110 can include a flash 842 and flash controller 846. Flash 842 can include a light source, such as (for example), an LED, electronic flash or high-speed flash. Flash controller 846 can be configured to control when flash 842 emits light. In some instances, the determination includes identifying an ambient light level (e.g., via data received from light sensor 836) and determining that flash 842 is to emit light in response to a picture- or movie-initiating input when the light level is below a defined threshold (e.g., when a setting is in an auto-flash mode). In some additional or alternative instances, the determination includes determining that flash 846 is, or is not, to emit light in accordance with a flash on/off setting. When it is determined that flash 846 is to emit light, flash controller 846 can be configured to control a timing of the light so as to coincide, for example, with a time (or right before) at which a picture or video is taken.

User device 110 can also include an LED 840 and LED controller 844. LED controller 844 can be configured to control when LED 840 emits light. The light emission may be indicative of an event, such as whether a message has been received, a request has been processed, an initial access time has passed, etc.

Flash controller 846 can control whether flash 846 emits light via controlling a circuit so as to complete a circuit between a power source and flash 846 when flash 842 is to emit light. In some instances, flash controller 846 is wired to a shutter mechanism so as to synchronize light emission and collection of image or video data.

User device 110 can be configured to transmit and/or receive signals from other devices or systems (e.g., over one or more networks, such as network(s) 170). These signals can include wireless signals, and accordingly user device 110 can include one or more wireless modules 850 configured to appropriately facilitate transmission or receipt of wireless signals of a particular type. Wireless modules 850 can include a Wi-Fi module 852, Bluetooth module 854, near-field communication (NFC) module 856 and/or cellular module 856. Each module can, for example, generate a signal (e.g., which may include transforming a signal generated by another component of user device 110 to conform to a particular protocol and/or to process a signal (e.g., which may include transforming a signal received from another device to conform with a protocol used by another component of user device 110).

Wi-Fi module 854 can be configured to generate and/or process radio signals with a frequency between 2.4 gigahertz and 5 gigahertz. Wi-Fi module 854 can include a wireless network interface card that includes circuitry to facilitate communicating using a particular standard (e.g., physical and/or link layer standard).

Bluetooth module 854 can be configured to generate and/or process radio signals with a frequency between 2.4 gigahertz and 2.485 gigahertz. In some instances, bluetooth module 854 can be configured to generate and/or process Bluetooth low-energy (BLE or BTLE) signals with a frequency between 2.4 gigahertz and 2.485 gigahertz.

NFC module 856 can be configured to generate and/or process radio signals with a frequency of 13.56 megahertz. NFC module 856 can include an inductor and/or can interact with one or more loop antenna.

Cellular module 858 can be configured to generate and/or process cellular signals at ultra-high frequencies (e.g., between 698 and 2690 megahertz). For example, cellular module 858 can be configured to generate uplink signals and/or to process received downlink signals.

The signals generated by wireless modules 850 can be transmitted to one or more other devices (or broadcast) by one or more antennas 859. The signals processed by wireless modules 850 can include those received by one or more antennas 859. One or more antennas 859 can include, for example, a monopole antenna, helical antenna, intenna, Planar Inverted-F Antenna (PIFA), modified PIFA, and/or one or more loop antennae.

User device 110 can include various input and output components. An output component can be configured to present output. For example, a speaker 862 can be configured to present an audio output by converting an electrical signal into an audio signal. An audio engine 864 can effect particular audio characteristics, such as a volume, event-to-audio-signal mapping and/or whether an audio signal is to be avoided due to a silencing mode (e.g., a vibrate or do-not-disturb mode set at the device).

Further, a display 866 can be configured to present a visual output by converting an electrical signal into a light signal. Display 866 may include multiple pixels, each of which may be individually controllable, such that an intensity and/or color of each pixel can be independently controlled. Display 866 can include, for example, an LED- or LCD-based display.

A graphics engine 868 can determine a mapping of electronic image data to pixel variables on a screen of user device 110. It can further adjust lighting, texture and color characteristics in accordance with, for example, user settings.

In some instances, display 866 is a touchscreen display (e.g., a resistive or capacitive touchscreen) and is thus both an input and an output component. A screen controller 870 can be configured to detect whether, where and/or how (e.g., a force of) a user touched display 866. The determination may be made based on an analysis of capacitive or resistive data.

An input component can be configured to receive input from a user that can be translated into data. For example, as illustrated in FIG. 8, user device 110 can include a microphone 872 that can capture audio data and transform the audio signals into electrical signals. An audio capture module 874 can determine, for example, when an audio signal is to be collected and/or any filter, equalization, noise gate, compression and/or clipper that is to be applied to the signal.

User device 110 can further include one or more cameras 876, 880, each of which can be configured to capture visual data (e.g., at a given time or across an extended time period) and convert the visual data into electrical data (e.g., electronic image or video data). In some instances, user device 110 includes multiple cameras, at least two of which are directed in different and/or substantially opposite directions. For example, user device 110 can include a rear-facing camera 876 and a front-facing camera 880.

A camera capture module 878 can control, for example, when a visual stimulus is to be collected (e.g., by controlling a shutter), a duration for which a visual stimulus is to be collected (e.g., a time that a shutter is to remain open for a picture taking, which may depend on a setting or ambient light levels; and/or a time that a shutter is to remain open for a video taking, which may depend on inputs), a zoom, a focus setting, and so on. When user device 110 includes multiple cameras, camera capture module 878 may further determine which camera(s) is to collect image data (e.g., based on a setting).

Figure 9:
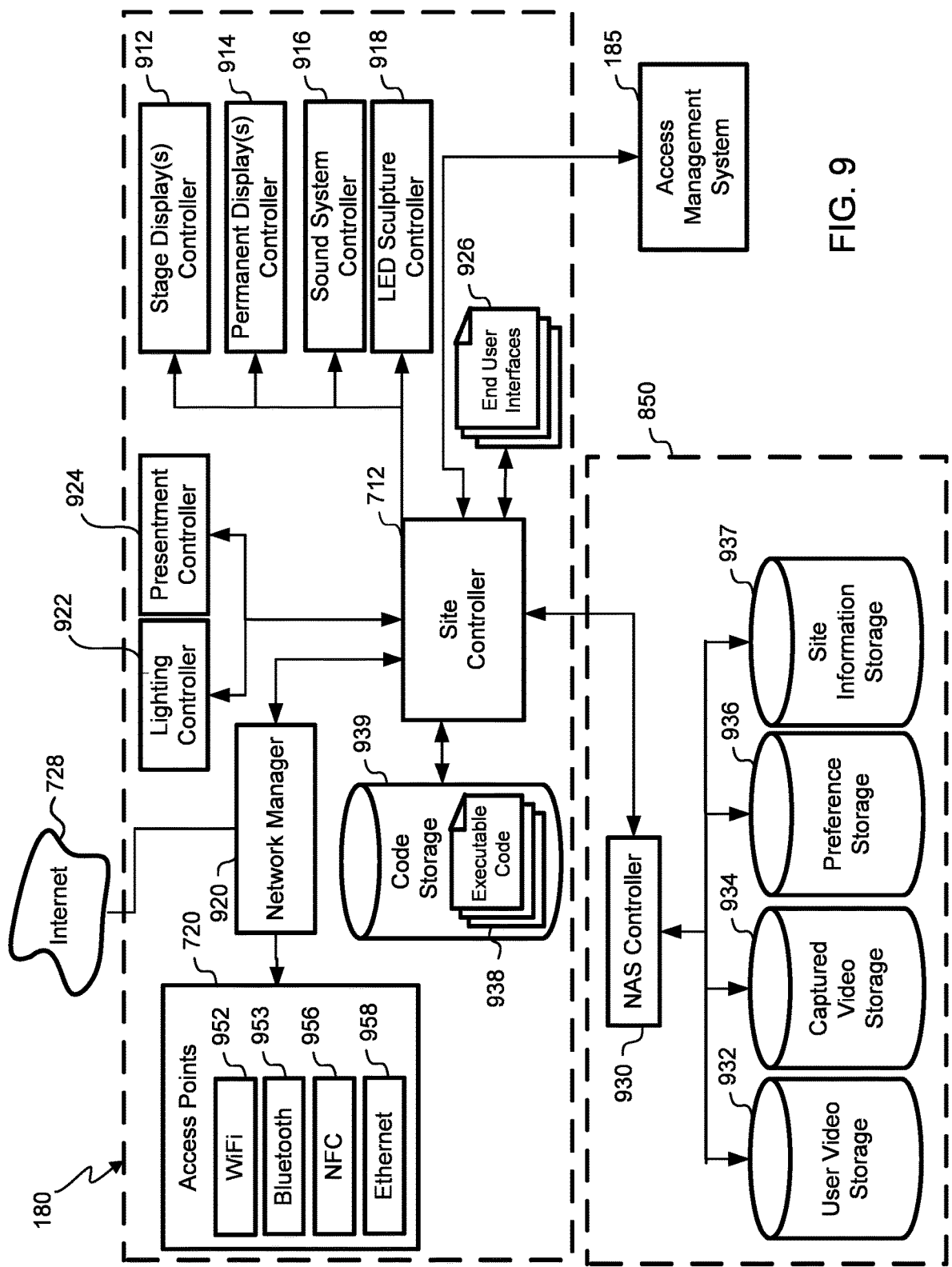
FIG. 9 illustrates sample components of an embodiment of site system 180, including connections to a NAS and access management system.

FIG. 9 illustrates sample components of an embodiment of site system 180, including connections to NAS 750 and access management system 185. Embodiments of site controller 712 use network manager 920 to connect via access points 720 (using e.g., WiFi 952, Bluetooth 953, NFC 956, Ethernet 958, and/or other network connections) to other network components, such as site network 716 and mobile devices 724. In some embodiments, site system 280 uses site controller 712 to control aspects of a spatial area for an event. A broad variety of features can be controlled by different embodiments, including: permanent lights (e.g., with lighting controller 922), stage lights (e.g., with presentment controller 924), stage display screens (e.g., with stage display(s) controller 912), permanent display screens (e.g., with permanent display(s) controller 914), and the sound system (e.g., with the sound system controller 916).

A more detailed view of NAS 750 is shown, including NAS controller 930 coupled to user video storage 932, captured video storage 934, preference storage 936, and 3D model 938. Captured video storage 934 can receive, store and provide user videos received from mobile devices 724. In some embodiments, site controller 712 triggers the automatic capture of images, audio and video from mobile devices 724, such triggering being synchronized to activities in an event. Images captured by this and similar embodiments can be stored on both the capturing mobile device 724 and user video storage 932. In an embodiment, site controller 712 can coordinate the transfer of information from mobile devices to NAS 750 (e.g., captured media) with activities taking place during the event. When interacting with mobile devices 724, some embodiments of site controller 712 can provide end user interfaces 926 to enable different types of interaction. For example, as a part of engagement activities, site controller may offer quizzes and other content to the devices. Additionally, with respect to location determinations discussed herein, site controller can supplement determined estimates with voluntarily provided information using end user interfaces 926, stored in a storage that is not shown.

In some embodiments, to guide the performance of different activities, site controller 712 and/or other components may use executable code 938 tangibly stored in code storage 939. In some embodiments, site information storage 937 can provide information about the site, e.g., events, spatial maps, geographic location of destinations (e.g., concessions, bathrooms, exits, etc.), as well as 3D models of site features and structure.

Figure 10:
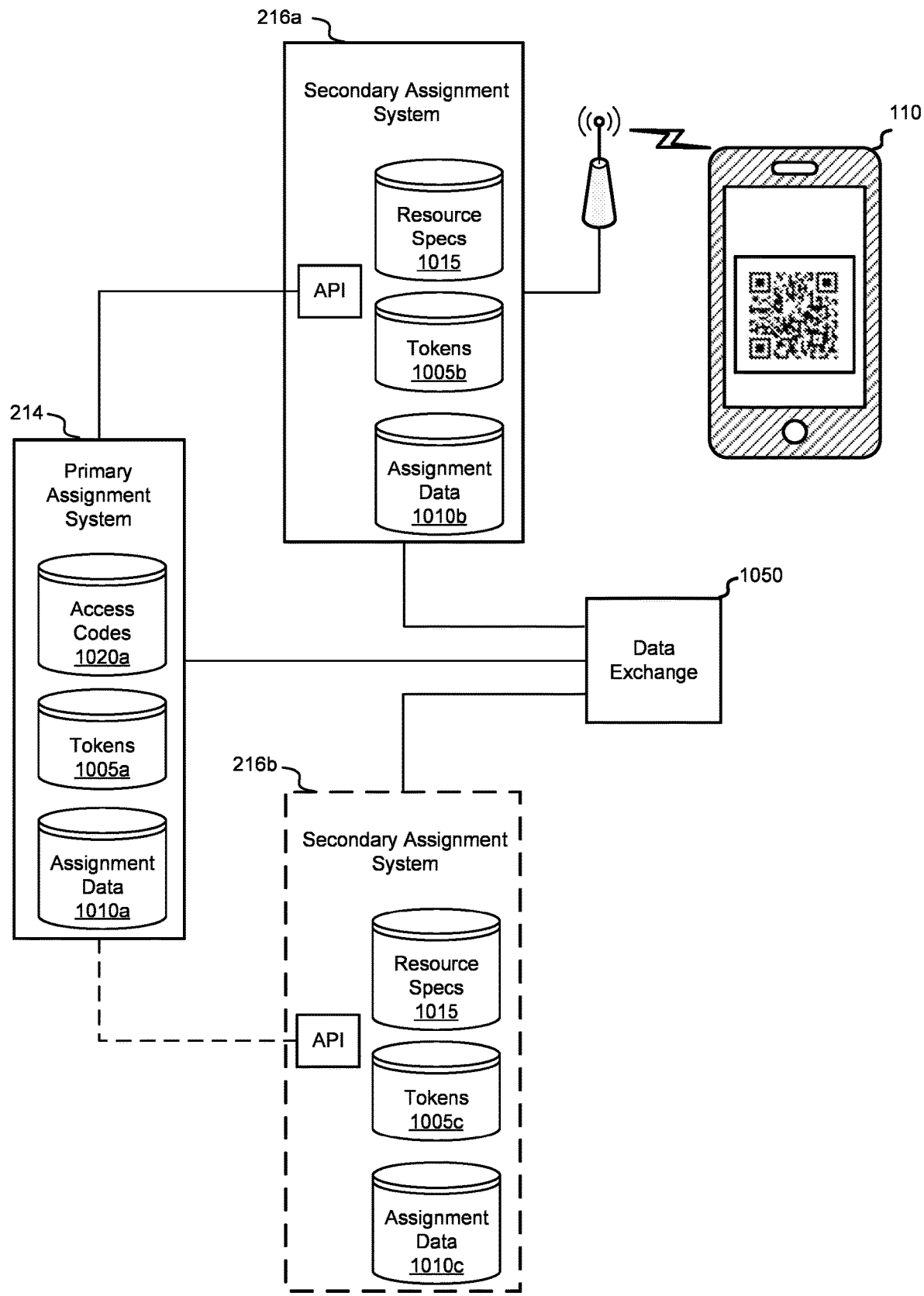
FIG. 10 is a schematic diagram illustrating a network environment for verifying the authenticity of event access rights, according to embodiments of the present disclosure.

FIG. 10 is a schematic diagram illustrating a network environment that enables secondary assignment systems to verify the authenticity of access rights before posting the access rights for reassignment, according to embodiments of the present disclosure. The network environment shown in FIG. 10 may include primary assignment system 214. In some implementations, primary assignment system 214 can be configured to coordinate and/or control initial assignment of access rights (e.g., generate and store access-enabling codes for physical or electronic access rights to resources). Non-limiting examples of an access right include an electronic or digital ticket to an event, a physical ticket to an event, a right to enter a spatial area, and so on. Secondary assignment system 216a can be configured to coordinate and/or control reassignment and/or transfer of access rights (e.g., from one user or user device to another or from an intermediate agent to a user or user device). Such transfer may occur as a result of a reassignment. Secondary assignment system 216a may also manage transfer offers (e.g., to allow a first user to identify a price at which a transfer request would be granted and to detect if a valid request is received). It will be appreciated that, although primary assignment system 214 is shown to be separate from secondary assignment system 216a, in some instances, an assignment management system may relate to both a primary and secondary channel, and a single data store or a localized cluster of data stores may include data from both channels. Secondary assignment system 216b represents any number of other secondary assignment systems different from secondary assignment system 216a that may potentially be included in the network environment.

In some implementations, each of the primary and secondary assignment systems may include network and/or computing environments. For example, each of the primary and secondary assignment systems may include network and/or computing environments may include a plurality of databases, including access codes database 1020, tokens database 1005, and assignment data 1010. The access codes database, for example, can store the access-enabling codes for access rights. For example, primary assignment system can store at the access codes database the access codes of the primary access rights that the primary assignment system has issued. The secondary assignment management stores can store resource specifications of access rights that are posted for reassignment on the associated reassignment platform. For examples, resource specifications may include, for example, a location, one or more performing entities and/or a date and time of events for the access rights. Tokens, as described above, may be codes that uniquely correspond to access-enabling codes, but unlike access-enabling codes, the tokens do not enable entry to resources. Lastly, the assignment data can include data representing an association between an event access right and a user. For example, if John Smith requested an access right in location A of a spatial area, for a resource, the assignment data may store data representing that John's Smith's user profile is assigned to location A.

As a non-limiting example and for the purpose of illustration, a primary access right, which is initially generated at primary assignment system 214, may be requested by a user operating mobile device 110, either directly from the primary assignment system or from any secondary assignment system. The user who requested the primary access right may, at a later time, decide that he or she wants to reassign the access right. The user can access secondary assignment system 216a to post the access right (represented by the QR code displayed on mobile device 110) for reassignment on the associated reassignment platform (e.g., the user can post the access right for reassignment on a website operated by a reassignment platform). However, because the secondary assignment system is an independent entity from the primary assignment system, the secondary assignment system may not be able to determine whether the access right is authentic or not. Accordingly, embodiments of the present disclosure enable the secondary assignment to verify the authenticity of the access right before posting the access right on the reassignment platform.

In some implementations, an API can be integrated in secondary assignment system 216a to trigger, execute, manage, or facilitate the verification process for verifying the authenticity of access rights before the access rights are posted for reassignment. As described in greater detail with respect to FIGS. 11A-B, the API may enable one or more API calls to be executed, such that an API call may trigger a communication from the secondary assignment system to the primary assignment system, and vice versa. The one or more API calls can be executed to register the access right that the user wants to reassign on the reassignment platform, temporarily reserve the access right for an access-right requestor when the access-right requestor submits a request for the access right, reassign the access right to the access-right requestor after an anomaly check has been successfully passed, and finally, fulfill the request by delivering the digital access right to the access-right requestor's computing device.

In some implementations, the network environment may include data exchange 1050. Data exchange 1050 may be managed or operated by primary assignment system 214. For example, data exchange 1050 can also include an interface or data delivery mechanism that evaluates and presents user-request patterns across various secondary assignment systems in real time. Advantageously, data exchange 1050 can provide a real-time analysis of a constantly-evolving world of access rights being sold and requested across multiple secondary assignment systems at any given time. Data exchange 1050 may be configured to ingest a data feed received from each of the secondary assignment systems in the network environment. For example, secondary assignment system 216a may transmit data representing reassignments completed using the reassignment platform over a defined period of time. The data representing reassignments may or may not be anonymized, depending on embodiments. Data exchange 1050 can receive the data representing reassignments, and evaluate the data using one or more machine-learning techniques (e.g., clustering) to identify patterns or trends within the data. In some cases, secondary assignment system 216b may subscribe to data exchange 1050 to view the patterns or trends identified by data exchange 1050. In some implementations, as secondary assignment system 216b provides more data representing its own access right reassignments, data exchange 1050 may provide more data about the identified patterns of trends to secondary assignment system 216b. Similarly, as secondary assignment system 216b provides less data representing its own access right reassignments, data exchange 1050 may provide less data about the identified patterns of trends to secondary assignment system 216b.

Figure 11A:
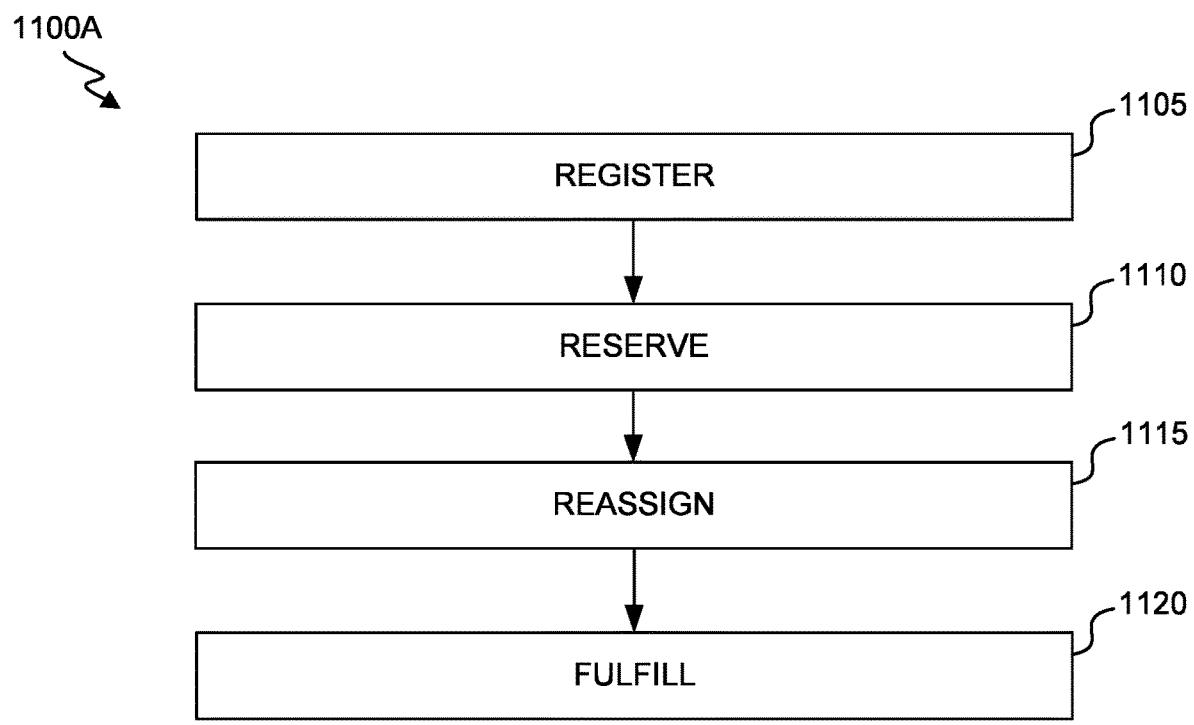
FIGS. 11A-B are flow diagrams illustrating process flows for managing verified access right delivery, according to embodiments of the present disclosure.
Figure 11B:
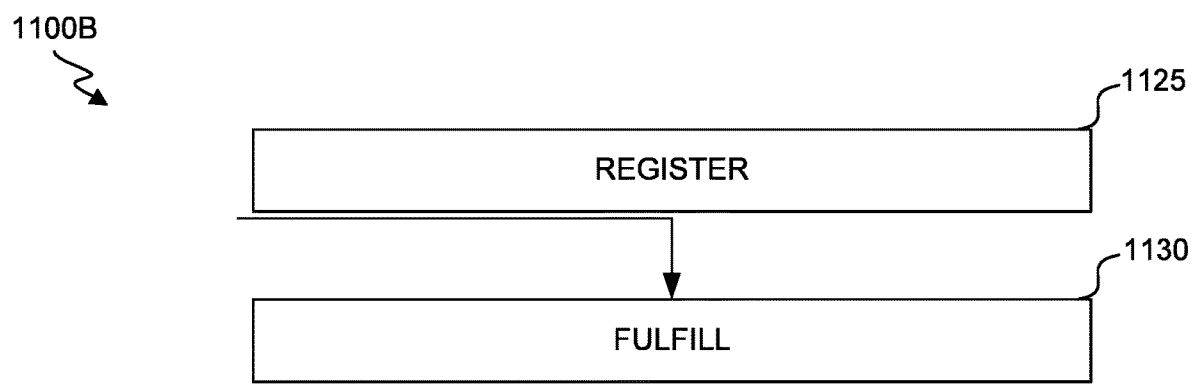

FIGS. 11A-B are flow diagrams illustrating processes for delivering verified and authentic access rights to users who request access rights on secondary assignment systems. For the purposes of illustration, FIGS. 11A-B will be described herein with a secondary assignment system being a reassignment platform, which is authorized to post and reassign access rights to resources on a secondary assignment system (e.g., the reassignment platform reassigns access rights that it did not issue, but that a primary access right issuer has previously issued). It will be appreciated that a reassignment platform is only an example of a secondary assignment system, and thus, the present disclosure is not limited thereto.

FIG. 11A illustrates process 1100A, which includes four API calls that can be executed to verify and delivery access rights to a reassignment platform. At block 1105, the reassignment platform can execute the register call to register one or more access rights (sequentially, in the case of one access right, and concurrently, in the case of multiple access rights) with the primary access right issuer before or in conjunction with posting the one or more access rights for reassignment on the reassignment platform's website or native application (e.g., reassignment platform).

As a non-limiting example, an access-right reassignor may access the reassignment platform's website or native application to post an access right for reassignment. In this case, the access-right reassignor previously requested the access right from the primary access right issuer, but the access-right reassignor can no longer attend the event, and thus, the access-right reassignor accesses the reassignment platform's website or native application to reassign the access right to another user. The access-right reassignor can access the reassignment platform's website or native application using a mobile device, such as a smartphone. The website or native application can present an interface on the mobile device. The interface may receive input from the access-right reassignor corresponding to an indication that the access-right reassignor wants to reassign an access right. The interface may prompt the access-right reassignor for information about the access right. For example, the interface can prompt the access-right reassignor for any of or any combination of information items representing the access right. The reassignment platform can then execute the register call, which causes the received access right information. In some implementations, all of the access right information that the access-right reassignor provides to the reassignment platform needs to exactly match a valid access right stored in the primary access right issuer's systems for the primary access right issuer to register the access right. In some implementations, at least some of the access right information provided by the access-right reassignor would need to match a valid access right stored in the primary access right issuer's systems for the access right to be registered. For example, as long as the access right information satisfies a confidence threshold (e.g., at least 50 percent of the data points provided match a valid access right, at least the two informational items match two information items of a valid access right, at least the two informational items of the access right match any number of informational items representing a valid access right, and other suitable thresholds).

In some implementations, registering an access right may include querying the primary access right issuer's systems for a valid access right that matches the received access right information, and if the access right information matches the valid access right, then transmitting a confirmation signal from the primary access right issuer to the reassignment platform place indicating that the access right information corresponds to a valid access right. In some implementations, registering the access right may also include tracking or monitoring transactions involving the access right (e.g., which reassignment platform is being used to post the access right for reassignment). It will be appreciated that the access-right reassignor can post the same access right on multiple reassignment platforms, and the primary access right issuer can register each instance that the access right was posted (and on which reassignment platform).

At block 1110, when an access-right requestor uses the reassignment platform's website or native application to submit a request to request reassignment of the posted access right, the reassignment platform may execute the reserve call. For example, submitting a request may include receiving the access-right requestor's attribute information with a request to request the access right. In some implementations, when an access-right requestor places the access right in the access-right requestor's digital obtainment queue, that action does not trigger the reserve call, which means that other access-right requestors could potential request the access right because the access right is not yet reserved. In some implementations, placing the access right in the access-right requestor's digital obtainment queue may cause the access right to be reserved. Continuing with the implementations of reserving the access right when the request is submitted, the reassignment platform can execute the reserve API call when the requested information is received.

Executing the reserve call may include the reassignment platform internally or externally performing an anomaly check on the requested information, and concurrently, reserving the access right for the access-right requestor. Reserving the access right for the access-right requestor may include the reassignment platform transmitting a reassignment notification to the primary access right issuer. The reassignment notification may be a signal that notifies the primary access right issuer that a request has been received for the access right. Upon receiving the reassignment notification, the primary access right issuer can transmit a temporary removal notification to all of the other reassignment platforms that posted that access right for reassignment. Because the primary access right issuer registers each access right posting, the primary access right issuer has access to data that identifies all of the other reassignment platforms that posted that access right for reassignment. The removal notification is temporary because the anomaly check is being performed at the same time. Until the anomaly check is completed, the access right is only temporarily reserved for the access-right requestor. When each of the other reassignment platforms receives the removal notification, that reassignment platform temporarily removes the access right posting so that other potential access-right requestors cannot submit requests to request that access right. It will be appreciated that the anomaly check may evaluate whether the identity of the access-right requestor and/or the requested information is associated with previous anomalous activity. It will also be appreciated that other checks or processing may be performed in addition to or in lieu of the anomaly processing.

At block 1115, after the anomaly check is complete, if the results of the anomaly check indicate that the access-right requestor and/or the requested information successfully pass the anomaly check (e.g., the requested information is not associated with previous anomalous activity), then the reassign call may be executed. The reassign call reassigns the access right from the access-right reassignor to the access-right requestor. Reassigning the access right to the access-right requestor may include storing an indication of the access-right requestor's account identifier (e.g., username) as being authorized to gain entry to the event using the access code associated with the requested access right. Either the primary access right issuer or the reassignment platform may execute the reassign call, dependent on implementations.

At block 1120, the reassignment platform may execute the fulfill to deliver the digital access right to the access-right requestor. The fulfill call may be executed any time after the access right is reassigned to the access-right requestor. In some implementations, executing the fulfill call causes the primary access right issuer to transmit the access code of the requested access right to the reassignment platform, so that the reassignment platform can integrate the access code into the digital access right. The reassignment platform can then transmit the digital access right, which includes the access-enabling code, to a computing device operated by the access-right requestor. In these implementations, the reassignment platform can design the digital access right, and integrate the access-enabling code received from the primary access right issuer into the digital access right. In some implementations, the primary access right issuer may control the design of the digital access right. The primary access right issuer can transmit the digital access right data directly to the access-right requestor or to the access-right requestor via the reassignment platform. When the digital access right data is received at the access-right requestor's computing device (e.g., smartphone), the digital access right data may cause the computing device to render the digital access right data to display the digital access right. FIG. 11B illustrates process 1100B, which is a variation of process 1100A, in that the reserve and reassign steps are removed from the process. The register step and the fulfill step of process 1100B are the same as in process 1100A, and accordingly, their description is omitted here.

Figure 12A:
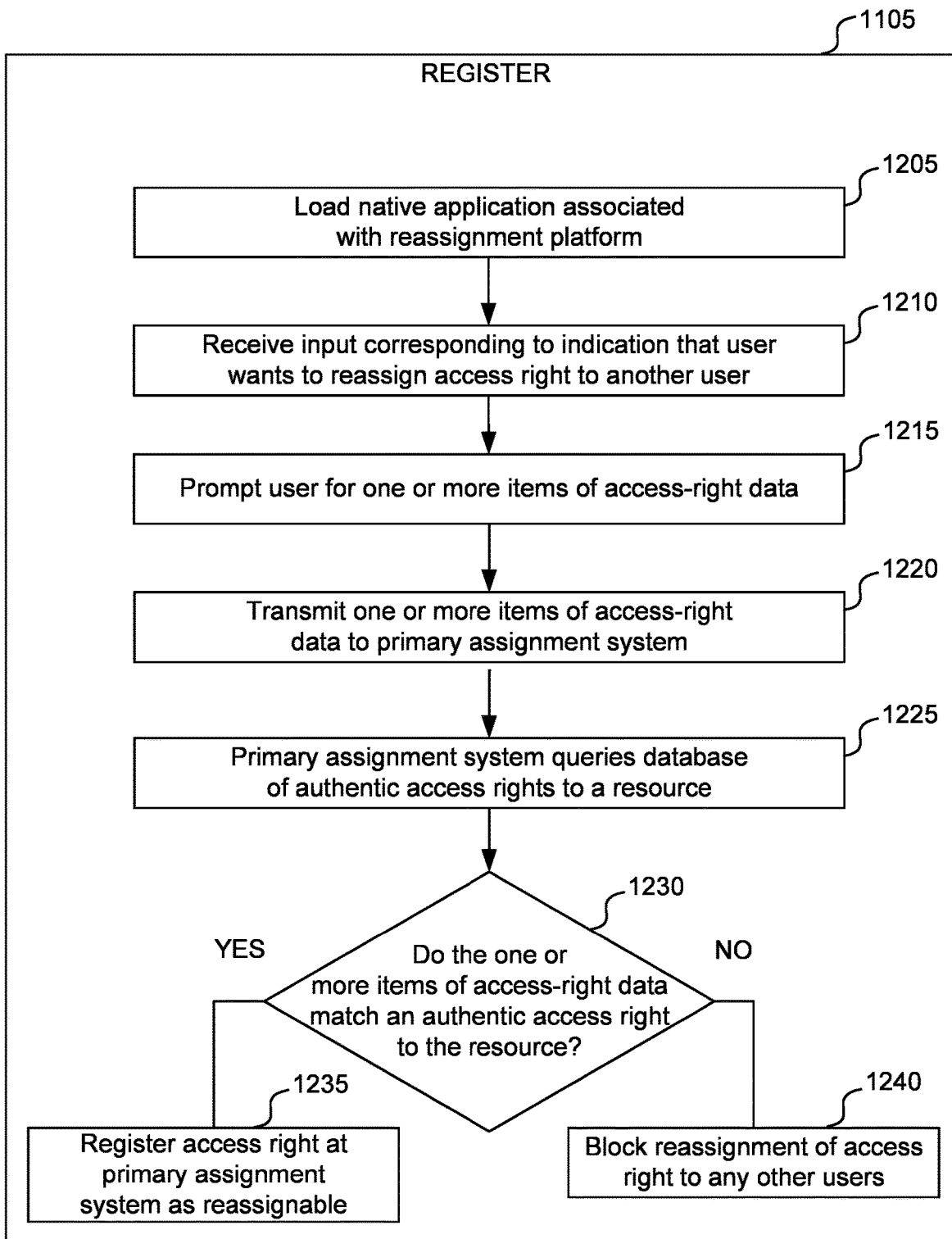
FIGS. 12A-C are flow diagrams illustrating process flows for registering access rights at a primary assignment system, according to embodiments of the present disclosure.
Figure 12B:
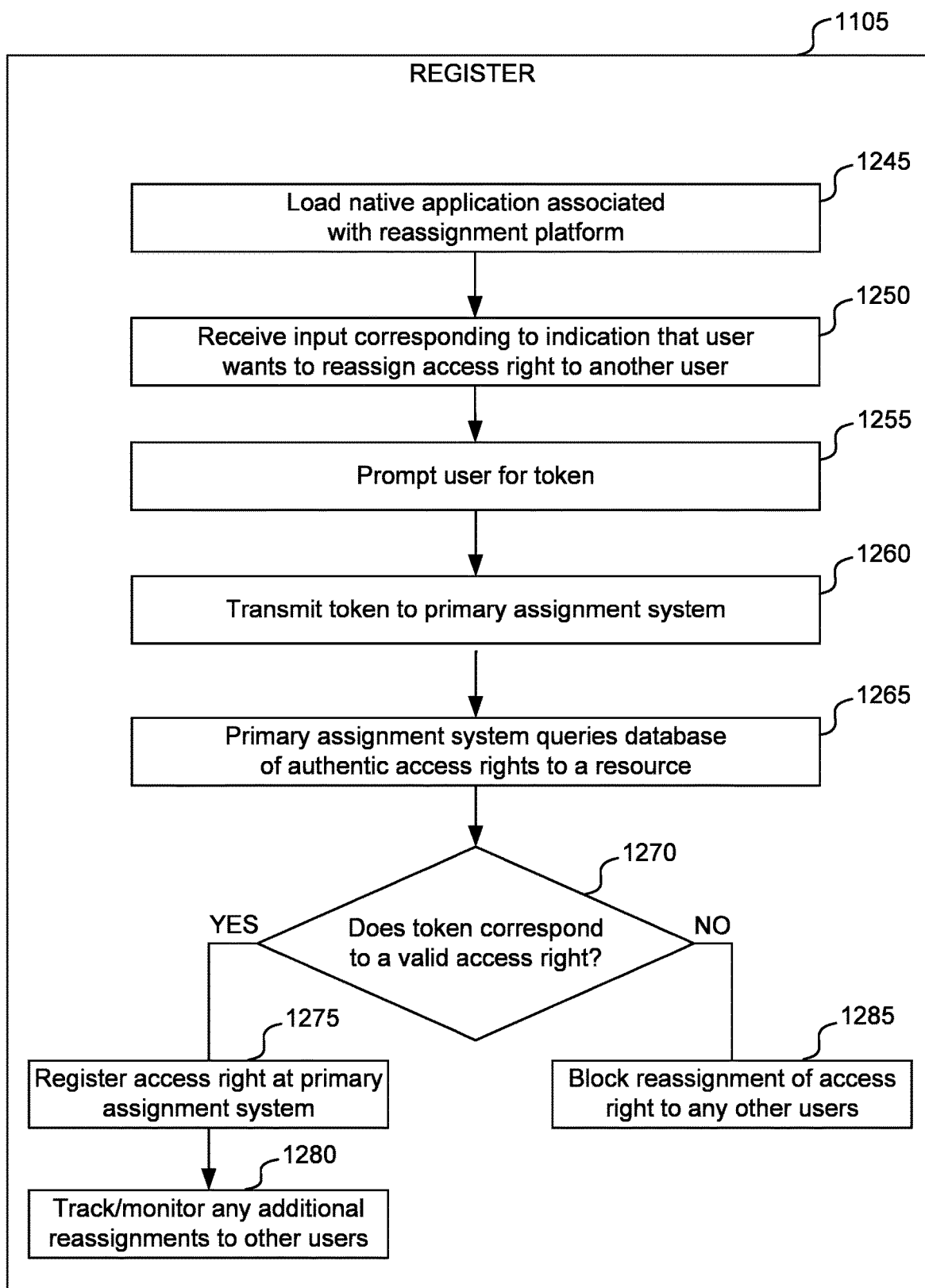
Figure 12C:
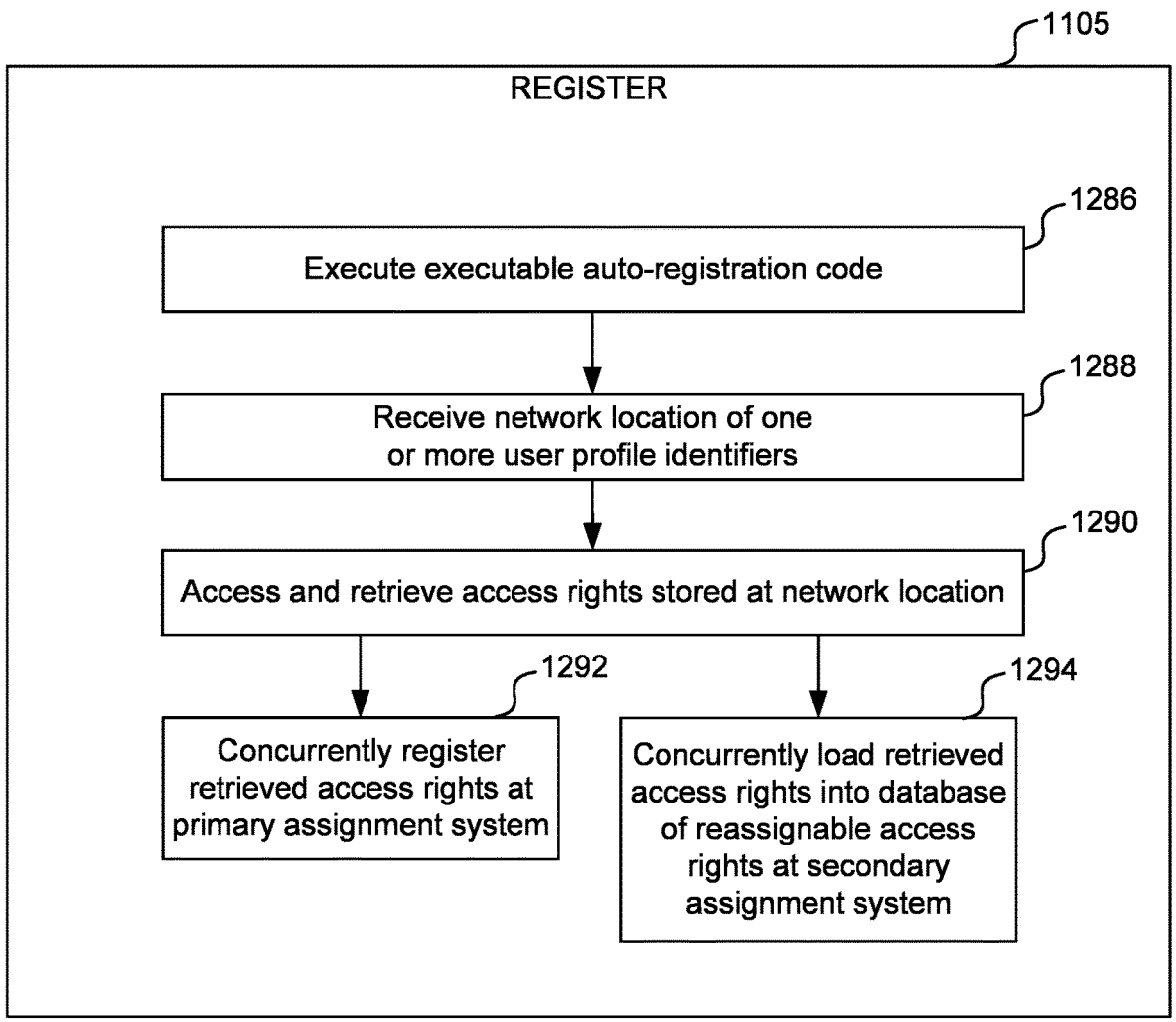

FIGS. 12A-12C are flowcharts illustrating various processes associated with executing the register API call. FIG. 12A begins with block 1205 where the access-right reassignor (who owns one or more access rights to at least one event) uses a computing device, such as a smartphone, to load a native application associated with a reassignment platform. For example, the native application may enable access-right reassignors to post access rights for reassignment and/or access-right requestors to search through access right postings and request access rights. While FIG. 12A illustrates a flowchart involving a native application, it will be appreciated that the present disclosure is not limited to a native application, and that a website may be used in this process. At block 1210, the native application may receive input corresponding to an indication that the access-right reassignor wants to reassign an access right. For example, the access-right reassignor may tap a "reassign" button displayed by the native application. As another example, the access-right reassignor may simply select the access rights that he or she wants to reassign, and by receiving the access right selections, the native application may recognize that the access-right reassignor wants to reassign the selected access rights.

At block 1215, the native application may prompt the access-right reassignor for one or more items of access right data. For example, items of access right data may include attributes or details of the access right. Examples of the items of access right data may include any information that represents a characteristic, attribute, or parameter of the access right. In some implementations, the access-right reassignor may type in the items of access right data into input fields of the native application. In some implementations, the access-right reassignor can use a smartphone's camera to capture an image or video feed of a physical access right. The native application may analyze the captured image or video data, and extract text features from the image or video data to automatically identify details about the access right. At block 1220, the one or more items of access right data may be transmitted to the primary access right issuer.

At block 1225, the primary access right issuer can query databases that store access right data (e.g., one of the databases within primary assignment system 214, such as access codes 1020a or assignment data 1010a) to determine whether the one or more items of access right data correspond to a valid or authentic access right. At branch 1230, the primary access right issuer determines whether the one or more items of access right data match a valid access right. If the one or more items of access right data match a valid access right stored in a database of the primary access right issuer (i.e., "YES" out of branch 1230), then the process proceeds to block 1235, where the access right is registered with the primary access right issuer. A confirmation message can be transmitted from the primary access right issuer to the reassignment platform if the access right is successfully registered. The reassignment platform can then post the access right for reassignment, given that the access right has been registered. If the one or more items of access right data do not match a valid access right stored in a database of the primary access right issuer (i.e., "NO" out of branch 1230), then the process proceeds to block 1240, where the reassignment of that access right is prevent or blocked at least on that reassignment platform. In some implementations, data processing systems may be notified and provided with the data received from the access-right reassignor.

FIG. 12B illustrates a similar process to FIG. 12A, except that in FIG. 12B, the access-right reassignor is prompted to input a token into the native application of the reassignment platform. The token may uniquely correspond to the access right that the access-right reassignor intends to reassign, however, unlike the access right, the token does not grant access to any events. In other words, the token is not an access code that can grant access to any event. Due to the similarity between FIGS. 12A and 12B, a description of blocks 1245 through 1275 and 1285 will be omitted here. At block 1280, however, the primary access right issuer can track the access right transactions involving that access right. For example, the primary access right issuer can track each of the reassignment platform on which the access-right reassignor posted the access right because for each instance the access-right reassignor posts an access right on a reassignment platform, the register call is executed. If or when the access right is sold, the primary access right issuer can track that transaction by storing the various details of the transaction.

FIG. 12C illustrates another implementation for ensuring access-right requestors request valid access rights on reassignment platforms. FIG. 12C describes the example scenario of a verified access-right reassignor who wants to load multiple access rights (e.g., a large group of access rights) for reassignment on a reassignment platform. In some implementations, the website or native application of the reassignment platform may include an auto-registration function that can facilitate the registration of multiple access rights simultaneously. In some implementations, the primary access right issuer can provide an interface to verified access-right reassignors to execute the auto-registration feature. At block 1286, the website or native application of the reassignment platform can be used to trigger the auto-registration function. For example, a user of the verified access-right reassignor can select a "Sync" button that triggers the auto-registration function. At block 1288, once the auto-registration function is triggered, the website or native application of the reassignment platform can receive input corresponding to a network location of one or more account identifiers. The input can be entered by the verified access-right reassignor or a user of the verified access-right reassignor. The network location may correspond to a location on a network (e.g., URL) at which one or more accounts associated with the account identifiers are stored. The one or more accounts may include one or more access rights that the verified access-right reassignor intends to load into the reassignment platform. At block 1290, the reassignment platform, through its servers and computing devices, can access the network location to retrieve to access rights stored at that network location. At block 1292, the reassignment platform can execute the register API call for each access right included in the access rights concurrently. For example, the reassignment platform can transmit identifiers for each access right in the access rights to the primary access right issuer for registration. The primary access right issuer can verify whether or not the multiple access rights are authentic, and if so, the primary access right issuer can transmit one or more confirmation messages to the reassignment platform. At block 1294, the reassignment platform can concurrently load the multiple access rights into its database. In some implementations, blocks 1292 and 1294 can be performed in a sequential order. In some implementations, blocks 1292 and 1294 can be performed concurrently.

Figure 13:
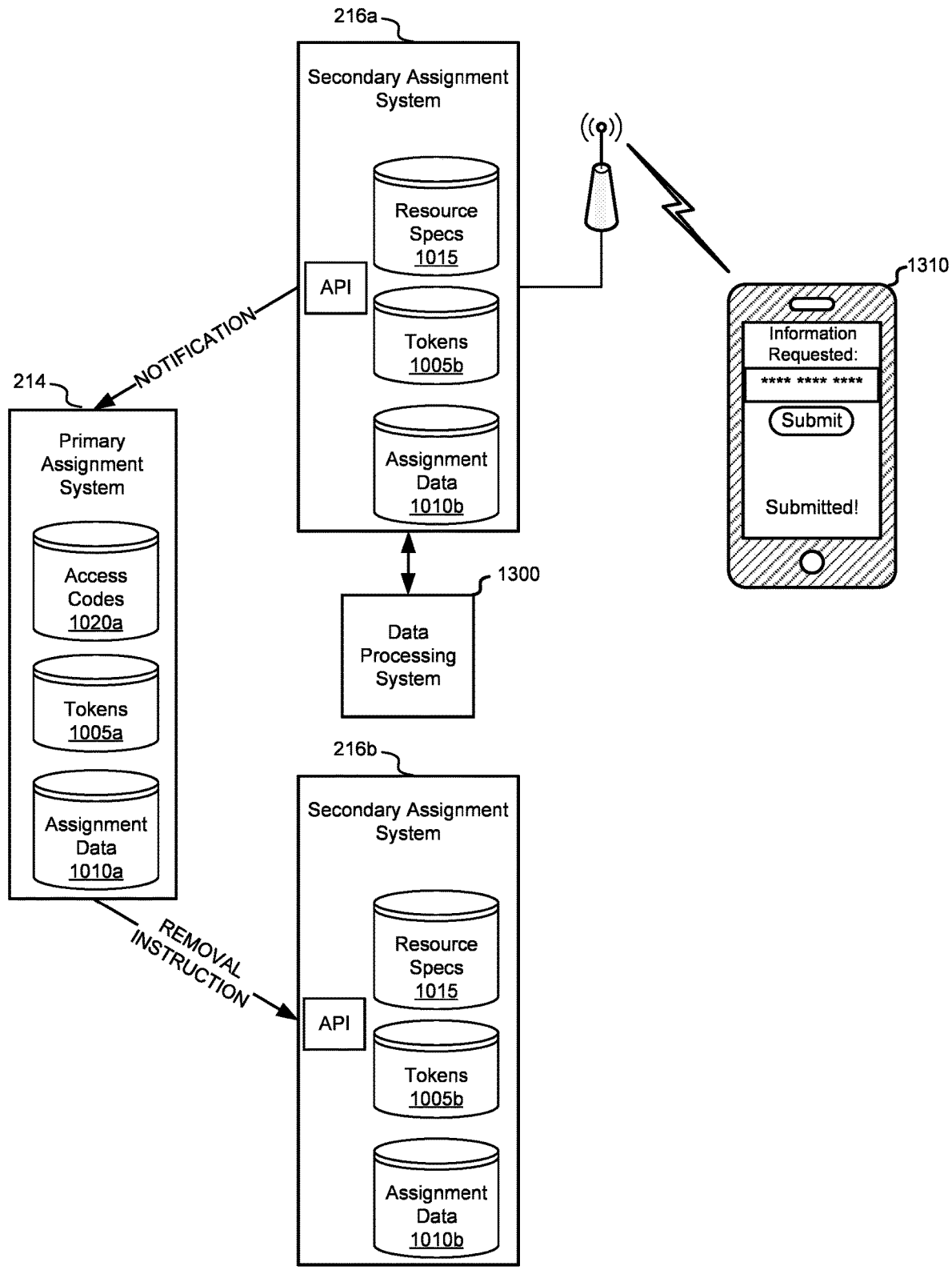
FIG. 13 is a schematic diagram illustrating a network environment for executing a reserve API call, according to embodiments of the present disclosure.

FIG. 13 is a schematic diagram illustrating a network environment for executing a reserve API call, according to embodiments of the present disclosure. In FIG. 13, mobile device 1310 may be operated by a potential access-right requestor using a native application of reassignment platform 216a. The potential access-right requestor may have searched for access rights using the native application and found one or more available access rights to request. The native application can prompt the potential access-right requestor for certain information. When the native application receives input corresponding to the requested information and an indication that the potential access-right requestor has submitted the request that requests the one or more access rights, the native application can transmit the inputted data to secondary assignment system 216a. Upon receiving the inputted data from the native application, secondary assignment system 216a can transmit a reassignment notification to primary assignment system 214. The reassignment notification can serve to notify primary assignment system 214 that one or more of the registered access rights are the subject of a request submitted by an access-right requestor. Secondary assignment system 216a also transmits a request to data processing system 1300 to evaluate the requested information included in the submitted request and/or the identity of the access-right requestor for previous anomalous activity. In response to receiving the reassignment notification, primary assignment system 214 may broadcast a removal instruction to all of the other secondary assignment systems that posted that same access right. The removal instruction may cause the secondary assignment systems 216b to temporarily remove the corresponding access right posting until the data processing system 1300 has completed the anomaly check. If the anomaly check is successfully passed, secondary assignment system 216a may execute the reassign call to reassign the access right to the access-right requestor. If the anomaly check indicates a failure, then the access right becomes unreserved and posted again on the secondary assignment systems.

Figure 14:
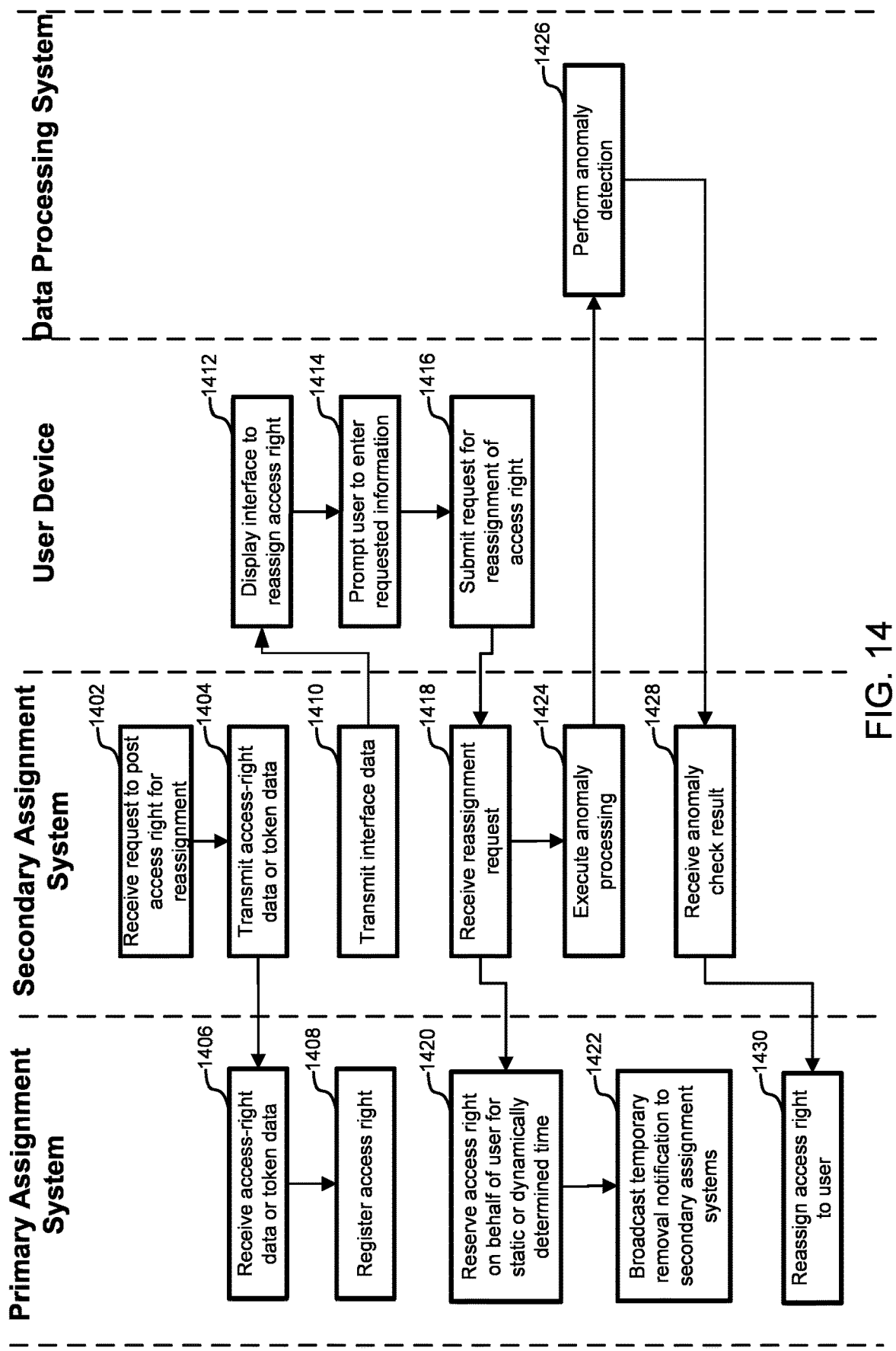
FIG. 14 is a swim lane diagram illustrating a process flow of executing one or more API calls, according to embodiments of the present disclosure.

FIG. 14 is a swim lane diagram illustrating a process flow of executing one or more API calls, according to embodiments of the present disclosure. The process flow begins with block 1402 where the secondary assignment system receives an access right posting request from an access-right reassignor. For example, the interface of the website or the native application of the secondary assignment messaging system may prompt the access-right reassignor to enter details about the access right to be posted for reassignment. At block 1404, the secondary assignment system can transmit the access right data to the primary assignment system as part of the register call. In some implementations, the access-right reassignor can enter the token ID corresponding to the access right, and then the secondary assignment system can transmit the token ID to the primary assignment system. At block 1406, the primary assignment system can receive the access right or token data from the secondary assignment system. At block 1408, the primary assignment system can register the access right corresponding to the access right data or the token ID. Block 1408 may include querying the databases managed by the primary assignment system to identify with the access right data or the token ID matches a valid access right.

At block 1410, the secondary assignment system may transmit interface data to a user device (e.g., smartphone) operated by a potential access-right requestor. For example, the interface data may cause an interface to be displayed on the user device. The interface may be a website or a native application of the secondary assignment system. At block 1412, the user device can display an interface that enables the potential access-right requestor to request an access right. At block 1414, the interface may prompt the user to enter requested information to request reassignment of the access right intended to be requested. At block 1416, the user may submit the request to request the access right that is posted on the reassignment platform. At block 1418, the secondary assignment system can receive the access right request. The secondary assignment system can perform two tasks concurrently. At block 1420, the secondary assignment system can execute the reserve API call to temporarily reserve the access right on behalf of the user for a static or dynamically adjusted period of time. At block 1422, the primary assignment system may broadcast a removal notification to each secondary assignment system that posted that access right for reassignment. Concurrently, the secondary assignment system can trigger an anomaly check at block 1424. At block 1426, the data processing system may perform the anomaly check on the requested information and/or the identity of the potential access-right requestor. At block 1428, the secondary assignment system can receive the anomaly check result. If the anomaly check is successfully passed, then the process flow may proceed to reassign the access right to the user at block 1430.

Figure 15A:
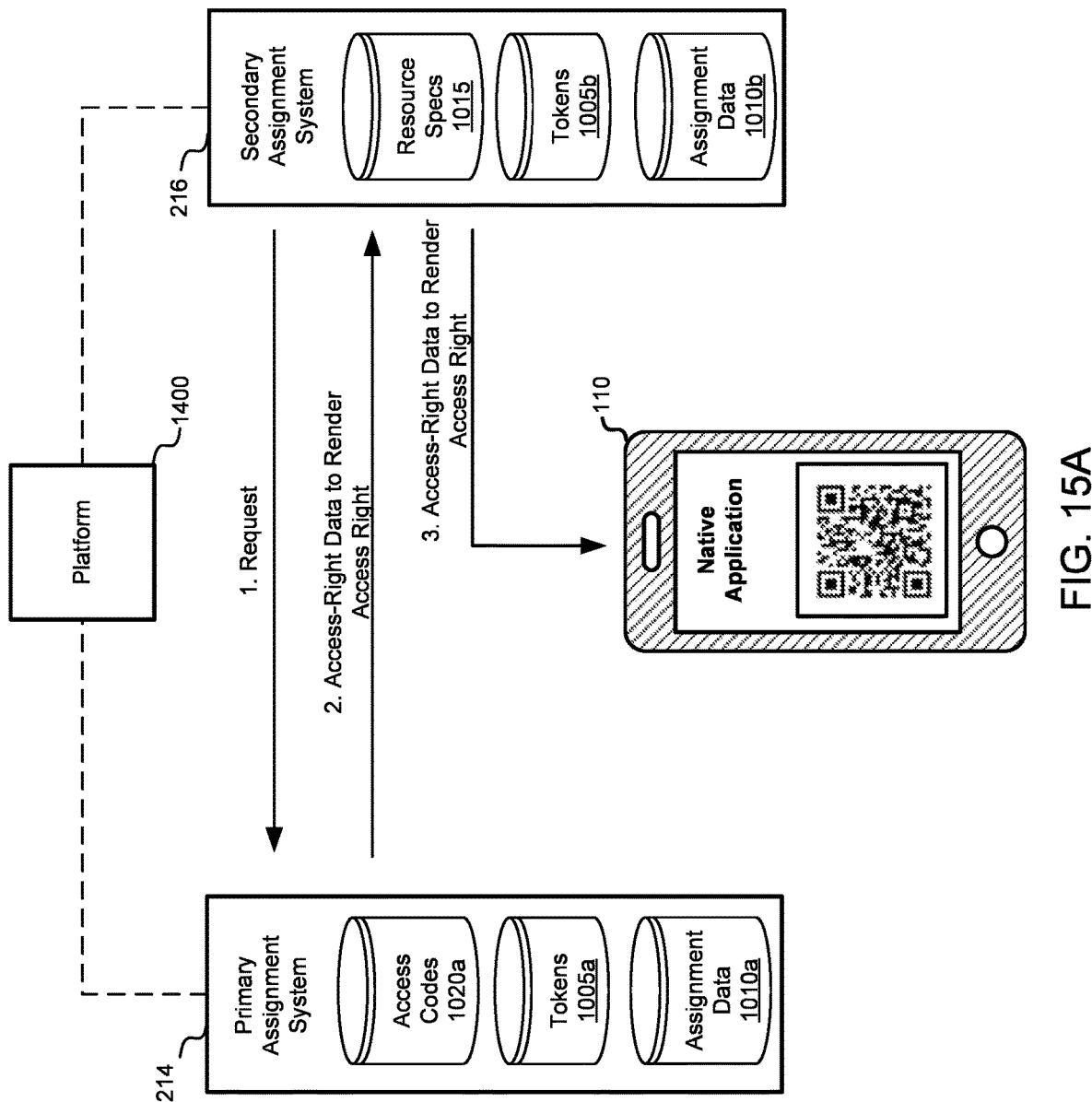
FIGS. 15A-B are block diagrams illustrating a process flow of digital access right delivery.
Figure 15B:
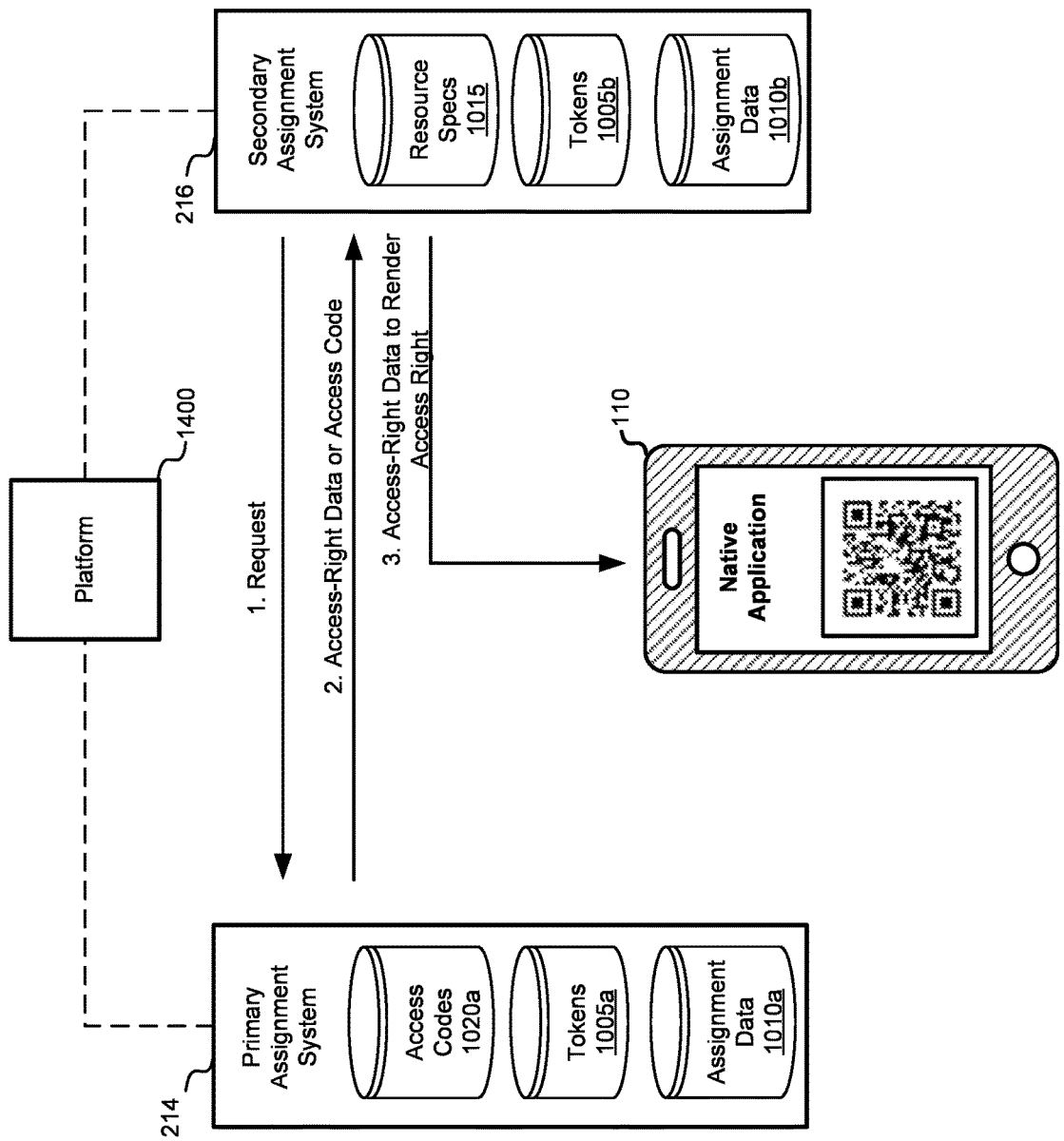

FIGS. 15A-B are block diagrams illustrating a process flow of digital access right delivery. As illustrated in FIG. 15A, in some implementation, the primary assignment system can control the look and feel of the digital access right. At step 1, the secondary assignment system 216 may transmit a request to the primary assignment system 214. For example, the request can be for access right data that can render a digital access right on a user device, such as mobile device 110. At step 2, the primary assignment system 214 can transmit the access right data to the secondary assignment management system 216. For example, the access right data can include data that can be rendered on user devices to display a digital access right. At step 3, the secondary assignment system can transmit the access right data to the user in advance of the event. It will be appreciated that the platform 1400 may be connected to each of the primary and/or secondary assignment systems. As described herein, the platform 1400 can track and monitor the delivery of digital access rights to users. The platform 1400 (and any other platform described herein can be an application deployed in a network environment, such as a cloud-based network). As illustrated in FIG. 15B, in some implementations, the secondary assignment system can control the look and feel of the digital access right, but the access code of the digital access right can be generated by the primary assignment system and integrated into the digital access right.

In some embodiments, tokens are transmitted across systems, which can inhibit unauthorized access to and use of access codes. Use of tokens may be particularly advantageous when communicating with one or more secondary assignment systems and/or conveying information pertaining to access rights prior to assignments. FIGS. 16A-16D illustrate examples of communication exchanges between systems involving identifications of tokens and access codes.

Figure 16A:
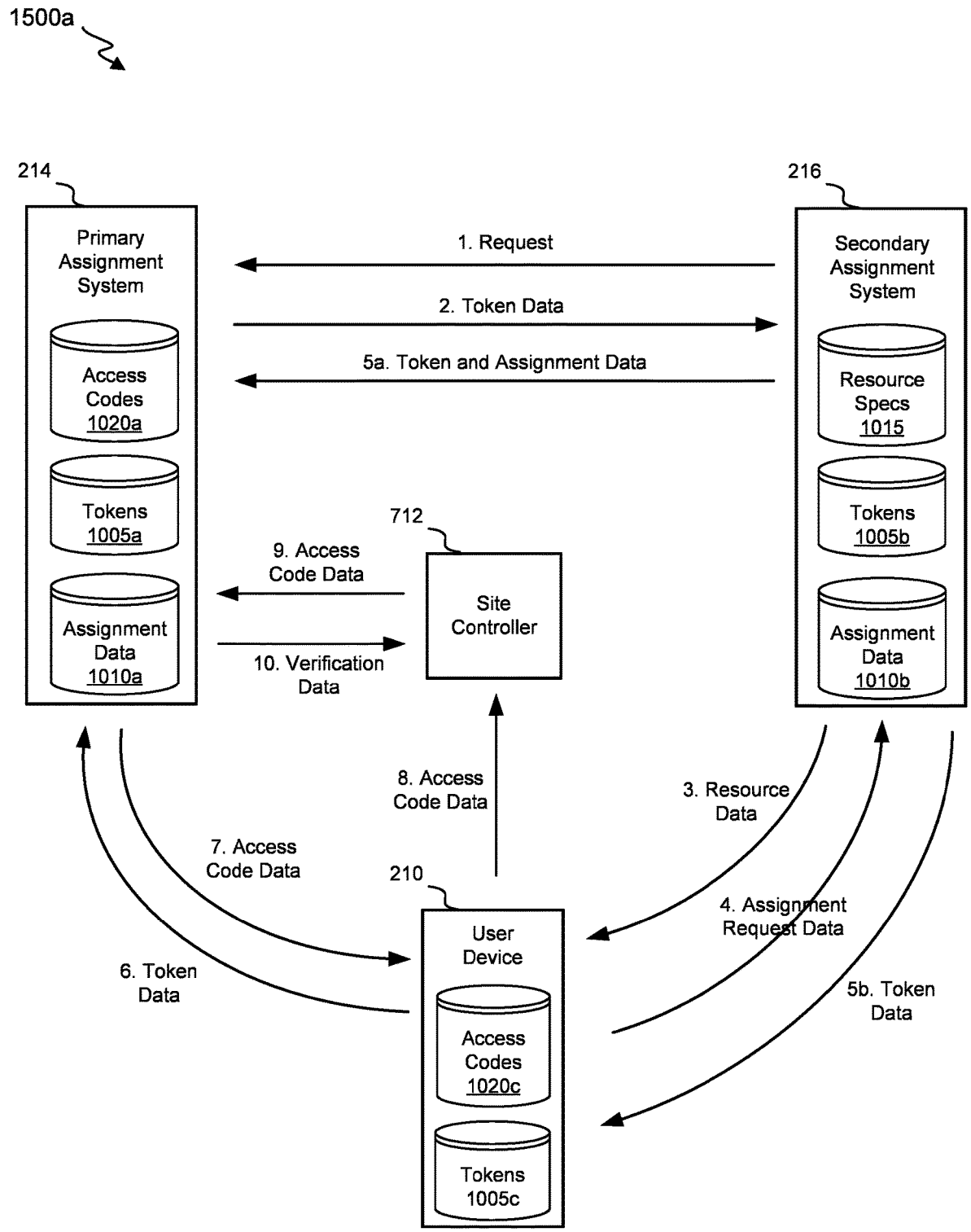
FIGS. 16A-D illustrate examples of communication exchanges involving primary and secondary load management systems.

In FIG. 16A, a first communication is transmitted from a secondary assignment system 216 (e.g., which may correspond to an intermediate system) to a primary assignment system 214 (e.g., which may correspond to an access management system and may include one or more components depicted or described herein, such as those depicted in FIG. 4 and/or FIG. 5). The first communication includes or is indicative of a request. In some instances, the first communication may include an identifier of a resource, a characteristic for accessing the resource (e.g., a section), and/or an identifier associated with an entity associated with the secondary assignment system 216 (e.g., a login name and/or password or metadata including an IP address and/or device identifier).

Primary assignment system 214 may process the request to determine whether to authenticate secondary assignment system 216 and/or an entity associated therewith. The authentication may include, for example, determining whether a credential (e.g., a username and/or password, IP address, and/or device identifier) included in or otherwise associated with the request is valid and/or matches a credential in a local or remote data store.

Upon an authenticating secondary assignment system 216 and/or an entity associated therewith, primary assignment system may generate or retrieve a token associated with a resource. The token can include and/or can be an alphanumeric string, which may (but need not) be or configured to be transformed via a transformation technique (e.g., an encryption technique). In various instances, the token may be associated with a particular access right, a particular set of access rights, an resource-access characteristic (e.g., and, in some instances, any access rights associated therewith), and/or a resource iteration (e.g., corresponding to a time and/or location). For example, primary assignment system 214 may identify a set of access rights with an unassigned status (e.g., by look-up at a local or remote assignment data store 1010*a*). One or more tokens may be generated to correspond to some or all of these access rights. In various instances, a given token is generated and/or stored so as to uniquely correspond to a particular secondary assignment systems.

In one instance, primary assignment system 214 identifies set of access rights for a resource and associates different portions thereof with different secondary assignment systems. A set of tokens transmitted to the secondary systems can then correspond to different secondary systems and to different access rights. In one instance, primary assignment system 214 associates overlapping portions of the set with different secondary assignment systems or associates the entire set with each secondary assignment systems. One or more tokens transmitted to different secondary assignment systems may, in some instances, still differ from each other (e.g., due to being associated with different secondary systems), or they may be the same (e.g., as a result of corresponding to one or more same access rights and resource).

Therefore, in some instances, a set of tokens is generated and stored at a local or remote token data store 1005*a* managed by and/or accessible to primary assignment system 214. Each token in the set of tokens may be different than the rest, and each token may have a particular correspondence to one or more resources, access rights, resource-access characteristics, secondary assignment systems, and so on.

A token may correspond to (for example) an indication that a system or entity provided with the token from primary assignment system 214 is entitled to assign a corresponding access right for a resource to a user. Such entitlement, in some instances, is conditioned, such as one that indicates that an instruction from a token-associated system or entity to assign an access right to a user will be accepted so long as the access right has not already been assigned to another user (e.g., via a different secondary assignment system or entity). As another example, the instruction may be accepted if the assignment condition has been satisfied. For example, the assignment condition may be an action or step that needs to be performed and/or completed before an access right can be assigned or reassigned to a user.

A token may additionally or alternatively correspond to (for example) an indication that a subsequent communication or communication session that includes the token need not be fully authenticated (or authenticated at all). A token, in some instances, may be time-limited. For example, a token may include and/or represent an expiration date and/or time, after which the token is no longer valid. As another example, a communication sent to a secondary assignment system that includes the token may also include an expiration date and/or time.

Upon authentication of secondary assignment system 216, primary assignment system 214 transmits token data that includes a token to secondary assignment system 216. Secondary assignment system 216 may then store the token in a token data store 1005*b* managed by and/or accessible to secondary assignment system 214. It will be appreciated that, in various instances, this authentication may be particularly tied to a single token delivery or a general authentication. For example, a secondary assignment system 216 may send an initial request communication for all access rights corresponding to resources at a given location. Primary assignment system 214 may perform an authentication and then send tokens for particular resources upon detecting new access-right allocations corresponding to the given location.

Each token stored at token data store 1005*b* may represent, identify or otherwise be associated with a given resource. Secondary assignment system 216 may also manage and/or have access to a resource specification data store 1015. Such specifications may be collected from, for example, primary assignment system 214, other systems, and/or web crawling. A resource specification may include text, graphics, or a video. A specification may identify, for example, one or more performing entities, a location of the resource, and/or a location associated with one or more access rights relative to a performing entity.

Secondary assignment system 216 can transmit resource data to one or more user devices. The resource data can include one or more resource specifications and may be transmitted, for example, in response to receiving an electronic query with one or more parameters corresponding to the resource. The resource data may be provided via, for example, a webpage. In some instances, in addition to transmitting the resource data, secondary assignment system 216 transmits data corresponding to one or more access rights for the resource, such as one or more access rights corresponding to a token and/or one or more access rights detected by secondary assignment system 216 (e.g., via assignment data from an assignment data store 1010*b* managed by and/or accessible to secondary assignment system 216 and/or via communicating with primary assignment system 214) as having an available status.

A user device 210 may transmit an assignment request communication to secondary assignment system 216. The assignment request may identify and/or be indicative of a resource, particular access right and/or resource-access characteristic. The assignment request communication may be transmitted in response, for example, to presentation of some or all of the resource data. For example, a user may use a webpage to submit a query. Secondary assignment system 216 may retrieve resource specifications pertaining to the query and transmit corresponding resource data to user device 210 via the webpage. A user may then select an access-right representation and/or request indication to initiate transmission of the assignment request communication.

The assignment request communication (or a different corresponding communication) may include information pertaining to the user and/or user device. Secondary assignment system 216 may determine whether all required information has been provided and whether local to and/or managed by secondary assignment system 216 indicates that a status of a requested access right (or an access right corresponding to a resource and/or resource-access characteristic associated with the assignment request communication) remains unassigned.

Secondary assignment system 216 can then retrieve a token from token data store 1005*b* that corresponds to an access right associated with the request (e.g., identified in the request and/or having an resource-access characteristic identified in the request). The token can be transmitted to one or more systems and/or devices. For example, secondary assignment system 216 can transmit a communication that includes the token back to primary assignment system 214 to indicate that an access right corresponding to the token is to be assigned to a particular user or has been assigned to a particular user (e.g., depending on which system has control of issuing such assignments). In some instances, the communication may include or may have an effect of being an instruction to change a status of the access right in assignment data store 1010a and/or to associate an identifier of the access right with an identifier of the particular user in assignment data store 1010a. Thus, the communication may (but need not) include assignment data, which can identify a user, a user device and/or an access right.

Upon receiving the communication from secondary assignment system 216, primary assignment system 214 may update token data store 1005a to indicate that the token and/or any other token associated with a same access right identified as being assigned is expired. Primary assignment system 214 may transmit an expiration communication to one or more other secondary assignment systems (e.g., to which a same or different token associated with the same access right was previously provided) to indicate that the token has expired. Primary assignment system 214 may further update assignment data store to change a status of an access right to "assigned" and/or to associate it with an identifier of one or more of: second assignment management system 216, an identified user, user device 210 and/or the token.

Secondary assignment system 216 can further update assignment data store 1010b to indicate that a particular access right is assigned, not available and/or assigned to a particular user. Secondary assignment system 216 may also update token data store 1005b to remove the token and/or to indicate that it has expired or been used.

Secondary assignment system 216 can also transmit the token back to user device 210 (e.g., via a website, app page, email or SMS message). The token can be transmitted along with an indication that a corresponding access right is being assigned. User device 210 can then store the token in a token data store 1005c that is local to and/or accessible to the device.

Subsequently, user device 210 may retrieve the token and transmit it to primary assignment system 214 so as to request an access code for the corresponding access right. The token retrieval and/or transmission may occur, for example, upon detecting a user input corresponding to a request for the access code, detecting a site controller 712, detecting (e.g., via tracking GPS coordinates) that user device 210 is within a prescribed geographical area associated with the resource, detecting that a time threshold (e.g., that is a defined time before a resource-associated time) has elapsed and/or detecting a request from a device or system (e.g., site controller 712) for an access code.

Depending on the embodiment, primary assignment system 214 may, or may not, verify that the token corresponds with a user and/or user data identified in association with the token in assignment data store 1010a. Primary assignment system 214 may then retrieve or generate an access code that corresponds to the token. The access code can include one previously stored at or store, subsequent to real-time generation thereof, at an access code data store 1020a managed by and/or local to primary assignment system 214. The access code can include, for example, a one-, two-, three- or four-dimensional code (e.g., one that changes in time).

User device 210 may store the access code at an access code data store 1020c local to and/or accessible to the user device. Immediately or subsequently, user device 210 may also transmit the access code to a site controller 712. The transmission of the access code to site controller 712 may occur (for example) in response to detecting the site controller, in response to receiving a request from site controller 712 for the access code and/or in response to detecting user input corresponding an instruction to transmit the access code. In some instances, user device 210 may—in a same or different communication-transmit additional information, such as an identifier of user device 210 and/or an identifier of an associated user.

Site controller 712 can communicate with primary assignment system 214 to verify that the access code is valid and is applicable to a given circumstance. Specifically, site controller 712 may transmit the access code to primary assignment system 214 along with other information, such as (for example) an identifier of user device 210, an identifier of a user, an identifier of a resource, or a location characteristic.

Primary assignment system 214 may determine whether the access code is valid by, for example, identifying whether the code exists in access code data store 1020a, whether the code exists in access code data store 1020a and is associated with one or more given statuses (e.g., assigned and unredeemed), and/or whether the code conforms to a particular pattern. Primary assignment system 214 may further determine whether the access code corresponds with information in access code data store 1020a that is consistent with other information transmitted by site controller 712, such as an identifier of a user device, a resource, a user or a location. Upon determining that the access code is valid (e.g., and applicable to a given circumstance, as estimated based on an information consistency analysis), primary assignment system 214 may change a status of the access code in access code data store 1020a to indicate that it has been used, and transmit verification data back to site controller 712 indicating that the access code is verified. If it is determined that the access code is not valid and/or not applicable to a given circumstance, primary assignment system 214 can transmit verification data back to site controller 712 indicating that the access code is not verified.

Site controller 712 can use a verification communication to (for example) determine whether to unlock a gate of a resource and/or to control a presentation. For example, an indication that an access code is verified can cause a gate to unlock or a notification to be presented that an access code is verified.

Figure 16B:
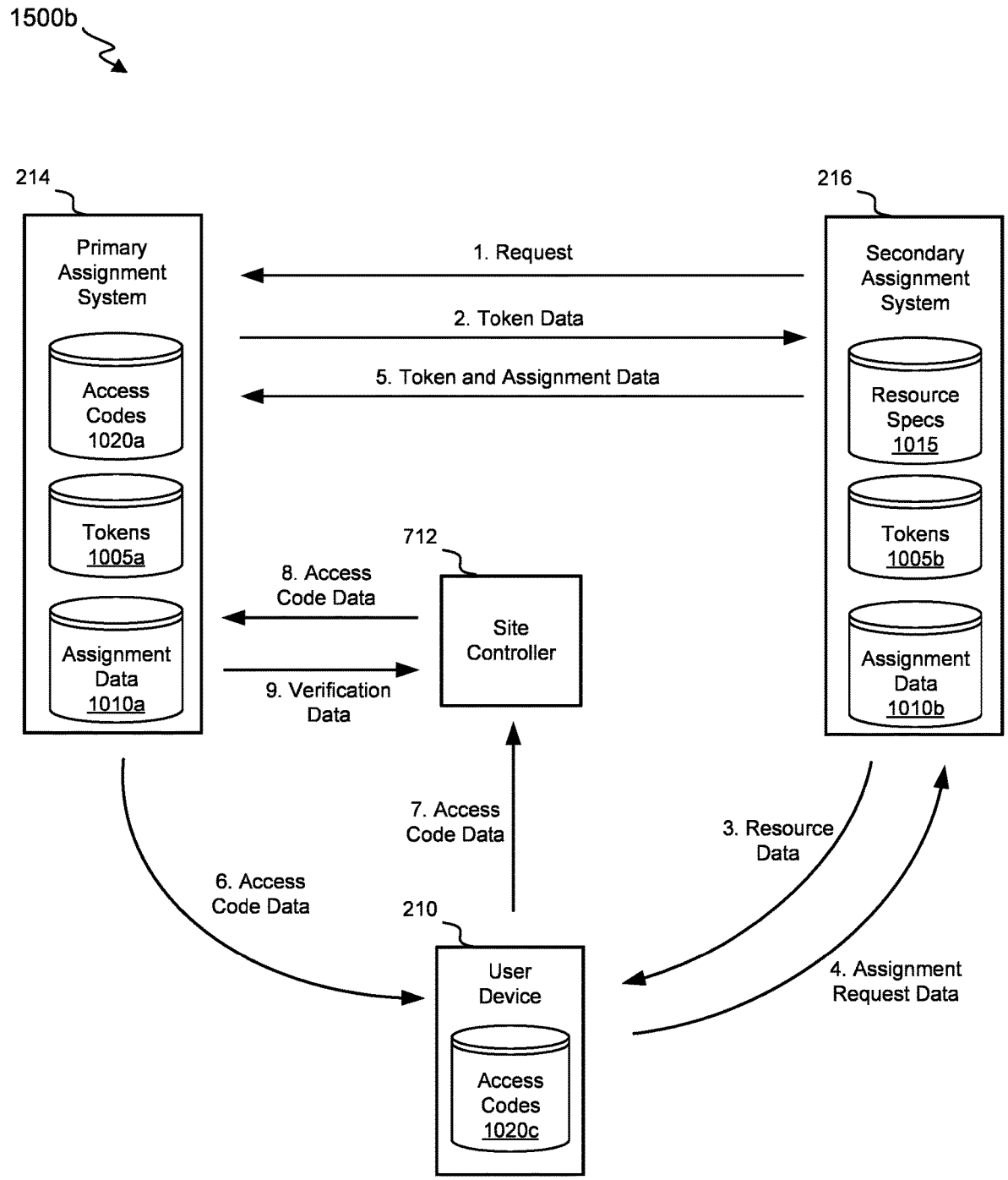

In FIG. 16B, initial communications parallel those depicted in FIG. 16A. However, in this instance, secondary assignment system 216 does not transmit token data to user device 210. Rather, assignment data transmitted from secondary assignment system 216 to primary assignment system 214 that includes an identifier of user device 210 or an associated user.

Primary assignment system 214 can then send access code data that includes an access code that corresponds to the token. For example, the assignment data may identify user device 210, and the access code can then be sent to user device 210. As another example, the assignment data may identify a user. User device 210 (which may be a same or different user device from the one used to request an assignment) may then detect association with a user and transmit a communication to primary assignment system 214 that identifies the user (e.g., via a username and/or password, account identifier, etc.). As yet another example, secondary assignment system 216 may provide user device 210 with a code (e.g., that is also provided to primary assignment system 214 or was provided by primary assignment system 214). A communication from user device 210 (which may be the same or different user device from one used to request an assignment) may then indicate that the user device corresponds to the user.

The access code data can be transmitted to user device 210 (for example) upon receiving (e.g., immediately upon receiving) the assignment data, upon detecting that a time threshold defined based on a resource-associated time has passed, and/or upon receiving a request or other communication from user device 210. Subsequently, user device 210 can transmit the access code to site controller 712, which can communicate with primary assignment system 214 to determine whether the code is verified, as in FIG. 16A.

Figure 16C:
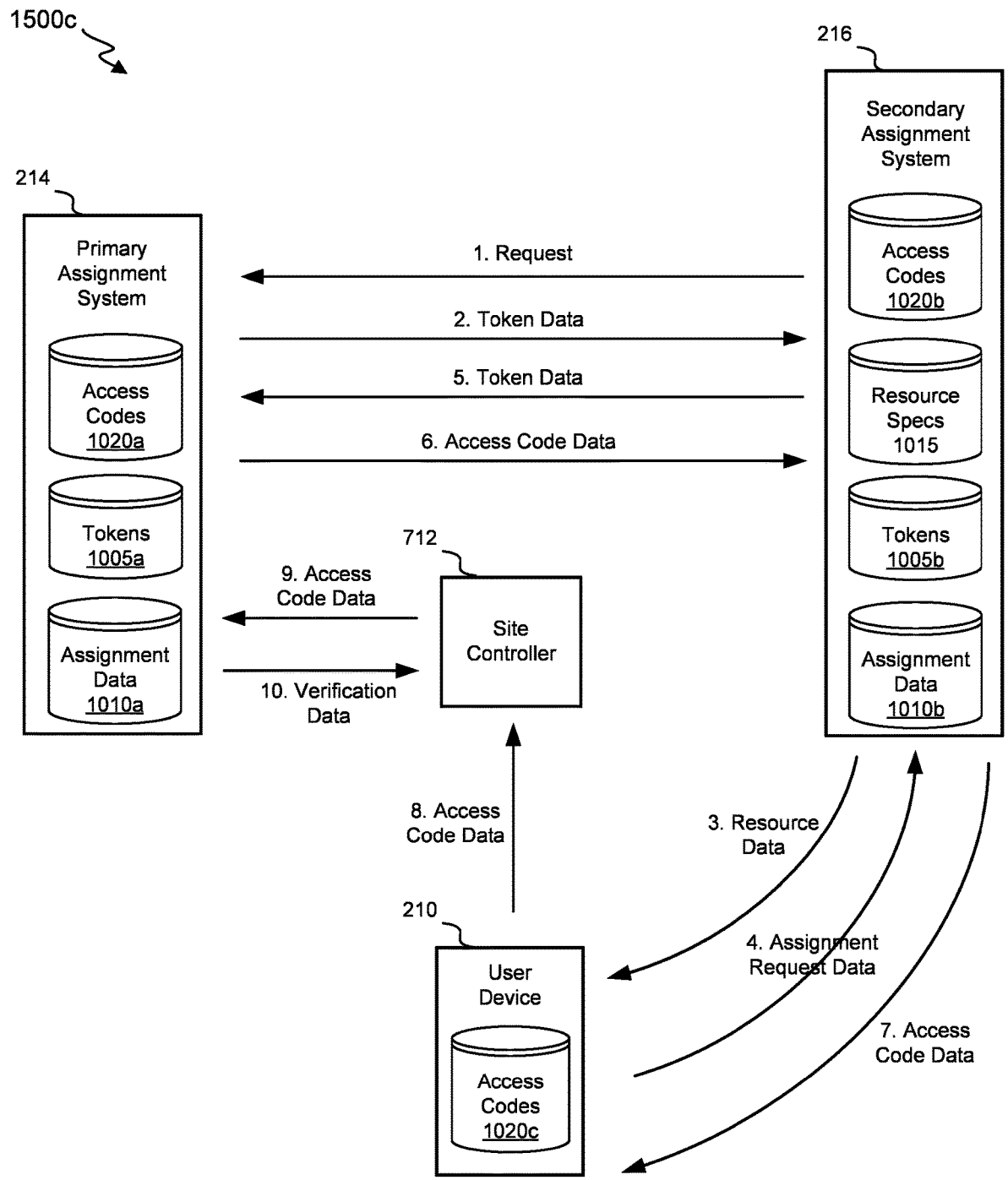

In FIG. 16C, initial communications parallel those depicted in FIG. 16A. However, in this instance, secondary assignment system 216 provides user device 210 with an access code (e.g., as opposed to primary assignment system 214 providing such a code). More specifically, in response to receiving token data from secondary assignment system 216, primary assignment system 214 provides secondary assignment system 216 with a corresponding access code. The access code may be provided, for example, immediately, at a defined delay, or upon detecting that a time threshold defined based on a resource-associated time has passed.

Secondary assignment system 216 may store the access code in an access code data store 1020b that is local and/or accessible to secondary assignment system 216. Secondary assignment system 216 can then transmit the access code to user device 210. The access code can be transmitted to user device 210, for example, immediately, at a defined delay, or upon detecting that a time threshold defined based on a resource-associated time has passed. Thus, in this context, one or both of primary assignment system 214 and/or secondary assignment system 216 can control when a user device has receives an access code. Subsequently, user device 210 can transmit the access code to site controller 712, which can communicate with primary assignment system 214 to determine whether the code is verified, as in FIG. 16A.

Figure 16D:
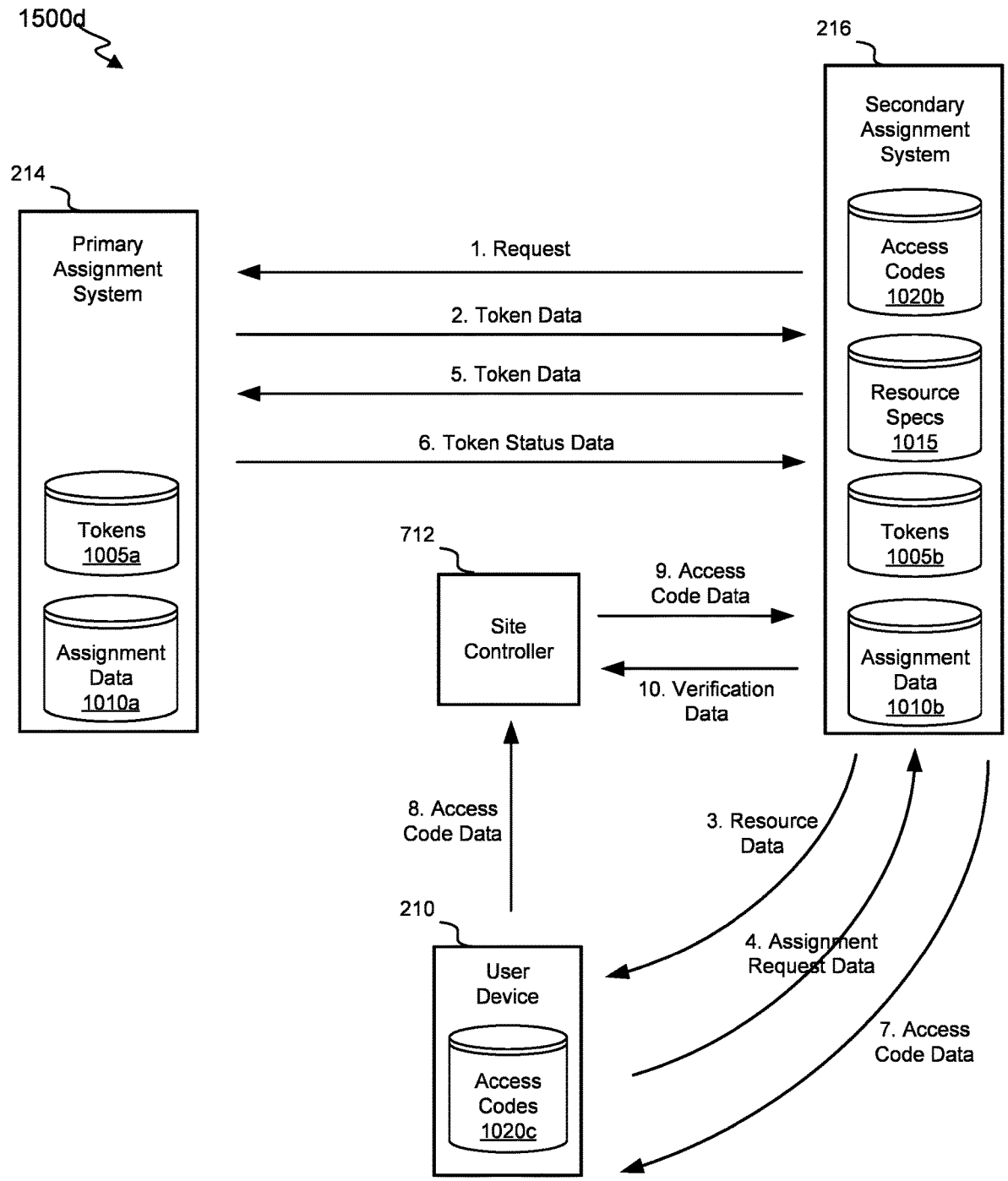

In FIG. 16D, many communications parallel those depicted in FIG. 16A-C. However, in this instance—while primary assignment system 214 manages tokens, it does not manage access codes. Rather, secondary assignment system 216 or a remote system can manage access codes (e.g., via an access code data store 1020b).

In response to receiving an assignment request, secondary assignment system 216 can communicate token data to primary assignment system 214, which can ensure (for example) that a status of the token is valid. For example, a token may have become invalid due to another system having used the same or a corresponding token and/or the token having been used a threshold number (e.g., a specified number that is more than one) of times. Primary assignment system 214 can convey the status of the token to secondary assignment system 216.

When a status indicates that a token is still valid and represents an ability to assign an access code, secondary assignment system 216 may then generate or retrieve an access code that corresponds to the token. That access code can be transmitted to user device 210, for example, immediately, at a defined delay, or upon detecting that a time threshold defined based on a resource-associated time has passed. When site controller 712 receives the access code, a verification communication exchange can be conducted between site controller 712 and secondary assignment system 216.

Figure 17:
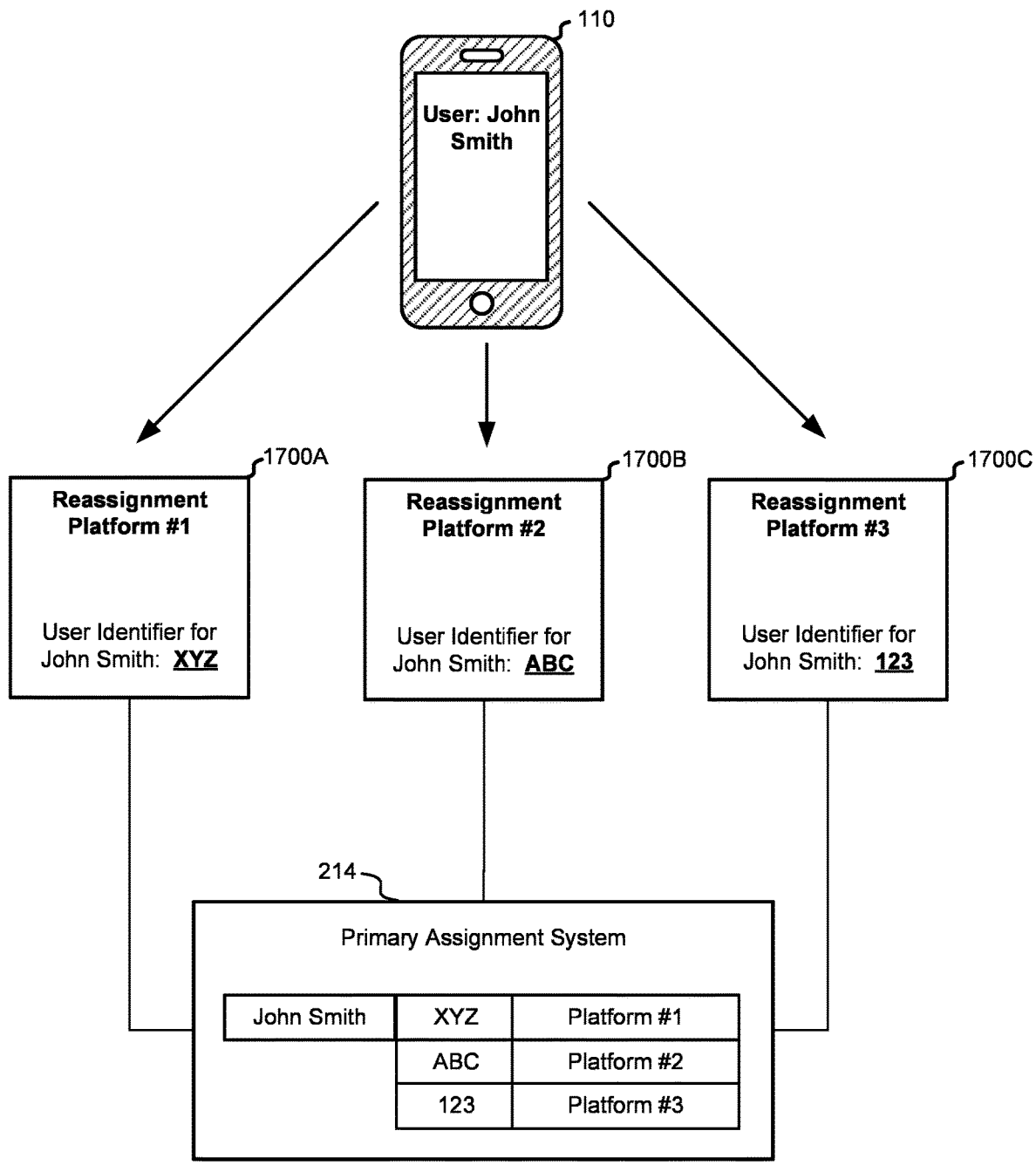
FIG. 17 is a block diagram illustrating a process for generating and maintaining a universal identifier to track a user's access across multiple secondary assignment systems.

FIG. 17 is a block diagram illustrating a process for generating and maintaining a universal identifier to track a user's access across multiple reassignment platforms. For example, John Smith may operate mobile device 110 to request access rights. John Smith may have created accounts with Reassignment platform #1, Reassignment platform #2, and Reassignment platform #3, so that John Smith could search for available access rights to request. In this scenario, each of Reassignment platform #1, Reassignment platform #2, and Reassignment platform #3 may create a user identifier that uniquely corresponds to John Smith. As a non-limiting example, Reassignment platform #1 may create the user identifier XYZ to represent John Smith, Reassignment platform #2 may create the user identifier ABC to represent John Smith, and Reassignment platform #3 may create the user identifier 123 to represent John Smith.

From the perspective of the primary assignment system 214, user identifiers XYZ, ABC, and 123 may appear to correspond to different users because the user identifiers are different from each other. However, it would be valuable to the primary assignment system 214 to determine whether the user identifiers XYZ, ABC, and 123 corresponded to the same user across the three reassignment platforms because the primary assignment system could track that user's activities and request patterns across various reassignment platforms. In some implementations, the primary assignment system may generate a universal identifier for user John Smith to track John Smith's request patterns across the various reassignment platforms. In some implementations, John Smith may be provided with the opportunity opt into or out of the universal tracking across multiple platforms. In some implementations, the primary assignment system may determine that user identifiers XYZ, ABC, and 123 all correspond to John Smith (or at least all correspond to the same user) by performing any number of matching techniques, including email matching, name matching, accessing one or more third-party databases to identify additional information about the user associated with the user identifier, phone number matching, and other suitable techniques. User-request patterns may include the resource entities that John Smith viewed on the interfaces of the reassignment platforms, the access rights requested, the access rights posted for reassignment, and other suitable information. Advantageously, the ability to track users across various reassignment platforms enables the primary assignment system to provide targeted and relevant information to John Smith, when John Smith visits the assignment platform (e.g., targeted and more accurate access right recommendations).

It will be appreciated that the user's universal identifier can be determined using a combination of email, first name, last name, address, and/or phone number. The universal identifier can be used to provide a chain of custody across the multiple reassignment platforms. Additionally, through the identified chain of custody, the primary assignment system can correlate users across multiple platforms based on a rendering of the digital access right using a native application and/or at a time of posting of the digital access right on the reassignment platform. For instance, regarding the posting of the digital access right on the reassignment platform, the primary assignment system can link the unique code of the digital access right to the particular user (e.g., the same unique posted to multiple platforms likely will be done by the same user and the combination of access-right reassignor or access-right requestor data can be used for confirmation).

Specific details are given in the above description to provide a thorough understanding of the embodiments. However, it is understood that the embodiments can be practiced without these specific details. For example, circuits can be shown in block diagrams not to obscure the embodiments in unnecessary detail. In other instances, well-known circuits, processes, algorithms, structures, and techniques can be shown without unnecessary detail to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, access right passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

We claim:

1. A computer implemented method for registering a primary access right at a reassignment platform, comprising:
loading a native application associated with the reassignment platform, to reassign the primary access right of a user to another user;
capturing one or more viewpoints of a visual data stream of a physical manifestation of the primary access right of the user;
registering the primary access right at a primary assignment system, wherein the primary access right is registered for reassignment on the reassignment platform;
extracting a set of key features from the one or more viewpoints of the visual data stream of the primary access right, wherein the set of key features includes one or more characteristics, attributes, and parameters of the primary access right;
matching the set of key features with a valid access right stored in the primary assignment system to determine valid features from the set of key features;
verifying authenticity of the set of key features based on the valid features;
retrieving information associated with the access right from the primary assignment system to the reassignment platform, wherein the information corresponds to the authenticated set of key features; and
registering the primary access right as access rights available for reassignment on the reassignment platform based on the retrieved information associated with the access rights.

2. The computer implemented method as recited in claim 1, further comprising capturing an image or video stream or video feed using a camera embedded in a mobile device or user's smartphone camera or a camera enabling device.

3. The computer implemented method as recited in claim 1, further comprising the primary assignment system to automatically remove or delete the access right for a temporary hold period wherein the temporary hold period is based on access right demand, time to event, request probability of the user, a user's previous requests, a user's social media account, user's contact information.

4. The computer implemented method as recited in claim 1, further comprises extracting the set of key features as text features from the visual data stream to automatically identify details about the access right wherein the user does not have to input any information about the primary access right.

5. The computer implemented method as recited in claim 1, further comprises facilitating the reassignment of access rights from an access-right holder to multiple new users associated with multiple reassignment platforms.

6. The computer implemented method as recited in claim 1, further comprising, serving the reassignment platform as primary assignment system when the reassignment platform generates, stores, and manages its own unique access-enabling codes for the access rights, and vice versa.

7. The computer implemented method as recited in claim 1, further comprises verifying authenticity of the set of key features based on a historical analysis of the user, corresponding to reassignment of the primary access right.

8. The computer implemented method as recited in claim 1, further comprising the set of key features including at least one of a special symbol, a string of characters, or a code.

9. The computer implemented method as recited in claim 1, further comprises reserving request of reassignment of the primary access right for a dynamic amount of time.

10. A computer system, comprising:
one or more processors; and
a user interface associated with a reassignment platform;
a primary assignment system;
a non-transitory computer-readable storage medium containing instructions which, when executed on the one or more processors, cause the one or more processors to perform operations including:
load a native application associated with the reassignment platform, to reassign the primary access right of a user to another user;
capture one or more viewpoints of a visual data stream of a physical manifestation of the primary access right of the user;
register the primary access right at the primary assignment system, wherein the primary access right is registered for reassignment on the reassignment platform;
extract a set of key features from the one or more viewpoints of the visual data stream of the primary access right, wherein the set of key features includes one or more characteristics, attributes, and parameters of the primary access right;
match the set of key features with a valid access right stored in the primary assignment system to determine valid features from the set of key features;
verify authenticity of the set of key features based on the valid features;
retrieve information associated with the access right from the primary assignment system to the reassignment platform, wherein the information corresponds to the authenticated set of key features; and
register the primary access right as access rights available for reassignment on the reassignment platform based on the retrieved information.

11. The computer system as recited in claim 10, further comprising capturing an image or video stream or video feed using a camera embedded in a mobile device or user's smartphone camera or a camera enabling device.

12. The computer system as recited in claim 10, further comprising the primary assignment system to automatically remove or delete the access right for a temporary hold period wherein the temporary hold period is based on access right demand, time to event, request probability of the user, a user's previous requests, a user's social media account, user's contact information.

13. The computer system as recited in claim 10, further comprises extracting the set of key features as text features from the visual data stream to automatically identify details about the access right wherein the user does not have to input any information about the primary access right.

14. The computer system as recited in claim 10, further comprises facilitating the reassignment of access rights from an access-right holder to multiple new users associated with multiple reassignment platforms.

15. The computer system as recited in claim 10, further comprising, serving the reassignment platform as primary assignment system when the reassignment platform generates, stores, and manages its own unique access-enabling codes for the access rights, and vice versa.

16. The computer system as recited in claim 10, further comprises verifying authenticity of the set of key features based on a historical analysis of the user, corresponding to reassignment of the primary access right.

17. The computer system as recited in claim 10, further comprising the set of key features including at least one of a special symbol, a string of characters, or a code.

18. The computer system as recited in claim 10, further comprises reserving request of reassignment of the primary access right for a dynamic amount of time.

19. The computer system as recited in claim 10, further comprises a unique key representing the access right of the primary access right wherein the unique key is a combination of one or more viewpoints of the visual data stream.

20. A computer-program product tangibly embodied in a non-transitory machine-readable storage medium, including instructions configured to cause a processing apparatus to perform operations comprising:
loading a native application associated with a reassignment platform, to reassign the primary access right of a user to another user;
capturing one or more viewpoints of a visual data stream of a physical manifestation of the primary access right of the user;
registering the primary access right at a primary assignment system, wherein the primary access right is registered for reassignment on the reassignment platform;
extracting a set of key features from the one or more viewpoints of the visual data stream of the primary access right, wherein the set of key features includes one or more characteristics, attributes, and parameters of the primary access right;
matching the set of key features with a valid access right stored in the primary assignment system to determine valid features from the set of key features;
verifying authenticity of the set of key features based on the valid features;
retrieving information associated with the access right from the primary assignment system to the reassignment platform, wherein the information corresponds to the authenticated set of key features; and
registering the primary access right as access rights available for reassignment on the reassignment platform based on the retrieved information associated with the access rights.

* * * * *